US010565276B2

(12) United States Patent
Finder

(10) Patent No.: US 10,565,276 B2
(45) Date of Patent: Feb. 18, 2020

(54) ONLINE SOCIAL NETWORKING SERVICE WITH HUMAN MATCHMAKING

(71) Applicant: BuddyNation Inc., Tequesta, FL (US)

(72) Inventor: Jason Stuart Finder, Jupiter, FL (US)

(73) Assignee: BUDDYNATION INC., Tequesta, FL (US)

(*) Notice: Subject to any disclaimer, the term of this patent is extended or adjusted under 35 U.S.C. 154(b) by 16 days.

(21) Appl. No.: 15/918,873

(22) Filed: Mar. 12, 2018

(65) Prior Publication Data
US 2019/0065609 A1    Feb. 28, 2019

Related U.S. Application Data

(63) Continuation of application No. 14/721,667, filed on May 26, 2015, now abandoned.

(60) Provisional application No. 62/084,232, filed on Nov. 25, 2014, provisional application No. 62/064,657, filed on Oct. 16, 2014, provisional application No. 62/002,540, filed on May 23, 2014.

(51) Int. Cl.
G06F 16/9535    (2019.01)
H04L 29/08      (2006.01)
G06Q 50/00      (2012.01)
H04L 12/18      (2006.01)
H04L 12/58      (2006.01)

(52) U.S. Cl.
CPC ......... *G06F 16/9535* (2019.01); *G06Q 50/01* (2013.01); *H04L 12/18* (2013.01); *H04L 51/32* (2013.01); *H04L 67/306* (2013.01)

(58) Field of Classification Search
CPC ..... G06F 16/9535; G06Q 50/01; H04L 12/18; H04L 51/32; H04L 67/306
USPC ....... 709/204, 206, 203, 219, 224, 202, 205, 709/207; 707/E17.014, 999.005, 707/E17.001, E17.009, E17.044, E17.108, 707/749, 769, E17.008, E17.015, 707/E17.028, E17.046, E17.107, 710, 707/722, 723, 736, 737, 748, 758, 812, 707/999.002, 999.003, 999.004, 999.104, 707/999.107, 999.201; 705/14.53, 319, 705/14.54, 14.43, 14.73, 14.1, 14.23, 705/14.25, 14.4, 14.64, 14.66, 2, 26.62, 705/26.7, 325, 34, 39, 7.31, 7.37, 7.42
See application file for complete search history.

(56) References Cited

U.S. PATENT DOCUMENTS 7,085,806 B1      8/2006  Shapira
2006/0287878 A1  12/2006  Wadhwa et al.
2011/0283201 A1  11/2011  Wachtel

*Primary Examiner* — Jay A Morrison
*Assistant Examiner* — Ken Hoang
(74) *Attorney, Agent, or Firm* — Van Court & Aldridge LLP

(57) ABSTRACT

Systems, methods, and computer-readable media for an online social networking service with human matchmaking are provided.

21 Claims, 39 Drawing Sheets

300

| Sign Up | Email | Password | Sign Up | Log in using Facebook |

DATEBUDDY
Get a match. Find a date.
Go out. Build your network.

GET MATCHED
We find you a matchmaker or "Datebuddy".
They set you up with one of their friends.
You handle the rest.

KEEP IT REAL
Having a matchmaker ensures your date is legit-not some smelly catfish.

SEE MORE
You'll have access to your Datebuddy's entire network, members and nonmembers.

BE A FIXUP ARTIST
Pay it forward by setting up your friends. You'll meet some cool people along the way.

GET REWARDED
When you set someone up we'll make it worth your while.

SIGN UP
- Full name
- Email

By clicking Sign Up, You agree to our Terms and that you have read our Data use Policy, including our Cookie use.

[Sign Up] [Log in using Facebook]

XYZ

ONLINE SOCIAL NETWORKING SERVICE WITH HUMAN MATCHMAKING

CROSS-REFERENCE TO RELATED APPLICATION(S)

This application is a continuation of U.S. patent application Ser. No. 14/721,667 filed May 26, 2015, which claims the benefit of prior filed U.S. Provisional Patent Application No. 62/002,540, filed May 23, 2014, prior filed U.S. Provisional Patent Application No. 62/064,657, filed Oct. 16, 2014, and prior filed U.S. Provisional Patent Application No. 62/084,232, filed Nov. 25, 2014, each of which is hereby incorporated by reference herein in its entirety.

TECHNICAL FIELD

This disclosure relates to online social networking services.

BACKGROUND OF THE DISCLOSURE

Conventional online dating services have several disadvantages including, but not limited to, ghost user accounts, user deception, over-reliance on superficial user information, and user loneliness.

SUMMARY OF THE DISCLOSURE

This document describes systems, methods, and computer-readable media for an online social networking service with human matchmaking.

For example, a method may include creating, with an online networking service, a member user account for a member user; creating, with the online networking service, a matchmaker user account for a matchmaker user; assigning, with the online networking service, the matchmaker user account to the member user account; identifying, with the matchmaker user, a matchmaker contact for the member user; granting the matchmaker contact access, with the online networking service, to the member user account; after the granting, creating, with the online networking service, a candidate user account for the matchmaker contact; and connecting, with the online networking service, the candidate user account to the member user account.

As another example, an online dating service system in communication with a member user electronic device and a matchmaker user electronic device may be provided. The online dating service system may include at least one processor component, at least one memory component, and at least one communications component, wherein the online dating service system is operative to receive member user information from the member user electronic device via the at least one communications component, create a member user account for the member user with the received member user information, receive matchmaker user information from the matchmaker user electronic device via the at least one communications component, create a matchmaker user account for the matchmaker user with the received matchmaker user information, analyze the member user account and the matchmaker user account, assign the matchmaker user account to the member user account based on the analysis, and, based on the assignment, transmit to the matchmaker user electronic device, via the at least one communications component, an instruction for the matchmaker user to identify a matchmaker contact for the member user.

As yet another example, a non-transitory computer-readable medium may include computer-readable instructions recorded thereon for creating, with an online networking service, a member user account for a member user; creating, with the online networking service, a matchmaker user account for a matchmaker user; assuming, with the online networking service, the matchmaker user account to the member user account; instructing the matchmaker user to identify a matchmaker contact for the member user; granting the matchmaker contact access, with the online networking service, to the member user account; after the granting, creating, with the online networking service, a candidate user account for the matchmaker contact; and connecting, with the online networking service, the candidate user account to the member user account.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIGS. 3-35 are illustrative screenshots of user interfaces of a client device of FIGS. 1 and 2 for the services of the disclosure.

DETAILED DESCRIPTION OF THE DISCLOSURE

Figure 1:
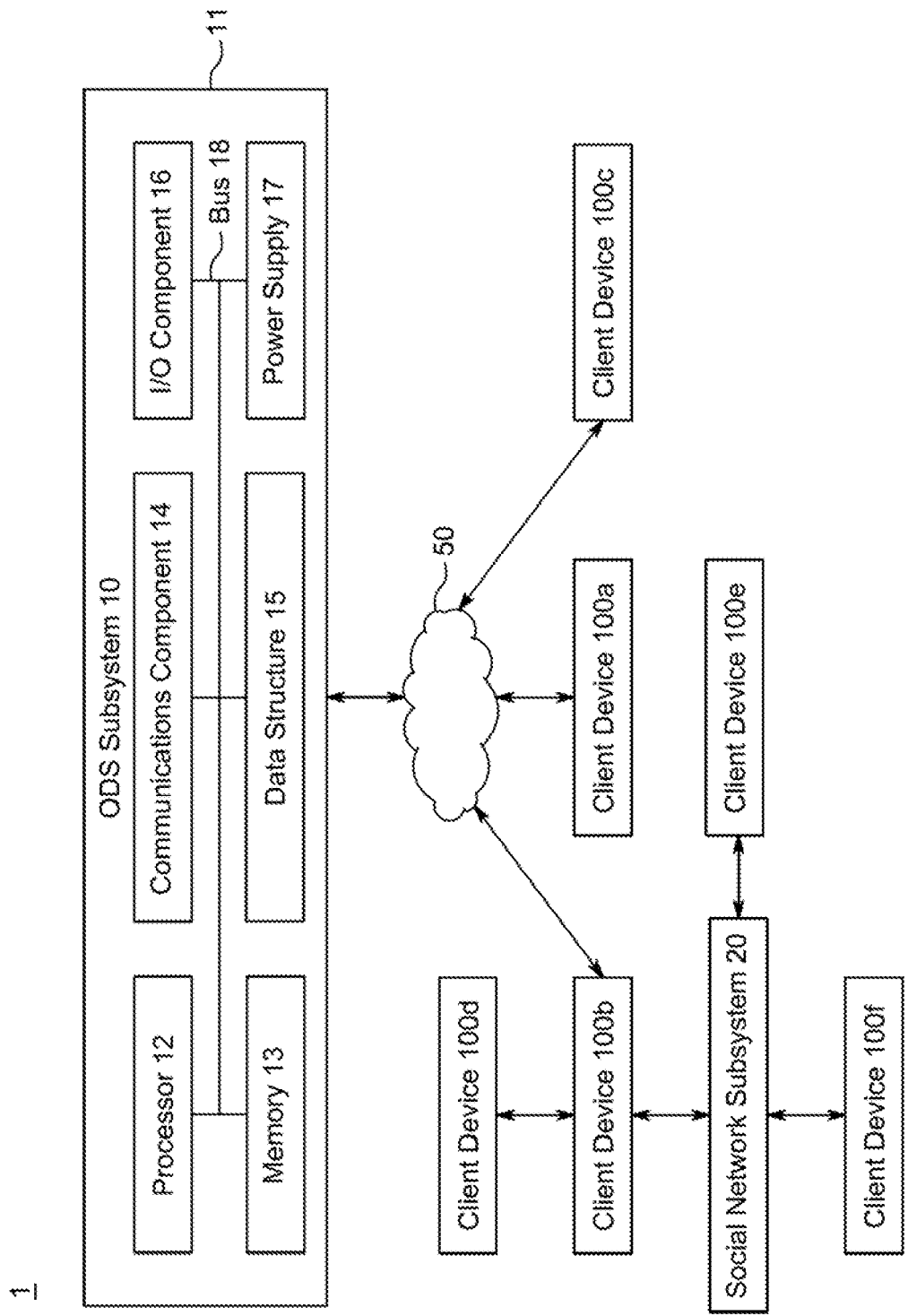
FIG. 1 is a schematic view of an illustrative system for a networking service of the disclosure.

Classic online dating services have become inefficient and less successful over recent years due to various factors including, but not limited to, (i) squatting or ghost profiles, where the service may represent the profiles of inactive users as active or available (e.g., via at least two possible mechanisms; the first example being a previous inactive subscriber whose profile is still on display, and in which any new member showing interest in said profile may trigger a sign of activity per the site, either due to said interest or due to some form of contact generated by the site due to the interest sent to the previous subscriber, and the second example being a current but inactive subscriber who happens to no longer be interested in meeting someone despite their status on the site, due to, but not limited to, such possibilities as currently dating in a serious exclusive relationship), which may be frustrating and deceptive to active users attempting to connect with these inactive users, (ii) deception, where certain users may misrepresent themselves by providing one or more pieces of false information (e.g., fake or outdated picture, incorrect age, incorrect occupation, etc.), which may be frustrating to users seeking other users with specific attributes, (iii) reliance on pictures and superficial information, which may make certain users feel shallow or like they are participating in a "meat market", and which may be less likely to result in a compatible match when compared with being set up by someone who knows the person, and/or (iv) user loneliness, where certain users may feel isolated if their profile is not selected by another user as a potential match and/or where certain users may feel lonely on empty nights in between successful dating experiences. Such problems may reduce the number of new users joining such services and/or may make for a frustrating user experience. This disclosure describes a novel interactive online dating experience that may address these problems and provide an enjoyable user experience.

For example, this new online dating service may facilitate a user seeking a partner to create a profile of itself and of its desired partner. Then, the service may assign that partner-seeking user to another member of the service (e.g., a DateBuddy® (or "DB")) based on any suitable information (e.g., based on a shared geographic area, shared interests, someone who may be similar to the desired partner described by the user, etc.). The service may facilitate the DB with information about the user (e.g., provide the DB with the ability to review the user's profile, pits and video) and enable to the DB to interact directly with the user to better understand what the user is about and what the user may be looking for in a desired partner. The service may then promote or otherwise stimulate the DB to search through all of its friends, neighbors, peers, acquaintances, and/or any other suitable people in any network of the DB to see who may be a good match as a potential candidate partner for the user assigned to that DB. Any candidates identified by the DB may then be enabled by the service to interact with the service (e.g., for free) and potentially connect with the DB's user, thereby giving the user and/or the candidate the option of pursuing each other if the interest exists. When a DB has offered all available candidates with the ability to interact with the service, the DB may indicate as much to the service, and the service may assign a new DB to the user and/or may assign the original DB to another user so as to repeat the process based on this new DB-user combination, thereby leveraging the unique set of people known to a particular DB in attempting to find a compatible partner for a particular user assigned to that DB. Even though a DB is not intended to be an actual candidate dating partner for the partner-seeking user assigned to the DB, the service may require that the user and DB feel comfortable with one another, as they may need to share certain personal information with one another and/or be in a certain form of direct contact in order to promote the function of the DB. Therefore, the service may be configured to offer the partner-seeking user and/or the DB with the opportunity to accept or decline each user-DB assignment suggested by the service prior to enabling such interaction Moreover, the service may not only assign a DB to a particular user, but the service may also offer the services of that particular user as a DB to another user of the service, such that a single user of the service may not only be afforded with the friendship and partner-finding services of an assigned DB but may also be afforded with the friendship and partner-yearning dependencies of another user.

This service improves upon currently known services and overcomes the above-described problems in many ways. For example, a DB's familiarity with its candidates may significantly reduce the problem of false representation in profiles, as the DB personally knows the people in its network. The candidates being provided by the DB may be required to actively interact with the service in order to potentially meet the DB's partner-seeking user, which may thereby negate the possibility of squatting, as the act of signing on in real-time may validate that the candidate is currently active and potentially interested in meeting the user. The service facilitates immediate contact between a user and a DB and promotes the maintaining of that contact during the process, thereby possibly creating a new friendship each time, and always giving both the partner-seeking user and the DB the opportunity to socialize when they might otherwise have been alone. This ability of the service to make a user less lonely may be overcome in two ways, not only by facilitating immediate contact between a user and its assigned DB but also by facilitating contact between that same user and another user that will rely on that user as a DB. The service can increase the chances of a successful date by not relying solely or significantly on pictures or other superficial information (e.g., age or occupation), as a DB knows their friends personally and far better than might an algorithm and/or a partner-seeking user by just reviewing someone's online profile. Moreover, through interaction facilitated by the service, the partner-seeking user and the DB may learn much more about each other than what may be reasonably learned by an algorithm and/or by review of someone's online profile, such that when a DB may choose a friend as a potential candidate for their partner-seeking user, the chances of a match are far greater.

Helping other people feels good and promotes user engagement with this service. DB-arranged connections between friends of the DB and the partner-seeking user assigned to the DB may be tracked by the service, thereby providing the opportunity to create rankings and eventually an auction/bid scenario for the services of certain DBs. Therefore, some incentives for a user to perform the function of the DB for the service may include, but are not limited to, (i) a benevolent feeling helping others, (ii) engagement in ongoing social contact and possibly friendship with person you are helping (e.g., not only your partner-seeking user but also your friends who you may choose as potential candidates for the user), (iii) tracking/ranking of the service may tap into the DB's competitive side and may track date contacts and maintain stats regarding the effectiveness and success rate of a particular DB, and (iv) each successful date or meeting or advancing level of engagement between a partner-seeking user and a candidate found by a DB may result in at least on reward for the DB, such as by a first reward (e.g., a "CharityBuck" ("CB")) and a second reward (e.g., a "BuddyBuck" ("BB")), where a CB may be a donation to the charity of choice of the DB as a show of thanks for helping another, and where a BB may be a discount that can be applied to a store that may be associated with the service, whose vendors may offer discounted products/services tailored to the singles/dating demographic (e.g., resulting in a unique monetization component for a dating service). Moreover, this service may tap into existing social networks and/or extend into its own social networking space (e.g., "BuddyNation®").

Figure 2:
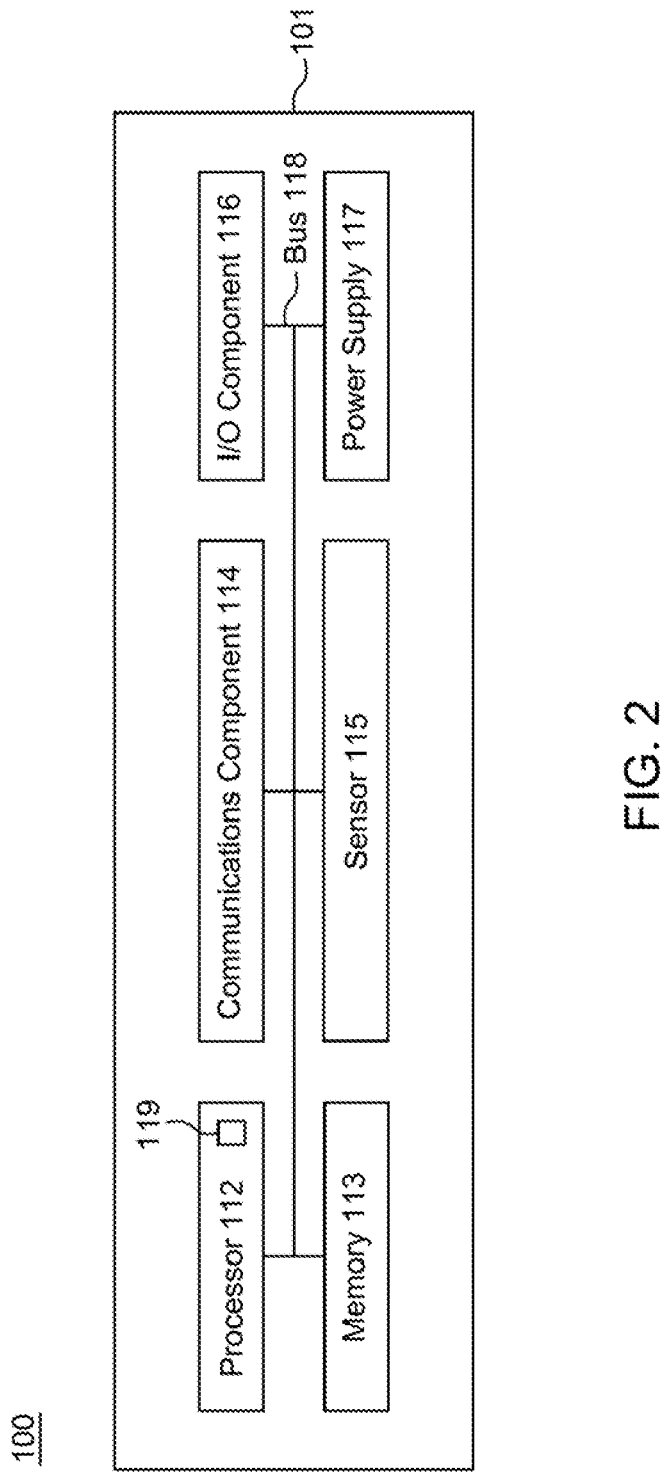
FIG. 2 is a more detailed schematic view of a client device of the system of FIG. 1.
Figure 6:
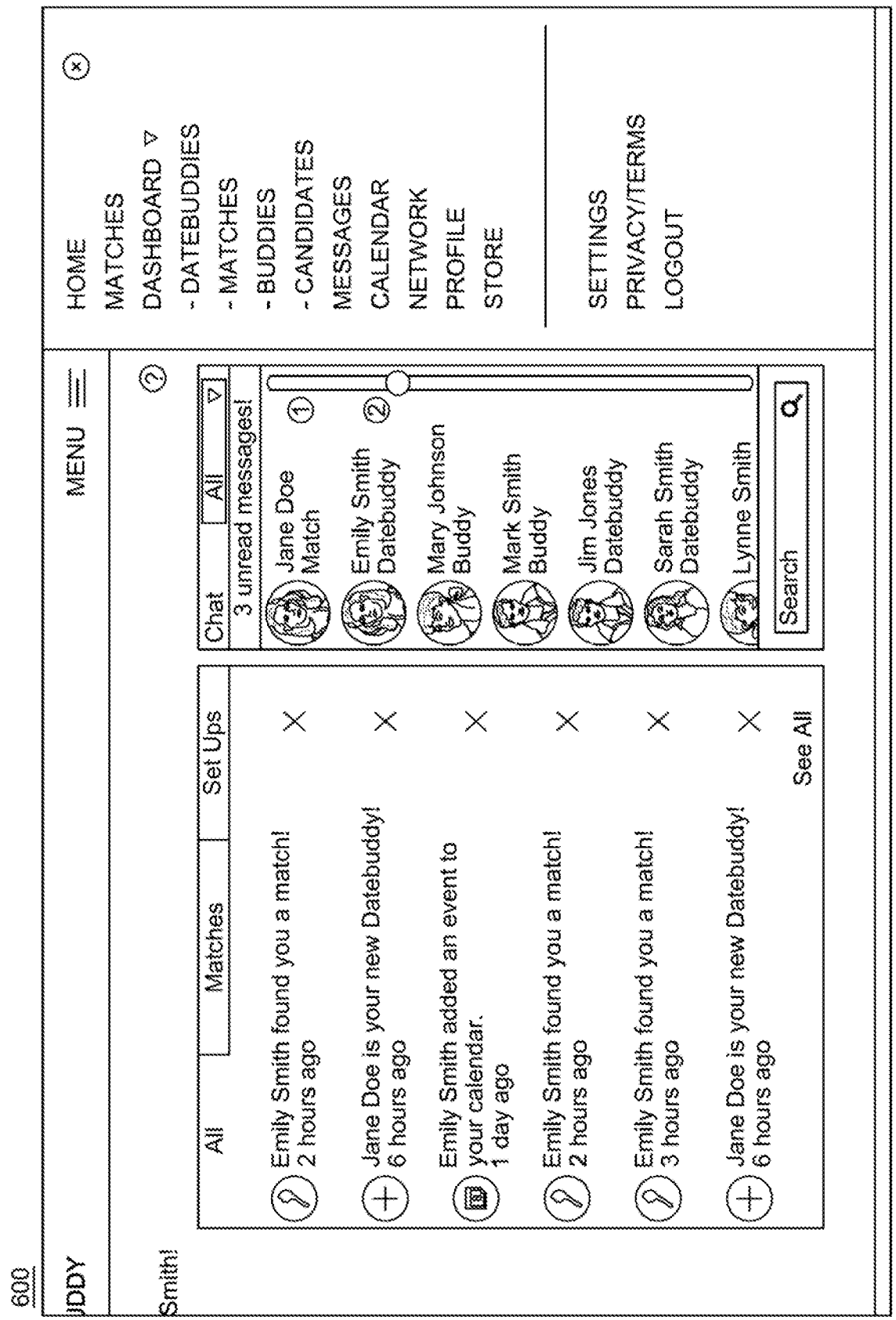

FIG. 1 shows a system 1 in which an online networking service may be facilitated amongst various users, FIG. 2 shows further details with respect to a particular embodiment of a client station 100 of system 1, FIGS. 3-35 show example screens 300-3500 that may be representative of a graphical user interface of a client station 100 during use of the online networking service, and FIGS. 36-39B are flowcharts of illustrative processes for using the online networking service.

Description of FIG. 1 and FIG. 2

FIG. 1 is a schematic view of an illustrative system 1 in which an online dating service may be facilitated amongst various users. For example, as shown in FIG. 1, system 1 may include an online dating service ("ODS") subsystem 10, at least one client station 100 (e.g., client stations 100a-100f), and a communications network 50 through which ODS subsystem 10 and at least one client station 100 may communicate.

As shown in FIG. 2, and as described in more detail below, a client device 100 may include a processor component 112, a memory component 113, a communications component 114, sensor 115, an input/output ("I/O") component 116, a power supply component 117, and/or a bus 118 that may provide one or more wired or wireless communication links or paths for transferring data and/or power to, from, or between various other components of device 100. I/O component 116 may include at least one input component (e.g., button, mouse, keyboard) to receive information from a user and/or at least one output component (e.g., audio speaker, video display, haptic component) to provide information to a user, such as a touch screen that may receive input information through a user's touch of a display screen and that may also provide visual information to a user via that same display screen. Memory 113 may include one or more storage mediums, including for example, a hard-drive, flash memory, permanent memory such as read-only memory ("ROM"), semi-permanent memory such as random access memory ("RAM"), any other suitable type of storage component, or any combination thereof. Communications component 114 may be provided to allow device 100 to communicate with one or more other devices 100 or servers or subsystems (e.g., ODS subsystem 10) using any suitable communications protocol (e.g., via communications network 50). Communications component 114 can be operative to create or connect to a communications network. Communications component 114 can provide wireless communications using any suitable short-range or long-range communications protocol, such as Wi-Fi (e.g., a 802.11 protocol), Bluetooth, radio frequency systems (e.g., 1200 MHz, 2.4 GHz, and 5.6 GHz communication systems), infrared, protocols used by wireless and cellular telephones and personal e-mail devices, or any other protocol supporting wireless communications. Communications component 114 can also be operative to connect to a wired communications network or directly to another data source wirelessly or via one or more wired connections. Sensor 115 may be any suitable sensor that may be configured to sense any suitable data for device 100 (e.g., location-based data via a GPS sensor system). Power supply 117 can include any suitable circuitry for receiving and/or generating power, and for providing such power to one or more of the other components of device 100. Device 100 may also be provided with a housing 101 that may at least partially enclose one or more of the components of device 100 for protection from debris and other degrading forces external to device 100. Each component of device 100 may be included in the same housing 100 (e.g., as a single unitary device, such as a laptop computer or portable media device) and/or different components may be provided in different housings (e.g., a keyboard input component may be provided in a first housing that may be communicatively coupled to a processor component and a display output component that may be provided in a second housing). In some embodiments, device 100 may include other components not combined or included in those shown or several instances of the components shown.

Processor 112 may be used to run one or more applications, such as an application 119 that may be accessible from memory 113 and/or any other suitable source (e.g., from ODS subsystem 10 via an active internet connection). Application 119 may include, but is not limited to, one or more operating system applications, firmware applications, communication applications, internet browsing applications (e.g., for interacting with a website provided by ODS subsystem 10 for enabling device 100 to interact with an online service), dating service applications (e.g., a web application or a native application that may be at least partially produced by ODS subsystem 10 for enabling device 100 to interact with an online service), or any other suitable applications. For example, processor 102 may load an application 119 as a user interface program to determine how instructions or data received via an input component of I/O component 116 or other component of device 100 may manipulate the way in which information may be stored and/or provided to the user via an output component of I/O component 116. As one example, application 119 may provide a user with the ability to interact with an online dating service of ODS subsystem 10, where application 119 be a third party application that may be running on device 100 (e.g., an application associated with ODS subsystem 10 that may be loaded on device 100 via an application market, such as the Apple App Store or Google Play) that may be accessed via an internet application or web browser (e.g., by Apple Safari or Google Chrome) running on device 100 that may be pointed to a uniform resource locator ("URL") whose target or web resource may be managed by ODS subsystem 10.

ODS subsystem 10 may include a processor component 12 that may be similar to processor 112, a memory component 13 that may be similar to memory component 113, a communications component 14 that may be similar to communications component 114, an I/O component 16 that may be similar to I/O component 116, a power supply component 17 that may be similar to power supply component 117, and/or a bus 18 that may be similar to bus 118. Moreover, ODS subsystem 10 may include one or more data sources or data structures 15 that may include any suitable data for facilitating an online dating service that may be provided by ODS subsystem 10 to one or more client devices 100. Some or all portions of ODS subsystem 10 may be operated, managed, or otherwise at least partially controlled by an entity responsible for providing an online dating service to one or more users.

ODS subsystem 10 may communicate with one or more client devices 10 via communications network 50. Network 50 may be the internet or any other network, such that when interconnected, a client device 100 may access information (e.g., from data structure 15 of ODS subsystem 10, as may be provided as a dating service via processor 12 of ODS subsystem 10) as if such information were stored locally at that client device 100 (e.g., in memory component 113).

Description of FIGS. 3-35

To facilitate the following discussion regarding the operation of system 1 for providing an online dating service with ODS subsystem 10 and at least one client device 100, reference is made to one or more processes of one or more flowcharts of FIGS. 36-39B, to various components of system 1 of the schematic diagrams of FIGS. 1 and 2, and to front views of screens 300-3500 of FIGS. 3-35 that may be representative of a graphical user interface of one or more client devices 100 during such an online dating service (e.g., a UI that may be provided via an I/O component 116 of device 100 to a user). The operation described may be achieved with a wide variety of graphical elements and visual schemes. Therefore, the embodiments of FIGS. 3-35 are not intended to be limited to the precise user interface conventions adopted herein. Rather, embodiments may include a wide variety of user interface styles.

As shown by screen 300 of FIG. 3, an ODS may initially provide a landing page that may be provided to any person who attempts to access a service of ODS subsystem 10 (e.g., by installing its application or accessing its website). Screen 300 may include a link to or automatic playback of a tutorial (e.g., a parallaxing tutorial) explaining one or more services that may be provided, an explainer video or text that may describe various features of the ODS, and/or the ability to create a new user account and/or to log-in to an existing user account in order to facilitate full access to one or more features. In some embodiments, the ODS may offer a user with the ability to create an account or log-in to a pre-existing account of one of various account types, such as an individual that may be using the service for seeking a partner (e.g., a member ("MEM")) who may participate in both the Buddy and DateBuddy roles, an individual (e.g., a candidate ("CAND")) that may not already be a member but that may have been invited by a member (e.g., by a MEM user acting in the matchmaker or DB role (DBM), or by an exclusive DB (DBE)) to meet another member (e.g., a MEM user acting in the Buddy role (BDM) or an exclusive Buddy (BDE)), an individual that may be using the service solely for performing the matchmaking or datebuddy ("DB") function (e.g., a DB-exclusive ("DBE")), and/or an individual that may be using the service solely for performing the partner-seeking or Buddy function (e.g., a Buddy-exclusive ("BDE")). Therefore, there may be at least four (4) user types that may utilize at least three (3) roles or pathways to access the ODS. Four user types may include MEM (combining BDM & DBM), CAND, DBE and BDE. Three roles, or pathways, may include Buddy (BD), Datebuddy (DB), and Candidate (CAND). Screen 300 may be the landing or home page for the ODS. It may be designed as a vertical or scrolling tutorial that may provide the first and most basic attempt at explaining the process. The initial pane may describe the assignment of a matchmaker, or Datebuddy. The second and third panes may describe some of the advantages of having a Datebuddy. The fourth pane may describe setting up your friends and may reference the concurrent function or role of participating as a Datebuddy for others, and cultivating new friendships as well. The fifth pane may mention the reward system and its relation to the set up process.

The first user type (e.g., user type 1 or new member or member or MEM) may be an individual interested in finding a new relationship or partner via the ODS. This MEM may utilize two pathways during its interaction with the ODS, such as pathway A and/or pathway B. If a MEM user utilizes Pathway A, also known as the Buddy role Pathway, they would be referred to as a MEM-user-as-BD or BDM. Pathway A may be a primary pathway where the individual may create a user account that may be descriptive of the user personally, of the user's preferences for a partner, and/or of the user's preferences for a DB who may function as a matchmaker for them (e.g., in response to one or more questions provided by the ODS). Such profiles may include the gender, age, weight, height, geographic location, occupation, interests, dislikes, etc. of the MEM user as well as the gender, age, weight, height, geographic location, occupation, interests, dislikes, etc. of the desired partner of that MEM user, and characteristic preferences of their prospective DB. Based on such information provided by a MEM user and information provided by the eventually matched DB (which may include the potential DB's personal information, their partner preferences (if they are a partner-seeking full member MEM) and their Buddy or user-as-buddy preferences (preferences regarding who they may help)) and any other information the ODS may have access to that may be relevant to the matching process, the ODS (e.g., based on algorithm driven logic) may identify at least one other user that may be a good matchmaker or DB for that MEM user. The ODS may allow for approval of both the MEM user as buddy (BDM) and the identified DB user (e.g., two-sided acceptance) before enabling each user to access a dashboard that can facilitate direct interaction/communication between the MEM user as buddy (BDM) and the DB user in order to equip the DB user with the most information possible to enable the most productive search for one or more candidate painters for the MEM user. Alternatively or additionally, such dashboards may enable both the MEM user and the DB user to monitor the status of the various recruited candidates. The ODS may also enable a MEM user to go to at least three additional locations, including two dashboards that may metric various awards that may have been granted to that user for their efforts up to that point, such as discounts ("BuddyBucks") and charity contributions ("CharityBucks"), either of which may eventually be incorporated back into the primary dashboard page, but for now may be shown separately for clarity, and a third location may be a social community page, which may allow the MEM user to monitor and share in a social network dashboard all the friends that they have made through previous ODS interactions e.g., DBs, candidates, etc.). Additionally, the ODS may be configured to link to a marketplace (e.g., an eStore) that may enable a user to redeem discounts for purchases, or to send a gift to someone. If a MEM user utilizes Pathway B, also known as the DateBuddy Role Pathway, they would be referred to as a MEM-user-as-DB or DBM. Pathway B may be an additional pathway for a MEM user for after that MEM user has created a profile and reviewed its dashboard(s), the user may (e.g., click on a second tab on a dashboard labeled "Buddies") access pathway B. This DBM may be assigned to a Buddy (either MEM-user-as-Buddy (BDM) or exclusive Buddy (BDE)) to help (the Buddy) locate a partner by offering to introduce their friends as candidates. The ODS may use any information that it deems relevant to enhance the compatibility of the algorithm match, including the DB preferences of the Buddy, the personal information and partner preferences of the Buddy, the personal information, partner preferences and Buddy preferences of the DBM, and may additionally consider any relevant metrics and/or history of activity on the site. Nearly identical to the first, this dashboard may be oriented in reverse and may be a dashboard for the MEM user to act as DB for another MEM user functioning in the Buddy role (may be either BDM or BDE). This dashboard may allow them to monitor the status of all the members they are or were helping. They can then link back to all the other links previously mentioned in pathway A. A MEM user acting in the role of DB may be referred to herein as a DBM user.

The second user type (e.g., user type 2 or candidate or CAND user) may be recruited by a DB (of any type) and may be invited (e.g., given a link/code) to access the ODS (e.g., for free) in order to be introduced by the ODS to a Buddy, who may be either a MEM user-as-Buddy (BDM) or a BDE, that the DB user is helping. Such a CAND user may enter the ODS via a pathway C, candidate role pathway, with a link, code, or any other suitable mechanism that may be associated with or uniquely related to the pairing of a Buddy(either MEM-user-as-Buddy (BDM) or individual exclusively acting as Buddy (BDE)) and respective DB user. The ODS may provide such a CAND user with the opportunity to create a profile similar to a new MEM user, and the CAND user may have an opportunity to assess his or her interest in the Buddy user that the DB user is suggesting by being provided with any suitable profile information of that Buddy user. In certain embodiments, the same user input information may be requested by both a user information input form for a CAND user as well as by a user information input form for a MEM user. In such instances, if a CAND user later chooses to also leverage the ODS as a partner-seeking user, a partial or full profile may already exist for that user. If a full profile is not created, it can be done so at a later time as mentioned below. The candidate may be asked to provide a limited profile, which may include their personal information list and their partner preferences. The ODS may be configured to enable a CAND user to create a profile and/or to review the applicable MEM user's profile whom the recommending DB user is representing, and to then extend a greeting to initiate contact between the CAND user and the Buddy user if each are interested in the other based on their review of each other's profile information and/or other information shared amongst the two users. If mutual interest is expressed, the ODS may link each one of the interested Buddy user and CAND user to a revised dashboard that may represent the status of their interactions. In some embodiments, the CAND user may not be presented with any dashboards for discounts or charity contribution tallies because these functions may not be available to them at this juncture. Should a CAND user's interaction with the suggested Buddy user fail (e.g., not result in a successful connection or attempted partnership), or should the CAND desire to expand their participation with the ODS, the ODS may offer that CAND user an opportunity to join the ODS as a MEM user (e.g., possibly for a discounted initial fee compared to an original MEM user), at which point such a CAND user turned MEM user may be able to back track through a profile creation process in a modified way to fill in the sections not initially done (e.g., certain desired partner information, DB preferences, user-as-DB or Buddy preferences, billing information, etc. that may be required for a MEM user but not a CAND user).

A third user type (e.g., user type 3 or a pure/exclusive DateBuddy or DBE) may have a role purely as a DB user and not also as a Buddy/MEM user (does not seek a partner and therefore does not desire to participate in Buddy role). An example of this may be an individual not looking for a partner but who may have friends that are looking for a partner. Such a DBE user may access the ODS via a pathway B exclusively, which may bypass some of the profile creation steps of pathway A, though it may include receiving information about the DBE user (e.g., geographic location, age, gender, etc.) including personal profile information and Buddy preferences and any other information, that may be deemed important for an algorithm that may be leveraged by the ODS to assign successful match-ups between partner-seeking Buddy and DB users (e.g., DBE users) and to provide information that a Buddy user may benefit from in assessing the fit for the prospective DBE who may help them. A DBE may then be provided with a dashboard that may be similar to pathway B, where the DBE may monitor the status of the Buddy user that they may represent (be helping). Unlike a CAND user, a DBE user may be participating in the matchmaking datebuddy function, and therefore may receive certain rewards for each connection they generate between their Buddy user and a discovered CAND user, and therefore a DBE user may also be provided with access to one or more mini-dashboards for tracking charity, discount, and/or other rewards similar to pathway A. A DBE user may also have access to an eStore and/or a social community of the ODS. The social community may have variable access depending on the role(s) of participation in the overall process, such as the range of community visibility or function.

The function of a DB may therefore result from two different roles utilizing Pathway B of the ODS, a MEM user acting as DB (DBM) and an exclusive DB (DBE). In the case of a MEM user, they may act as a Buddy (BDM) and may also concurrently act as a DB (DBM) for another partner-seeking member (BDM or BDE). Additionally or alternatively, a matchmaking DB function may be performed by a DBE user who may access the ODS solely for that purpose. In both cases, a version of a demographic profile of a user may be leveraged for an algorithm that may be used to link a DB user to a partner-seeking user. This may include personal information, partner preferences (if a DBM) and Buddy preferences. For a DBE user (e.g., via pathway B), the DBE user may be provided with a modified user information input form that may be focused on data needed for that DB-MEM linking algorithm as well as provide information that a Buddy user may benefit from in assessing the DBE's fit. In such instances, a MEM user profile may be more extensive with respect to the user information input by the user during generation of that MEM user profile, but only certain portions of that MEM user profile may be leveraged for an algorithm that may be used to link a DB user to a partner-seeking user. In other embodiments, the same user input information may be requested by a user information input form for a DBE user as well as by a user information input form for a partner-seeking MEM user. In such instances, if a DBE user later chooses to also leverage the ODS as a partner-seeking MEM user, a full profile may already exist for that user. A fourth user type may be a user acting solely as a Buddy, or BDE. This user is similar to user Type 1 in that they are also partner-seeking, though unlike user type 1, they are not participating in the DB function, and will use Pathway A exclusively. They may be asked to provide information that may be useful for the ODS algorithm to provide the most successful Buddy-DB match, and that also may allow the potential DB the opportunity to review their profile and assess their fit as Buddy. This information may include personal profile information, partner preference criteria and DB preference criteria. Should they refuse a DB offered by the ODS, they may be placed back in the algorithm pool to be re-assigned, and any response they provide associated with their rejection may be integrated in some way to the algorithm to improve the chance of compatibility of the algorithm going forward. Similar to the CAND user, since they may not participate in the DB function, they may not receive rewards that are classically associated with some aspect of the DB role, and therefore they may not have access to the dashboards associated with the different reward structures. However, there may be an embodiment in the ODS that may allow for a reward structure to be assigned in a non-conventional way. For users that participate in one of the exclusive pathways, either the DBE (exclusively a Datebuddy function) or BDE (exclusively a Buddy function), the ODS may leverage less than the total amount of user information which may be asked to input for a full MEM user who participates in both roles. For this reason, the input forms requesting information may be a subset of the total information, only that needed by the ODS to most effectively populate the algorithm for their given role, or they may be asked initially to input more or all of the information asked of a full MEM user. If their input information is partial, then should they ever decide to advance their participation to include additional roles, the ODS may request further input information to allow for most effective data to run the algorithm. If they provide all the information initially, then should they ever decide to advance their participation, the ODS may already have access to the appropriate data. A MEM user, who participates in both the Buddy and DB roles, may be asked for their personal information, their partner preferences, their DB preferences and their Buddy preferences. The CAND may be asked for their personal information and their partner preferences. The exclusive DB, or DBE, may be asked for their personal information and their Buddy preferences. The exclusive Buddy, or BDE, may be asked for their personal information, their partner preferences and their DB preferences.

Therefore, the ODS may be configured to provide at least five (5) types of UI dashboards, including, but not limited to, (i) a dashboard for the Buddy role (MEM user as BD (BDM) or a BDE) that may be following its interactions with one or more CAND users recommended by a DB user as well as may show all other past and present DB users with their respective CANDs for that Buddy user (e.g., pathway A), (ii) a dashboard for a user acting as a matchmaking DB user (DBM or DBE), for another Buddy user (e.g., pathway B) that may show all present and past Buddy users they have helped along with the respective CANDs that have been offered to them, (iii) a dashboard for a CAND user that may be following its interaction with a Buddy user for which they have been recruited by a DB user (e.g., pathway C), (iv) a dashboard for a DBE user that may be following its' assigned present and past Buddy user's interactions with any suggested CAND users (e.g., pathway B), and/or (v) a dashboard for a Buddy user acting solely in that role, not participating in the DB role, which may follow all present and past interactions with one or more candidates users recommended by a DB user as well as may show all other past and present DB users with their respective Candidates for that Buddy user. Types (i) and (v) may be essentially identical, as may be types (ii) and (iv). The various types of individuals interacting with the ODS may be a partner-seeking MEM user (e.g., a paid member or full member of the ODS) who may act as a partner-seeking Buddy (e.g., a BDM) and also as a DB user acting in a role as matchmaker (e.g., a MEM user as DB (e.g., a DBM), a pure Buddy individual (e.g., a BDE) who may not also act in the DB role and a pure DB individual that is not also a partner-seeking user (e.g., a DBE)), and a CAND user acting as a suggested partner for a partner-seeking user (Buddy) by a DB user. In some embodiments, the ODS may be configured to charge a fee to certain user types at certain times. For example, a MEM user may be charged an initial ODS fee when generating a complete MEM user account and/or may be charged a fee for every month or other time frame that the MEM user account is maintained. Alternatively, the ODS may enable a CAND user account to be created for free or for a reduced charge, but then may require an additional fee if/when such a CAND user is upgraded to a MEM user or other account and/or after any other suitable event (e.g., if/when such a CAND user is affirmatively connected with a MEM user). A DBE user (e.g., a user that may exclusively interact with the ODS as a DB but not as a MEM user) may be enabled by the ODS to create a DBE account for free or a reduced fee that may be less than that for a MEM user account. A sole BD, or BDE, may be charged in a similar fashion as compared to a MEM user, with the possibility of an incrementally higher charge.

Figure 4:
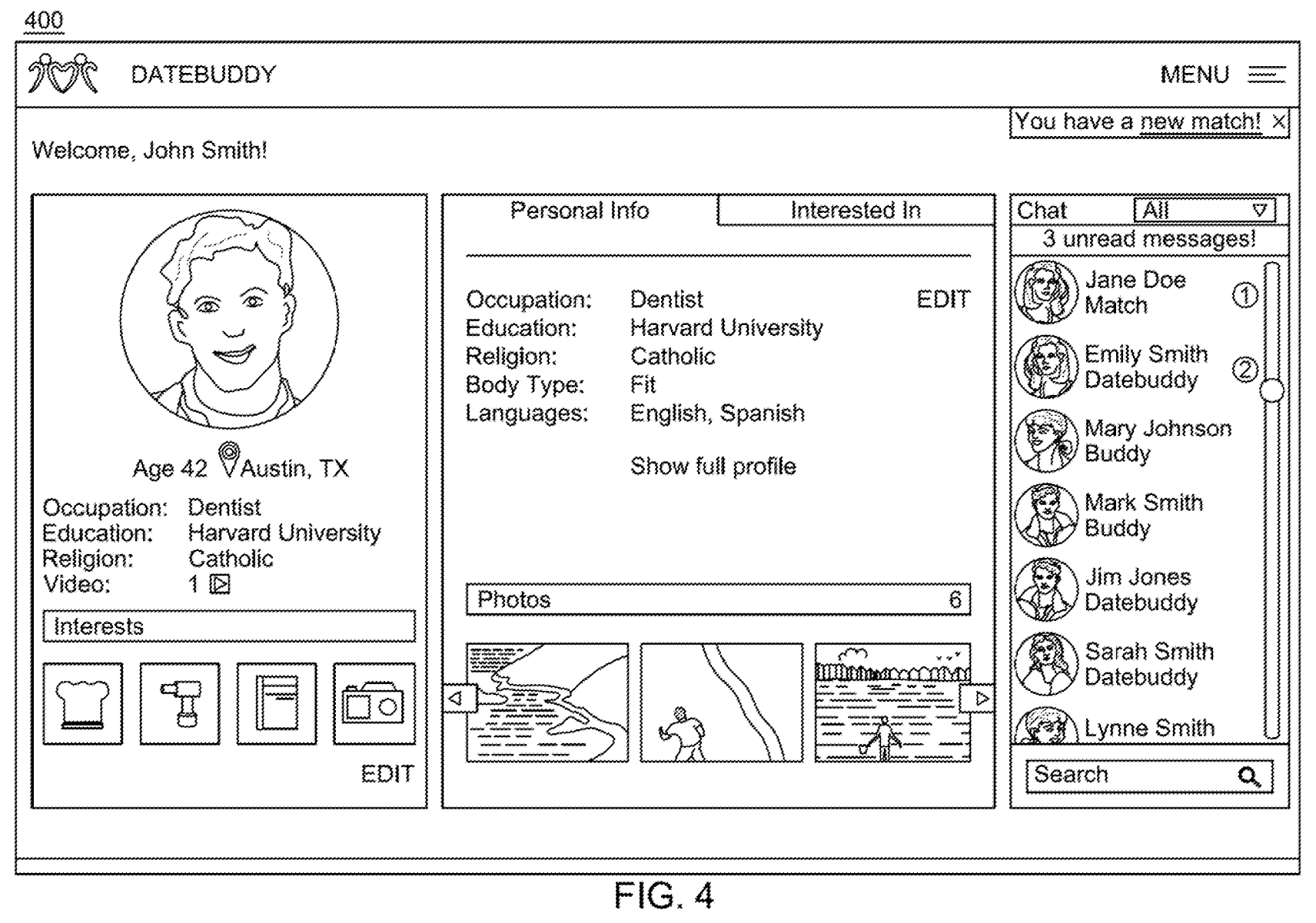

As shown by screen 400 of FIG. 4, an ODS may provide a MEM user profile page (e.g., a member profile screen) when a user chooses to interact with the ODS as a MEM user (e.g., along pathway A). Screen 400 may include providing the ability to create, edit, and/or simply view an existing profile. As shown, profile page of screen 400 may include, among various other features, the ability for a MEM user to upload or otherwise provide one or more pictures, videos, or other data in any suitable formats to the ODS that may be representative of the MEM user (e.g., "personal" information) and/or representative of the desired future partner that the MEM user may be desirous of (e.g., "interested in" information). Personal information may include, but is not limited to, biographical data, demographical/geographical data, and/or detailed information about the hobbies, activities, and topics of interest ("HAT" criteria of the user), including graded responses and narrative responses, where narrative responses may involve a description of a user's self-perception of personality, beliefs, and values. This personal information may include, but is not limited to, user responses to one or more examples of the following (i.e., personal information list):

I am a (e.g., male, female, etc.)
Interested in meeting (e.g., male, female, etc.)
My birthdate is ?
My zip code is ?
I am interested in a [ . . . ] relationship (e.g., exclusive, etc.)
Height
Weight
Body style
Hair color
Eye color
Facial features
Ethnicity
Language (primary)
Language (secondary)
Education
Career
Income
Religion and Importance
Pets
Kids
Marriage history and/or history of long-term relationships
Smoking
Drinking
Drugs (where legal)
Exercise
Astrology
Cultural background
Hometown
Hobbies (e.g., chess)
Activities (e.g., rollerblading)
Areas of interest (e.g., jazz)
Describe yourself
How would your friends describe you?
What are your strengths and weaknesses?
Upload at least one picture of yourself here
Upload at least one video of yourself here
Select at least one charity to be rewarded here Some or all of this personal information may be ranked according to importance of the user (e.g., multiple hobbies may be ranked based on importance to the user). Some of this personal information may be made visible to other users while other information may not be visible to other users, such as an assigned DB. At a user's profile page, a user may also choose one or more charities that may be used by the ODS for the purpose of fulfilling the redemption of CharityBucks that may be rewarded at certain events (e.g., achieved levels of engagement such as whenever a date for a connection is achieved). All such information for a user profile may be provided by a user to an ODS (e.g., from a user's interaction with a client device 100 of FIG. 1 to an ODS subsystem 10 of FIG. 1).

Information for a user's prospective partner may include, but is not limited to, biographical data, demographical/geographical data, and/or detailed information about the hobbies, activities, and topics of interest ("HAT" criteria of the user's prospective partner), including graded responses and narrative responses, where narrative responses may involve a description of a user's expectations and hopes about their prospective partner's character and personality. This partner preference information may include, but is not limited to, user responses to one or more examples of the following (i.e., partner preference list):

Gender of the partner
    Sexual Orientation of the partner
    Radius of the partner from my zip code [ . . . ]
    Radius of the partner from another zip code
    Miles of the partner from zip code
    Age range of the partner
    Height range of the partner
    Weight range of the partner
    Body style of the partner
    Ethnicity of the painter
    Education of the partner
    Language of the partner
    Career of the partner
    Income of the partner
    Religion of the partner and importance thereof
    Pets
    Kids
    Marriage history and/or history of long-term relationships
    Smoking
    Drinking
    Drugs (where legal)
    Exercise
    Astrology
    Hair color of the partner
    Eye color of the partner
    Facial features of the partner
    Hobbies of the partner
    Activities of the partner
    Areas of interest of the partner
    Describe what I am looking for in a partner
    What things do I value most in a partner?
    What things are not important to me about my partner?
    Describe my expectations of a partner on the average day Some of this partner preference information may be ranked according to importance of the user (e.g., multiple hobbies of a potential partner may be ranked based on importance to the user, or if a user is open to dating partners of different body styles, each body style may be ranked by the user based on interest level). Some of this partner preference information may be made visible to other users while other information may not be visible to other users, such as an assigned DB.

At a user's profile page, a user may also choose one or more desired characteristics of a DB that may be assigned to that user. This information may allow for further expansion of the demographic range for use in algorithm DB-MEM matching, while trying to minimize the potential for an undesirable assignment. For example, information describing a user's DB (or DB preference) may include, but is not limited to, biographical data, demographical/geographical data, and/or detailed information about the hobbies, activities, and topics of interest ("HAT" criteria of the user's DB), including graded responses and narrative responses, where narrative responses may involve a description of a user's expectations and hopes about their DB's character and personality. This DB preference information may include, but is not limited to, user responses to one or more examples of the following (i.e., DB preference list):

Gender of the DB
    Sexual Orientation of the DB
    Radius of the DB from my zip code [ . . . ]
    Radius of the DB from another zip code
    Miles of the DB from zip code
    Age range of the DB
    Ethnicity of the DB
    Education of the DB
    Language of the DB
    Career of the DB
    Income of the DB
    Religion of the DB and importance thereof
    Pets
    Kids
    Marriage history and/or history of long-term relationships
    Smoking
    Drinking
    Drugs (where legal)
    Exercise
    Astrology
    Hobbies of the DB
    Activities of the DB
    Areas of interest of the DB
    Describe what I am looking for in a DB
    What things do I value most in a DB?
    What things are not important to me about my DB?
    Describe my expectations of a DB on the average day DB preferences may also extend to DB metrics, which may include preferences associated with metrics related to rankings, history of success measured via any logical manner, statistics on number of CAND, Number of successes, number of DB matches, overall attempts, average time as DB, total time as DB, ranking and statistics of their associated CANDs. Some or all of this DB preference information may be ranked according to importance of the user. Some of this DB preference information may be made visible to other users while other information may not be visible to other users, such as an assigned DB. For example, certain profile information may be made available to a DB but not to a CAND associated with the user. In some embodiments, an algorithm for matching a MEM user with a DB user may leverage the partner preference information of the MEM user's profile, and may in addition leverage any DB preference information of the MEM user's profile. However, by accepting and leveraging DB preference information of a MEM user's profile in a MEM-DB matching algorithm, such a matching algorithm may be expanded to allow more customization. For example, while a MEM user may be a single male seeking a single female as a preferred dating partner, that MEM user may prefer a matchmaker DB that is a non-single male rather than a single female, as the single male MEM user may be more comfortable working with a male matchmaker DB. As another example, while a MEM user may be a single male seeking a single Caucasian female as a preferred dating partner, that MEM user may not have any preference with respect to the race of the matchmaker DB and may be perfectly fine with an Asian female as a matchmaker DB. In addition the ODS may be configured to receive feedback or otherwise determine information indicative of why a DB-MEM recommended match was accepted or declined, and may leverage such information for updating the effectiveness of the DB-MEM algorithm for future use.

At a user's profile page, a user may also enter certain information with respect to that user acting as a matchmaker DB (either a DBM or a DBE) for another user (MEM user acting as Buddy or a BDE) called Buddy Preferences. For example, information describing a user's ability to act as a DB may include, but is not limited to, biographical data of the buddy user, demographical/geographical data of the buddy user, and/or detailed information about the hobbies, activities, and topics of interest ("HAT" criteria) of the user including graded responses and narrative responses. The user as DB (either as DBM or DBE) may provide preferences for their potential Buddy (either BDM or BDE) they may be assigned to help, referred to as Buddy Preferences. This Buddy preference information may include, but is not limited to, user responses to one or more examples of the following (i.e., user-as-DB list):

I am a (e.g., male, female, etc.)
My birthdate is
My zip code is
Ethnicity
Language (primary)
Language (secondary)
Education
Career
Religion and Importance
Pets
Kids
Marriage history and/or history of long-term relationships
Smoking
Drinking
Drugs (where legal)
Exercise
Astrology
Hobbies
Activities
Areas of interest
Describe myself
Why do you want to be a datebuddy?
Upload your picture here
Upload your video here
Link to your social networks
Charity List
Interested in being a datebuddy for a (e.g., gender of DB's partner-seeking user)
Who is looking to meet a (e.g., sexual orientation of DB's partner-seeking user)
Radius of the DB's partner-seeking user from my zip code [ . . . ]
Radius of the DB's partner-seeking user from another zip code
Miles of the DB's partner-seeking user from zip code
Age range of the DB's partner-seeking user
Ethnicity of the DB's partner-seeking user
Education of the DB's partner-seeking user
Language of the DB's partner-seeking user
Career of the DB's partner-seeking user
Income of the DB's partner-seeking user
Religion of the DB's partner-seeking user and importance thereof
Pets
Kids
Marriage history and/or history of long-term relationships
Smoking
Drinking
Drugs (where legal)
Exercise
Astrology
Hobbies of the DB's partner-seeking user
Activities of the DB's partner-seeking user
Areas of interest of the DB's partner-seeking user
Describe what I am looking for in a DB's partner-seeking user
What things do I value most in a DB's partner-seeking user?
What things are not important to me about my DB's partner-seeking user?
Describe my expectations of a DB's partner-seeking user on the average day
My pool of candidates may be described as (e.g., gender, sexual orientation, age, locations, interests, etc. of my candidate pool (e.g., of my friends)

Some or all of this user-as-DB (Buddy) preference information may be ranked according to importance of the user. Some of this user-as-DB (Buddy) preference information may be made visible to other users while other information may not be visible to other users, such as an assigned partner-seeking user. The information provided by a given user may include their personal information, their partner preferences, their DB preferences and their Buddy Preferences. The ODS may leverage any or all of these components from one or both parties involved in the DB-Buddy match made by the algorithm. The ODS may allow any or all of this information, or none at all, to be visible to any given participant in this process. The ODS may in addition leverage any other information which may increase the efficacy of the process, and thus the compatibility of the match. This information may include any feedback by any role type from previous matches, accepted or rejected, any metrics of the role types or preferences related to same, any history of behavior on the site participating in any role, either overt, such as feedback response to a previous match, or covert, such as a pattern of behavior associated with a visual pattern, such as the data available via photos and videos, or a description of visual information (an example of this may be noting a pattern of response that is positive or negative in relation to a visual attribute of another party, such as DB, or any role for that matter, even if it is not consciously known or reported in the user responses), or any other information that the ODS may have access to that could benefit the efficacy of the algorithm.

Some of this user-as-DB (Buddy) preference information may be the same as some of the other information that may have been provided by a user (e.g., a specific user's gender, location, etc. may be requested both as user personal information for a MEM user and as user-as-DB information for a DBM user), while only user-as-DB information may be requested for a DBE user who is not also interacting with the ODS as a partner-seeking MEM user. For example, as mentioned earlier, for a DBE user (e.g., via pathway B), the DBE user may be provided with a simplified user information input form that may be focused just on data needed for that DB-MEM linking algorithm (e.g., user responses to one or more examples of the above user-as-DB or Buddy preferences list and personal information) and to provide information that a MEM user as Buddy may benefit from in assessing the fit for the DB role. In such instances, a MEM user profile may be more extensive with respect to the user information input by the user during generation of that MEM user profile (e.g., user responses to one or more examples of the above personal information list, partner preference list, DB preference list, and user-as-DB list), but only certain portions of that MEM user profile may be leveraged for an algorithm that may be used to link a DB user to a partner-seeking MEM user. In other embodiments, the same user input information may be requested by both a user information input form for a DBE user as well as by a user information input form for a MEM user. In such instances, if a DBE user later chooses to also leverage the ODS as a partner-seeking user, a full profile may already exist for that user, or, if not, they may further interact with the profile creation process to supplement or complete their profile. As another example, a CAND user (e.g., via pathway C) may only be provided with a simplified user information input form that may be focused just on data needed for that CAND user that may be shared with a MEM user (e.g., user responses to one or more examples of the above personal information list and the partner preference list, but not the DB preference list and not the user-as-DB list). In other embodiments, the same user input information may be requested by both a user information input form for a CAND user as well as by a user information input form for a MEM user. In such instances, if a CAND user later chooses to also leverage the ODS as a DB, a full profile may already exist for that user. And if does not, then the user can participate in a modified profile creation process, which may include the information not already obtained to complete should the information be needed at a later time, either due to a change in the ODS needs for information, or to a change in the level of participation of the user.

Certain portions or all of the personal information of a MEM user's profile may be provided in one or more suitable formats to a DB linked to that MEM user. The ODS may be configured to automatically share only certain components of the profile information and/or all of the profile information of a MEM user with an associated DB user (e.g., information that may be relevant for a DB user to determine whether or not he or she wishes to work with that MEM user, and/or information that may be relevant for a DB user to determine which of his or her friends may be good candidates for the partner-seeking MEM user). Additionally or alternatively, the MEM user may be able to choose which information of its user profile may be shared with an assigned DB. Similarly, the ODS may be configured to automatically share only certain components of the profile information and/or all of the profile information of a DB user with an associated MEM user (e.g., information that may be relevant for a MEM user to determine whether or not he or she wishes to work with that DB). Additionally or alternatively, a DB user may be able to choose which information of its user profile may be shared with an assigned MEM user.

The ODS may leverage certain or all data of a MEM user's profile and certain or all data of a DB user's profile with any suitable MEM-DB linking algorithm that may effectively match a MEM user with a suitable DB while also reducing to the degree possible the possibility of a negative interaction between the MEM user and a suggested DB user. Such information may include, but is not limited to, the following:

A) Geographical—The ODS may be configured for an initial geographical input that may be based on zip code, but the ODS may allow input for a range of zip codes or variable distance from a zip code or from multiple zip codes (e.g., if user has multiple locations that he is interested in or visits often). The ODS may utilize a zone larger than the input range, and may consider a proportional relationship to the range input. The ODS may also be influenced by the membership availability from a geographical perspective.

B) Gender (e.g., male, female, etc.)

C) Sexual Orientation

D) Age—this may utilize a sliding scale methodology. The ODS may use an X year sliding scale whose midpoint may be calculated from the basis of the range listed under partner preferences. As just one example, the ODS may start with the range input, calculate it's midpoint, calculate the delta between that midpoint and age of member, cap the delta at some number Y, multiply that midpoint after it is calculated by some variable Z.

E) Ethnicity

F) Religion and importance thereof

G) Education (may consider broadening beyond preferences)

H) Pets

I) Kids

J) Marriage history and/or history of long-term relationships

K) Smoking

L) Drinking

M) Drugs (where legal)

N) Exercise

O) Astrology

P) Career/Occupation

Q) hobbies, activities, and topics of interest ("HAT" preferences/criteria)—The ODS may allow for some variable prioritization, such as, the following list, which may be an example of and a possible prioritization of HAT criteria when taken into consideration by an ODS algorithm, where HAT criteria may not only be designated as interested or not, but also may be given a rating, such as lo, med, hi, or possibly 1-5 from little to lots of interest, where "specific" may refer to individual HAT criteria, while "category" may refer to a grouping of similar HAT criteria together, such as "field sports," then taking an average of their rankings, and then may let the algorithm address them in that manner:

1) Specific Hi

2) Specific Medium

3) Category Hi (Categories are groups of similar H's, A's or T's)

4) Category Medium

5) Specific Lo

6) Category Lo

R) DB success history (e.g., ranking, stats, etc.)—by maintaining metrics that may include a number of DB-MEM interactions, number of CANDs offered, number of matches accepted, number of matches resulting in meetings, number of matches resulting in any level of engagement, ratios derived from the same, and the like, may improve various functionalities of the ODS.

S) DB experience—by maintaining metrics that may include a number of DB-MEM interactions, time parameters, such as duration/average duration of DB-MEM interactions, duration of time performing DB role, and the like, may improve various functionalities of the ODS.

Depending upon demographic availability at any given time of the algorithm function, the ODS may consider the following adjustments to a basic algorithm if a particular demographic pool is limited:

A) Geographic—will consider expanding the range
B) Age—will consider adjusting the sliding scale variables to allow for greater inclusion
C) Education—will consider expanding achievement level
D) HAT criteria—will consider expanding inclusionary parameters or diminishing exclusionary criteria If a user profile creation phase of the ODS may allow for user specific information representative of the user's preferences for the choice of an assigned DB to extend beyond the preferences chosen for a partner's preference (e.g., if user responses to one or more examples of the above DB preference list may extend beyond user responses to one or more examples of the above partner preference list), then those preferences may be leveraged by the ODS algorithm for selecting a DB for a user. The novel aspects of this process may include using a matching process for a matchmaking role rather than for a potential partner role, the increased likelihood in probability of the ODS facilitating the finding of a partner by finding their friend (taking advantage of the increased probability of shared or similar characteristics among friends relative to the population at large (random sample matched for age range and sex)), which may afford significantly more accessibility than a classic matching process where the site is required to identify the actual partner usually from membership. This process may only need to find a friend or acquaintance of this potential partner, which is statistically far greater in likelihood. Another novel aspect is the gamification of the process, where participation may lead to a potentially desirable sense of pursuit of a challenge. To aid in this aspect, metrics may be tracked, which may be visible to any particular role or not, including such trackable events as rankings, which may be based on information which may include number or percentage of matches accepted, number of CAND offered, and other trackable events which may include duration of average DB event per match, or total time participating in DB role. Another novel aspect is the potential to cultivate friendships in the context of multiple simultaneous interactions of a benevolent nature, increasing the likelihood of such friendships forming. Another novel aspect is the potential to track the level of engagement of matches, creating a unique profile parameter which may aid the algorithm to more effectively result in successful matchmaking Other trackable events may include identifying patterns in the detailed match profiles that are selected by the user, dismissed by the user, parsed by level of engagement by the user, facial recognition technology to track characteristics filtered as above, that may not only aid the algorithm to provide a better outcome, but may also be used to fuel a direct matching algorithm with unique covert profile parameters to result in a more highly accurate matching process compared with current alternatives using direct matching algorithms.

In some embodiments, after a user may create, edit, or otherwise view its profile (e.g., at screen 400 of FIG. 4), the ODS may enable a user to access a notification page, which may provide any suitable information about the status of any connections, contacts, and/or assignments that may have been made for that user. For example, as shown by screen 500 of FIG. 5, and, in more detail with an overlay by screen 600 of FIG. 6, an ODS may provide a user navigation page after a user has successfully created a user profile. Screens 500 and 600 may include the ODS providing the user with the ability to see all notifications, only notifications regarding matches with a CAND and/or a DB, and/or only notifications for set-ups made by that user as a DB for other users. Moreover, as shown by screen 600, an overlay menu option may provide various options to a user, such as the ability to jump between dashboards, a message center, a calendar, various networks, a store, the social community and the like. Such a notification page may notify the member of all possible interactions that they may be involved in via the Datebuddy process. This may include their membership status, their profile creation progress, their assignments to another member, whether it be a Datebuddy to help them, or a Buddy they will be helping, the offer of a new match provided by their Datebuddy, the status of a Candidate they are offering to a Buddy they are helping, whether that Candidate has signed on, and if the match has been accepted, the status of all direct relationships as well, and any event invitations or event status changes that may occur. This may also show any administrative alerts, and information or changes in the member's reward or tracking metrics. This may also alert the individual as to any new contacts directed to them through any possible mechanism available on the site.

In some embodiments, the ODS may enable, support, and/or facilitate page/sub-page functionality. For example, page or sub-page may launch whenever a user may be attempting to message another user via an internal communication service of the ODS. For example, when a user is interacting with a dashboard of the ODS as a MEM user looking at dating candidates, and that MEM user indicates in any manner a particular candidate (e.g., hovers with a UI element over a picture or other identifying information of that candidate), a drop down menu may open with an option to send the candidate a communication (see, e.g., a gray drop down of screen 1100 of FIG. 11, which may be similar to that of screen 800 of FIG. 8, while screen 1200 of FIG. 12 may be provided to depict a history of a relationship (e.g., between the active user and Jane Doe on the ODS)). When a user may choose that option, a list (e.g., a scrolling list) of some or all previous interactions between the user and the identified candidate may be triggered, such that the user may be refreshed with respect to their interactions on the ODS (e.g., view old messages, last message from user and whether it is new and unread or not, and then a text area to write a new message). Considerations may include launching a new page when such an option is selected with profile of target for message and the scrolling dialogue, potentially with unread messages, either flagged or colored, and potentially with the option to close this window when done. Alternatively or additionally, the ODS may be configured to launch a partial page as a component of the primary page that the user is already on. For such an option, a dashboard may include as a component an area where active dialogue may be tracked in some organized manner, somewhat like a social network scrolling wall. Gears that may be shown in any drawing associated with this disclosure may allow the following functionality in a drop down menu format, including chat, messaging, viewing the profile of the picture, sending a gift to the user pictured, inviting the user to any form of calendar event (see below), setting the user up if that relationship is allowable by the ODS process, complaining about and dismissing the user pictured.

Figure 7:
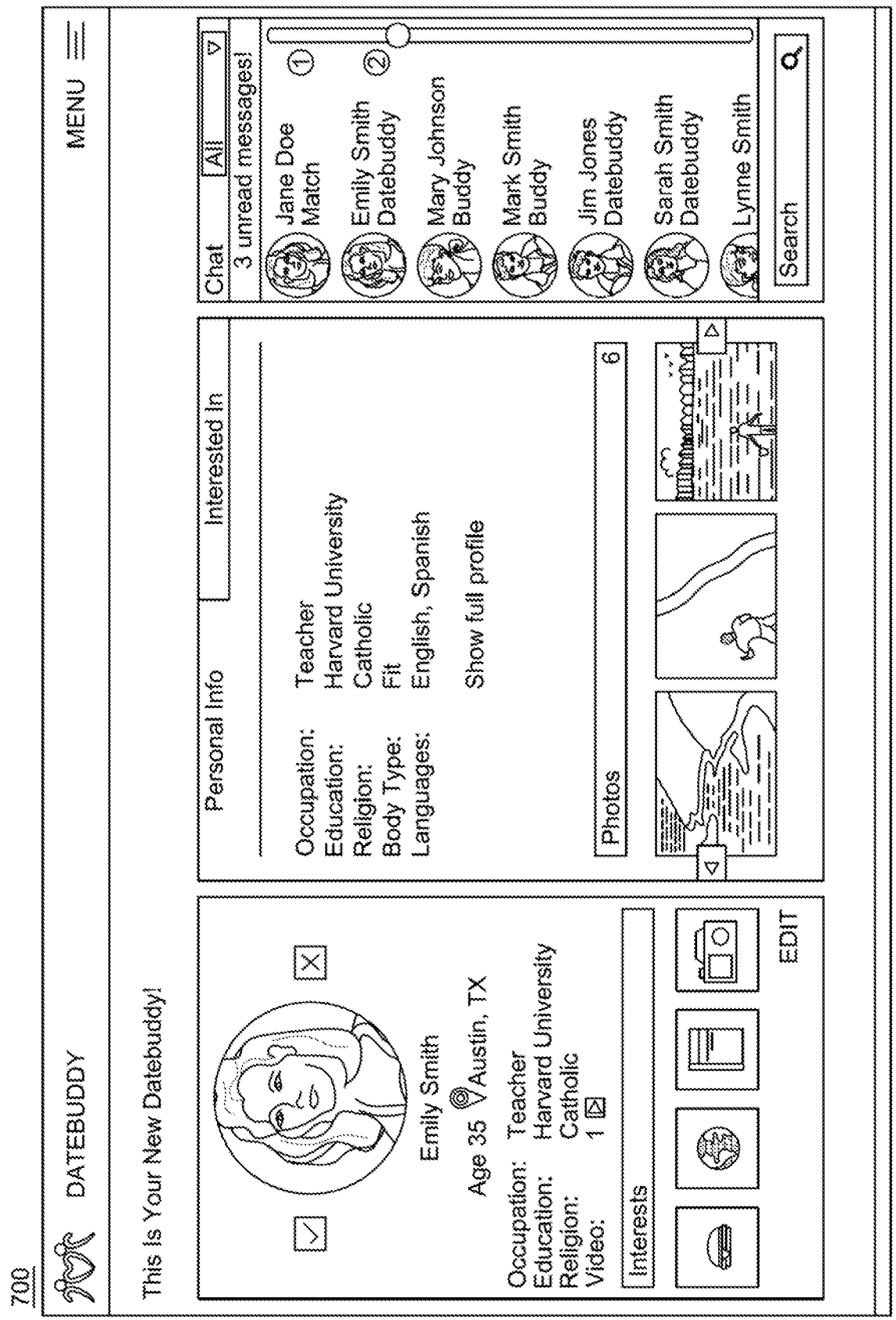
Figure 8:
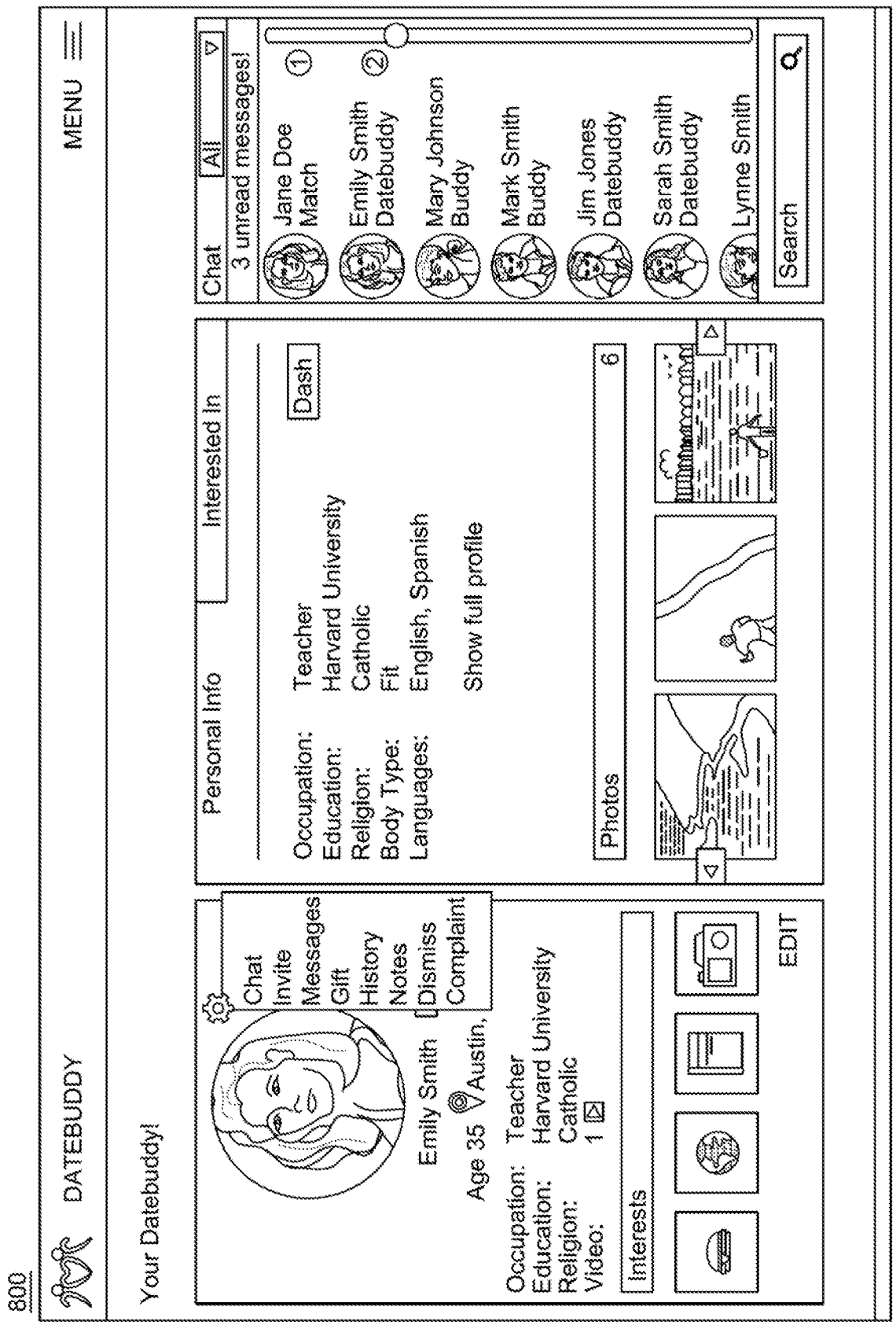

After a MEM user as buddy, or a BDE, has completed a profile, the ODS may identify a matchmaking datebuddy (e.g., a DBM user or a DBE user) for that partner-seeking user. As shown by screen 700 of FIG. 7, an ODS may indicate to the buddy/MEM user that a new DB user has been suggested as a new datebuddy to that buddy/MEM user. The term "buddy/MEM user" refers to a user performing/participating in the buddy role that may be either a MEM user acting as a buddy, called a BDM, or an exclusive buddy user, called a BDE. The ODS may first have enabled that DB user to review the buddy/MEM user's profile (e.g., information from the buddy/MEM user's above personal information list, partner preference list, and/or DB preference list) to determine whether or not the DB accepts the ODS's suggestion that the DB be a datebuddy for that buddy/MEM user (see, e.g., screen 1500 of FIG. 15 below). If the DB user accepts the ODS's suggestion, the buddy/MEM user may be presented with screen 700 that may enable the buddy/MEM user to review the profile of that DB user and may enable the buddy/MEM user to either accept or decline that DB user as its new datebuddy. For example, as shown in FIG. 7, screen 700 may include similar profile information to that shown in MEM user profile screen 400 of FIG. 4, but the information of screen 700 may include profile information with respect to the assigned DB user (e.g., information from the DB user's responses to one or more examples of the above user-as-DB list and personal information list(e.g., if the DB is a DBE user), and/or information from the DB user's responses to one or more examples of the above personal information list, partner preference list, DB preference list, and user-as-DB list (e.g., if the DB is a DBM user that may also be a partner-seeking MEM user)). Screen 700 may enable the buddy/MEM user to either accept or decline this DB user being suggested by the ODS (e.g., through interaction with the checkmark (accept) or x-box (decline)). If a buddy/MEM user declines the suggested DB user (e.g., at screen 700) and/or would like a new/additional DB, the ODS may identify a new suggestion for a DB user (e.g., by identifying another result of the above-described buddy/MEM-DB linking algorithm and/or by re-running the above-described buddy/MEM-DB linking algorithm while potentially taking into consideration one or more buddy/MEM user-supplied reasons as to why the previously identified and suggested DB user was declined by the buddy/MEM user so as to generate a more effective buddy/MEM-DB linking algorithm), and the ODS may provide that new suggestion to the buddy/MEM user on a new screen 700 (e.g., after that new DB user accepts the assignment through review of the buddy/MEM user's profile). If a buddy/MEM user accepts the suggested DB user (e.g., at screen 700), the ODS may notify the DB user of that acceptance such that the DB user may begin to scour his or her network of friends to identify one or more potential candidates for the buddy/MEM user assigned to that DB user. In some embodiments, the ODS may first or at any other suitable time facilitate interaction between the buddy/MEM user and its assigned DB user. For example, as shown by a dropdown interface on screen 800 of FIG. 8, which may be presented to a buddy/MEM user after acceptance of a DB user, the ODS may facilitate various options for the buddy/MEM user to interact with its DB, including, but not limited to, chatting with its DB user (e.g., via a chat messaging interface, which may be shown on the right side of screen 800 and other screen shots), sending an invitation to the DB and buddy/MEM users for any various types of more formal communication (e.g., an invitation for a telephone conversation or a personal in-person meeting to further discuss what the buddy/MEM user may be like and looking for in a partner), facilitating a messaging platform between the buddy/MEM and DB users (e.g., via a messaging system integrated into the ODS), the ability for the buddy/MEM user to review the history of the DB on the ODS (e.g., to see the success rate of the DB in previous DB roles for previous buddy/MEM users and/or may also see the history of all past and present CAND offerings and interactions for that particular DB-MEM or DB-Buddy match), to send a gift to the DB (e.g., using rewards of the ODS), invite the buddy/MEM user to any type of calendar event (see below), dismiss the DB from its role assigned to the buddy/MFM user, send a complaint to the ODS about the DB, and the like. All forms of communication may be encouraged and facilitated by the ODS, including video-conferencing.

A DB user may review its assigned buddy/MEM user's profile information and/or may directly interact with the buddy/MEM user in any suitable way for the DB user to get a better sense of what the buddy/MEM user is looking for in a potential partner, and then the DB user may consider these buddy/MEM user desires with respect to the various contacts in one or more suitable networks (including friends, peers, neighbors, and acquaintances) of the DB user to determine one or more potential candidates for the buddy/MEM user. For example, the DB user may consider any contacts in any suitable online social network of the DB user (e.g., Facebook, LinkedIn, etc.) to help identify any contacts of the DB user that may be a good match and a potentially successful candidate for the buddy/MEM user assigned to that DB user. Alternatively or additionally to searching through any online social networks for potential candidates, the DB user may consider any other contacts known to the DB user (e.g., friends who may not have much of an online presence if any). Alternatively or additionally, the DB user may consider any contacts it has that may already be users of the ODS (e.g., either as a DBE user, partner-seeking MEM user, CAND user with respect to some other partner-seeking MEM user, etc.). When a particular contact is identified by the DB user as a potentially good match for the partner-seeking buddy/MEM user, the DB user may share at least a portion of the user profile of the partner-seeking buddy/MEM user with the identified contact. For example, the ODS may provide a link to the partner-seeking buddy/MEM user's profile that may be shared by the DB user with one or more contacts of the DB user, where the link may be specific to the DB user-buddy/MEM user-CAND user interaction and/or may also be limited by time or number of uses to address concerns of security and exploitation). Such a link may be specifically generated by the ODS for that DB user based on its assigned DB relationship with the partner-seeking buddy/MEM user. The link (e.g., a uniform resource locator ("URL") or any other suitable mechanism) may be configured to guide a recipient to a page or information-providing section of the ODS (e.g., a specific portal of the ODS site or application) that may share some or all of the partner-seeking buddy/MEM user's profile information with a recipient of that link. The link may be used at any suitable client device 100 by any suitable individual, such as an individual who may not have a unique log-in or user-profile established with the ODS. The user profile information of the partner-seeking buddy/MEM user that may be provided by the link may be limited to only a portion of the entire user profile. The link may be for one-time use, limited number of times use, time limited, specific to the DB user-buddy/MEM user-CAND user interaction for security and to address concern of exploitation, and/or can be regenerated by the DB user.

For example, as shown in FIG. 1, a client device 100*b* may be used by a DB user interfacing with an ODS provided by ODS subsystem 10 and may receive such a link from ODS subsystem 10 at client device 100*b*. Then, the DB user may share that link from client device 100*b* to one or more of the DB user's contacts (potential candidates) (e.g., through a single link or separate links per user interaction for security and exploit prevention), such as to a first DB user's contact that may be using a client device 100*d* (e.g., directly or via e-mail or any other suitable communications technique), and/or to a second DB user's contact that may be using client device 100*e* and to a third DB user's contact that may be using client device 100*f* (e.g., via a social network subsystem 20, such as Facebook). Alternatively or additionally, the DB user may provide certain contact information for one or more of the DB user's contacts (e.g., e-mail address or social network account information) to the ODS (e.g., to ODS subsystem 10) and the ODS may use that information to send the link directly to those contacts on behalf of the DB user. Alternatively or additionally, the link may instead be a packet of information indicative of at least a portion of the profile of the partner-seeking buddy/MEM user that may be shared with one or more contacts of the DB user, where this information may be reviewed by the DB user's contacts possibly without having to access the ODS (e.g., directly in an e-mail or a printed brochure type packet). By enabling a DB user to share its assigned partner-seeking buddy/MEM user's profile information with contacts in the DB user's network, including contacts that have had no prior interaction with the ODS, the ODS may leverage not only the information collected about a buddy/MEM user and its partner preferences but also the human touch and human instincts of the DB user to selectively choose particular contacts from that DB user's vast life network that the DB user may believe could be a good match for its assigned partner-seeking buddy/MEM user (e.g., based on the buddy/MEM user's profile information and any additional information that the DB user may have gleaned from any additional information available on the site, which may include an history of activity, and/or additional interaction the DB user may have had with its assigned partner-seeking buddy/MEM user as potentially facilitated by the ODS).

In response to receiving such a link or other suitable invitation or shared source of profile information for a partner-seeking buddy/MEM user, the recipient contact of the DB user may review such partner-seeking buddy/MEM user profile information to determine whether or not he or she would be interested in connecting with that partner-seeking buddy/MEM user. For example, if the contact has no interest in connecting with the partner-seeking buddy/MEM user, the contact may simply not do anything further after receiving the link and/or reviewing the profile information of the partner-seeking buddy/MEM user. However, if the contact does have an interest in connecting with the partner-seeking buddy/MEM user, the ODS may facilitate (e.g., via an option in the provided link) the ability of the contact to create a CAND user profile (e.g., via pathway C) by filling out certain information applicable to that contact (e.g., contact user responses to one or more examples of the above personal information list and the partner preference list, but not the DB preference list and not the user-as-DB list, or Buddy Preferences). For example, such a CAND user profile may not include any DB preferences or rewards choices, as a CAND user may at least initially be limited to the role of interacting with the partner-seeking buddy/MEM user assigned to the DB user that selected the contact as a potential CAND user. In some embodiments, a CAND user profile may also include information with respect to how the CAND user knows or otherwise has a relationship with the DB user that enabled the DB user to contact the CAND user for the potential match with the buddy/MEM user assigned to that DB user. In some embodiments, the CAND user may have access to a modified dashboard that may reflect the CAND's interaction with the partner-seeking buddy/MEM user they have been introduced to. In some embodiments, the CAND user may not have access to dashboards for BuddyBucks or CharityBucks because a CAND user may not currently be performing a DB function. A CAND user may not have access to a social community of the ODS. A CAND user's access to the ODS may be limited to interaction with the buddy/MEM user for which the CAND user was recruited by the DB user and/or to interaction with any and/all buddy/MEM users that may be suggested to that CAND user by the DB user that initially recruited that CAND user, and/or to any other suitable features of the ODS. A CAND user may be limited by the ODS to interaction with the buddy/MEM user it was recruited to review, unless, however, in some embodiments, a DB user recruits a CAND user for another buddy/MEM user that the DB user is helping, or if a different DB user that also knows this specific CAND user offers the CAND user to a different buddy/MEM user they are helping. The CAND user may also include a personal message for the buddy/MEM user while accepting the potential match.

After a contact of the DB user has reviewed the profile information of the partner-seeking buddy/MEM user, expressed interest in connecting with that buddy/MEM user, and has created a CAND user profile, the ODS may provide information to that buddy/MEM user that the CAND user has agreed to a potential connection. Alternatively or additionally, after a contact of a DB user has expressed interest in connecting with a buddy/MEM user, and has created a CAND user profile, but before the CAND user profile that may be directly associated with and/or accessed by that buddy/MEM user, the ODS may provide the DB user with the ability to review the CAND user profile and determine whether or not the DB user's contact has been sufficiently forthright with the information of the CAND user profile and/or whether the DB user believes that this CAND user profile ought to be provided to the buddy/MEM user as a potential match. That is, the ODS may provide the DB user with the ability to filter the responses of its contacts before enabling the ODS to share such CAND user profiles with the partner-seeking buddy/MEM user assigned to that DB user, thereby allowing the DB user to have an additional gatekeeper responsibility with respect to the candidates that are offered to the buddy/MEM user on behalf of the DB user. In any event, once a buddy/MEM user has been approved by a CAND user and possibly their profile approved by their associated DB, in some embodiments, once a CAND user has been approved for the buddy/MEM user by the associated DB user, the user profile of that CAND user may be presented to the buddy/MEM user on a "New Matches" page, as shown by screen 900 of FIG. 9.

Figure 9:
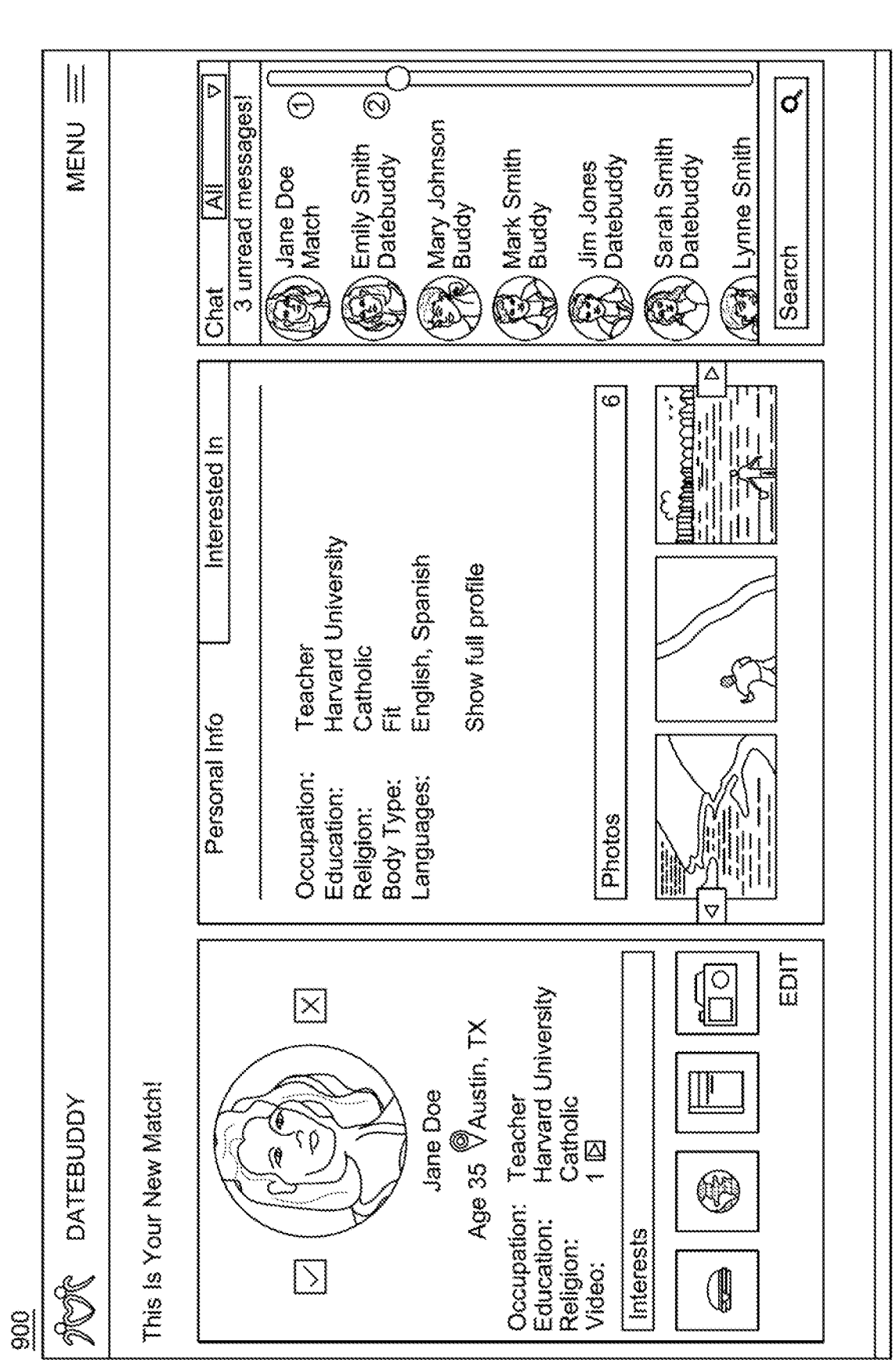
Figure 11:
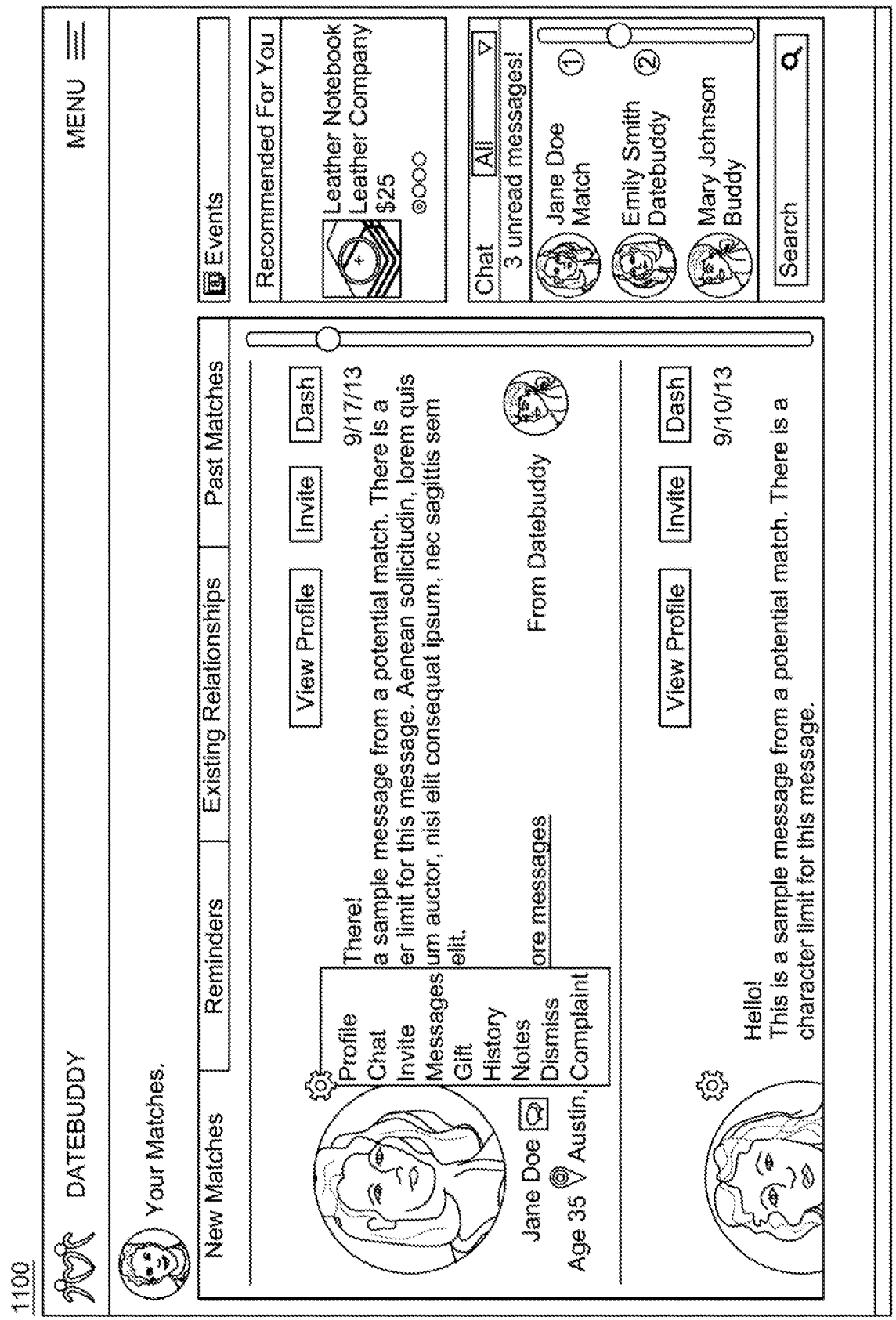
Figure 12:
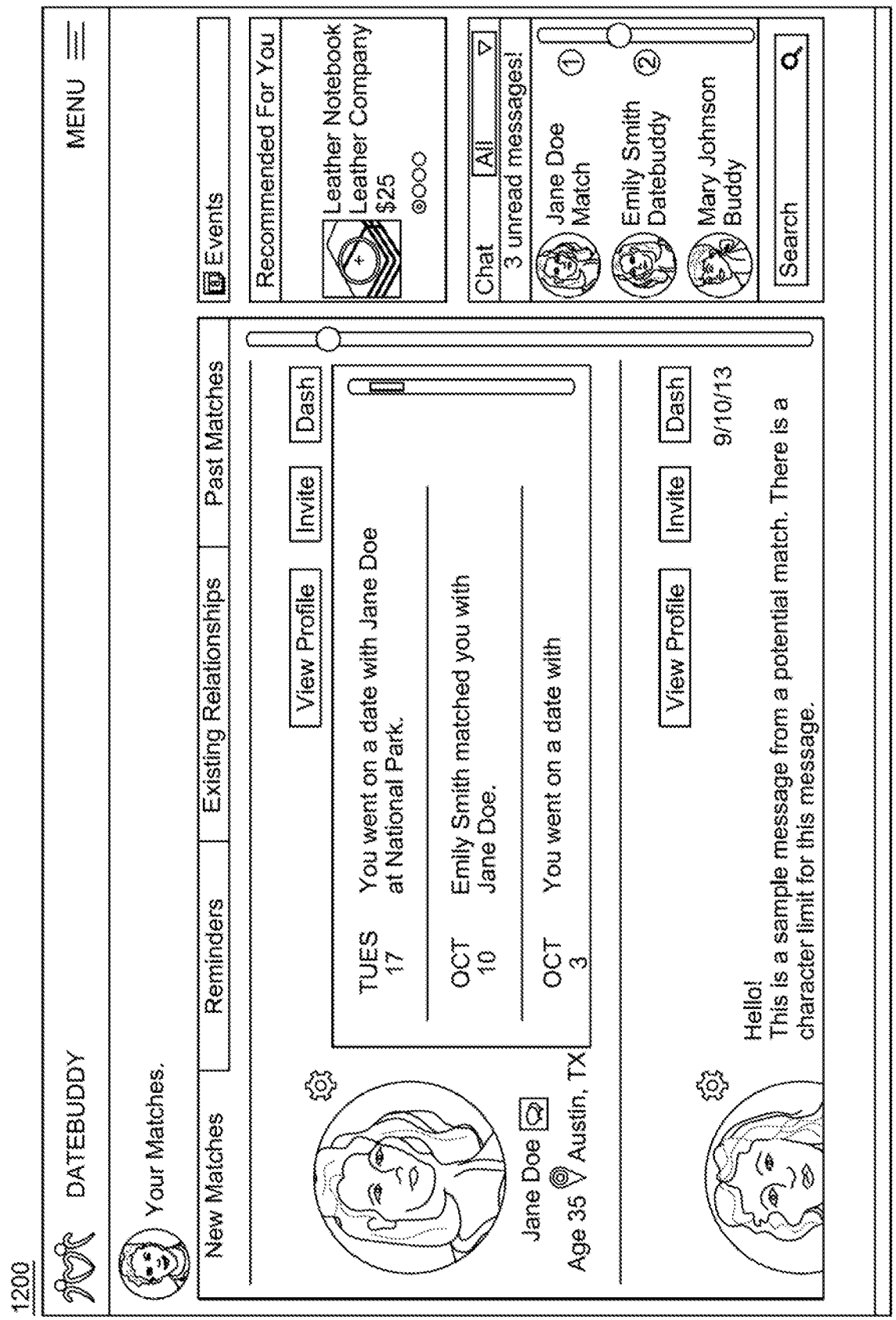
Figure 16:

As shown by screen 900 of FIG. 9, an ODS may indicate to the buddy/MEM user that a new CAND user has been suggested as a new potential match to that buddy/MEM user. For example, as shown in FIG. 9, screen 900 may be a match acceptance screen that may include similar profile information to that shown in buddy/MEM user profile screen 400 of FIG. 4, but the information of screen 900 may include profile information with respect to the newly matched CAND user (e.g., information from the CAND user's responses to one or more examples of the above personal information list and/or partner preference list). Screen 900 may enable the buddy/MEM user to either accept or decline this CAND user being suggested as a new match (e.g., through interaction with the checkmark (accept) or x-box (decline)). If a buddy/MEM user declines the suggested CAND user (e.g., at screen 900), the ODS may identify another new CAND user match from their matched DB (e.g., through a similar process that may or may not take into consideration one or more buddy/MEM user-supplied reasons as to why the previously identified CAND user was declined by the buddy/MEM user so as to generate a more effective buddy/MEM-CAND linking process), and the ODS may provide that new suggestion to the buddy/MEM user on a new screen 900. Data mining such information can be useful in many ways, such as by including some aspect of this information into an algorithm (e.g., a DB-buddy/MEM matching algorithm) to increase its effectiveness, or to use to analyze the entire process and integrate into a revised structure that may better serve to create a successful buddy/MEM user DB user match, a more successful buddy/MEM user CAND match, and/or a more successful ODS. If a buddy/MEM user accepts the suggested CAND user (e.g., at screen 900), the ODS may notify the CAND user and/or the DB user of that acceptance (e.g., with a personal message that may be defined by the buddy/MEM user), such that the ODS may facilitate a potential direct contact between the buddy/MEM user and the CAND user. Moreover, if a buddy/MEM user accepts the suggested CAND user (e.g., at screen 900), the ODS may provide the buddy/MEM user with at least two locations at which the buddy/MEM user's interactions with its matches may be monitored.

Figure 25:
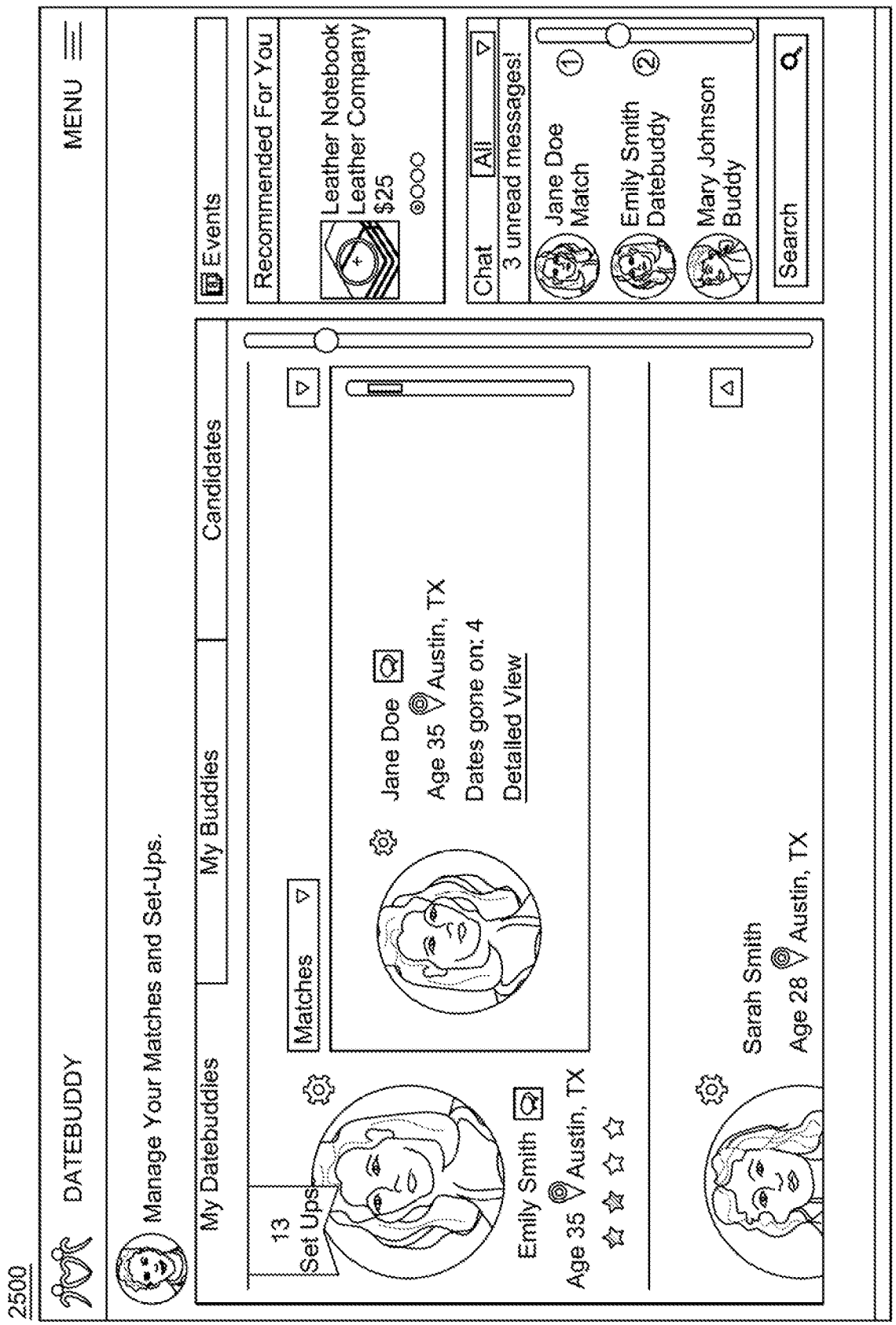
Figure 26:
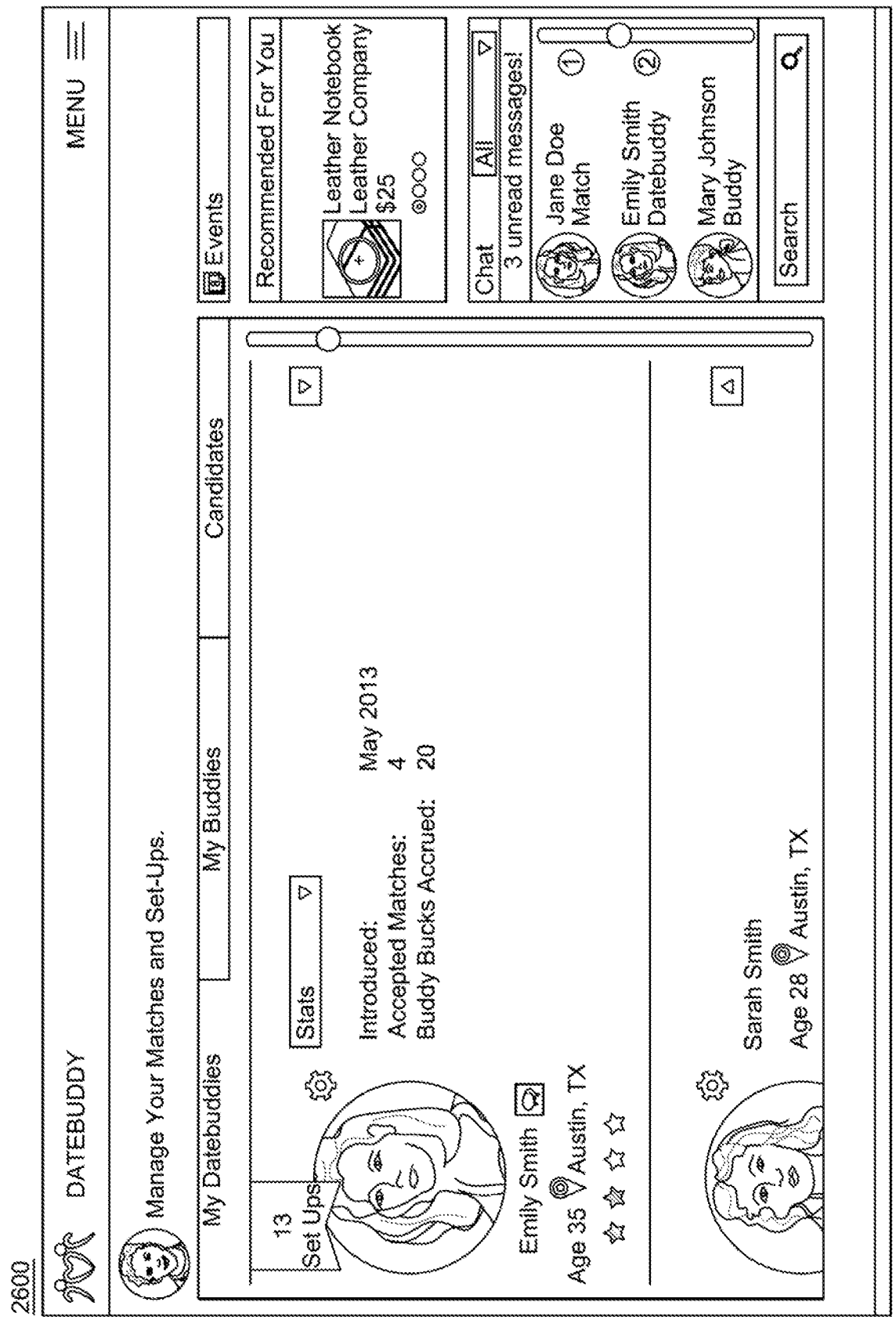
Figure 27:
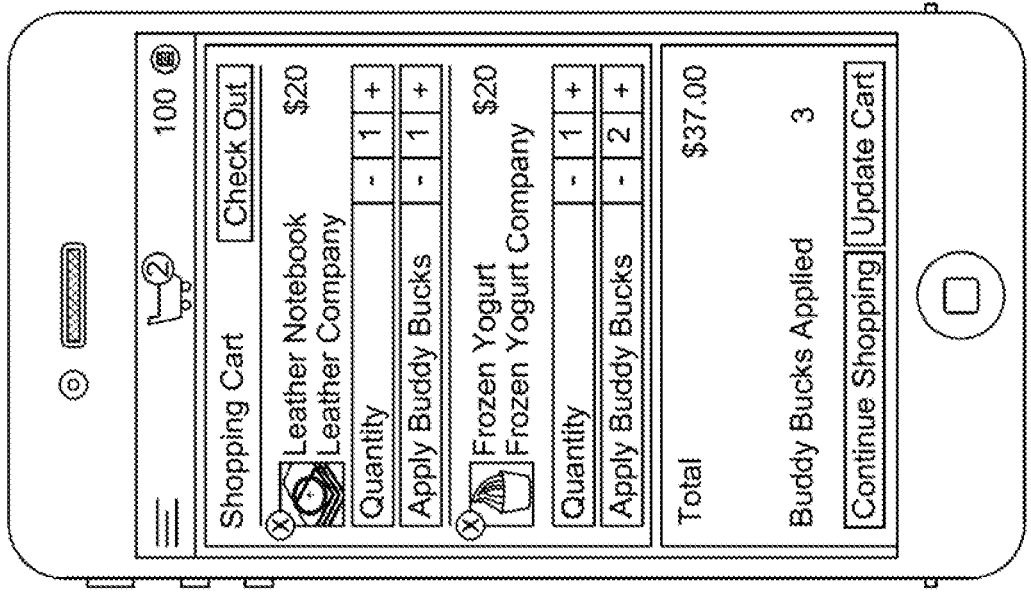
Figure 28:
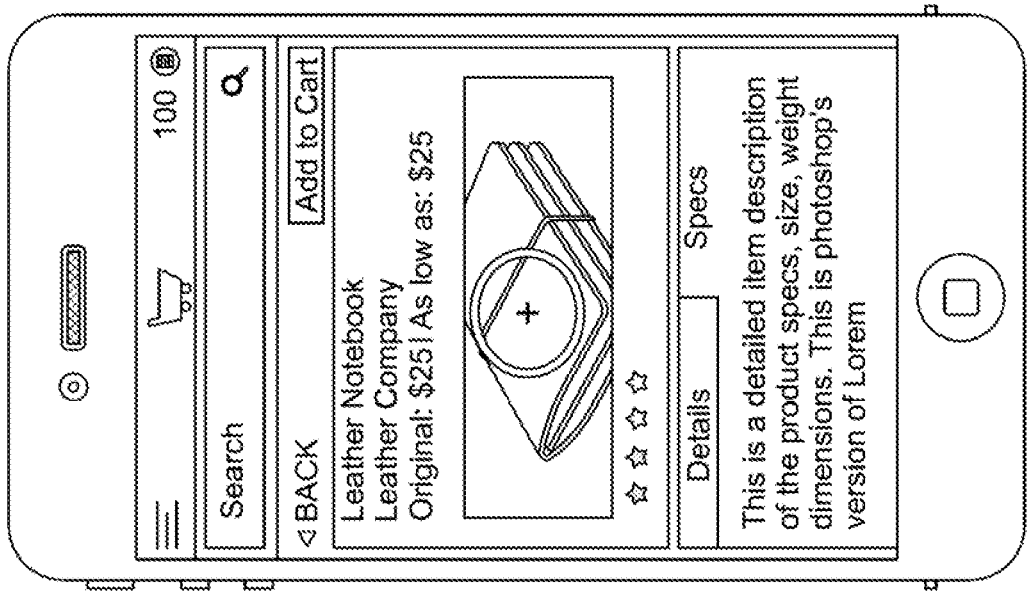
Figure 29:
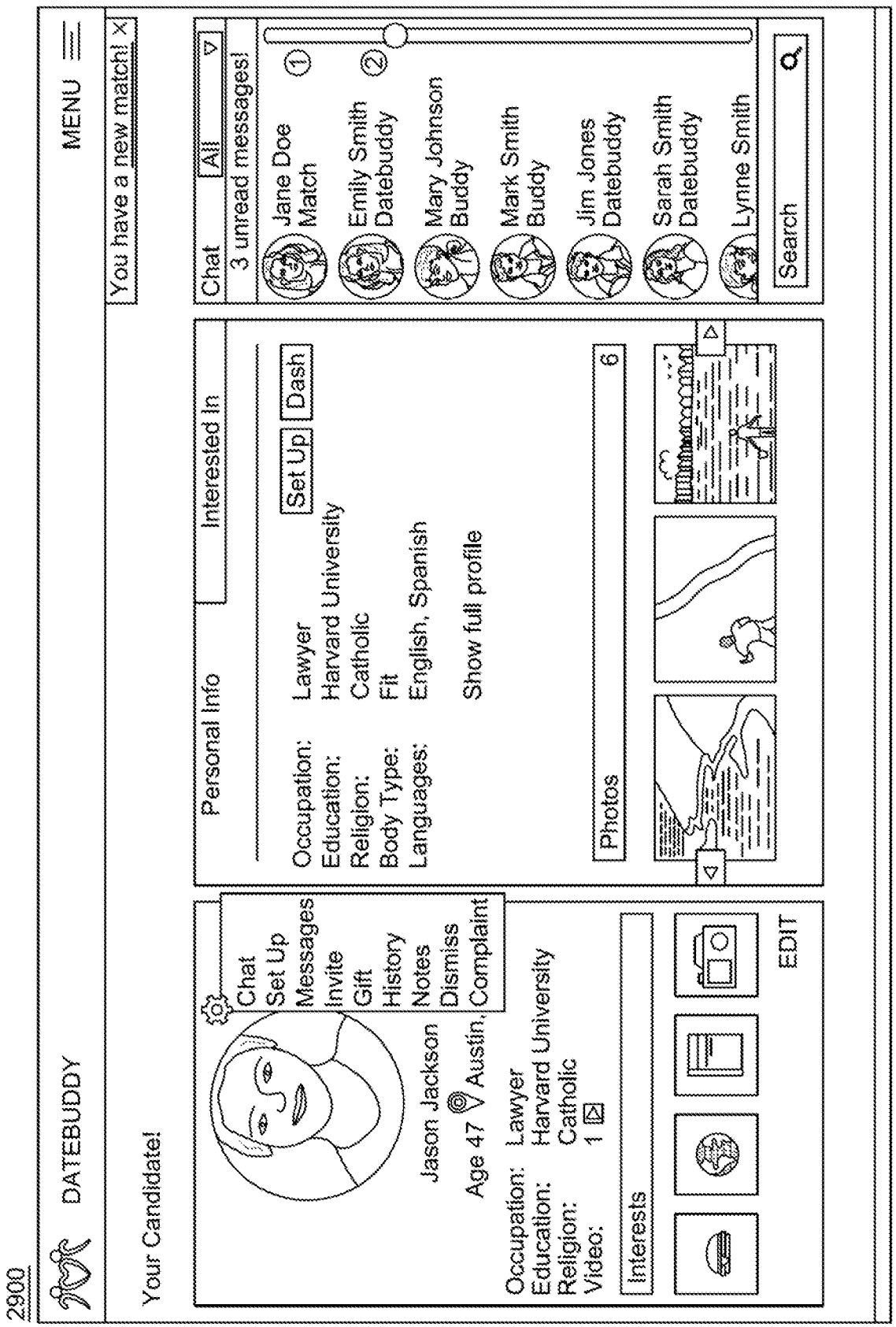

A first location for a MEM user to monitor its interactions with a new match may be on its main dashboard, such as a "Manage Your Matches and Set-Ups" page (e.g., as shown by screen 2500 of FIG. 25 and/or screen 2600 of FIG. 26). At such a location, a MEM user may be enabled by the ODS to monitor at least three different categories of information, such as at three different tabs. The first category may be "My Datebuddies", which may provide the MEM user with activity of the MEM user's one or more DB's, which may include a list of each one of the MEM user's DBs, including past and present DBs, which may include their pictures and any other suitable identifying information alongside which may be provided any new matches and/or some or all of the matches that that DB may have provided for that MEM user (e.g., all matches provided by that Datebuddy may be shown starting with the most recent, as may be shown by screen 2500 of FIG. 25), and all Datebuddies for that MEM user may also be shown (e.g., starting with most recently assigned DB or the DB to most recently provide a new match), and/or any other suitable statistics about that DB and its success or interaction with the ODS (e.g., date of introduction, total accepted matches, total accrued rewards, etc., as shown by screen 2600 of FIG. 26). The second category of such a main dashboard for a MEM user may be "My Buddies" (see, e.g., screen 1700 of FIG. 17), which may provide the MEM user with activity of the various users to which the MEM user may now or in the past be assigned as a DB. The third category of such a main dashboard for a MEM user may be "Candidates", which may provide the MEM user with a list of some or all contacts of the MEM user that have been introduced as a current or past CAND to a Buddy (either BDM or BDE) when functioning as a DB (either DBM or DBE) (e.g., at least all contacts of the MEM user that are at least CAND users of the ODS) (e.g., that this MEM user may have offered to other buddy users). In these examples exclusive user types such as BDEs and DBEs may also have access to these dashboards, but may have some access limitations relative to their respective roles. For example, a BDE, who may function solely in the buddy role, will therefore have access to the DB tab, but not the buddy or candidate tabs. Alternatively, a DBE, solely acting as a datebuddy, may have access to the buddy and candidate tabs, but not to the datebuddy tab.

Figure 31:
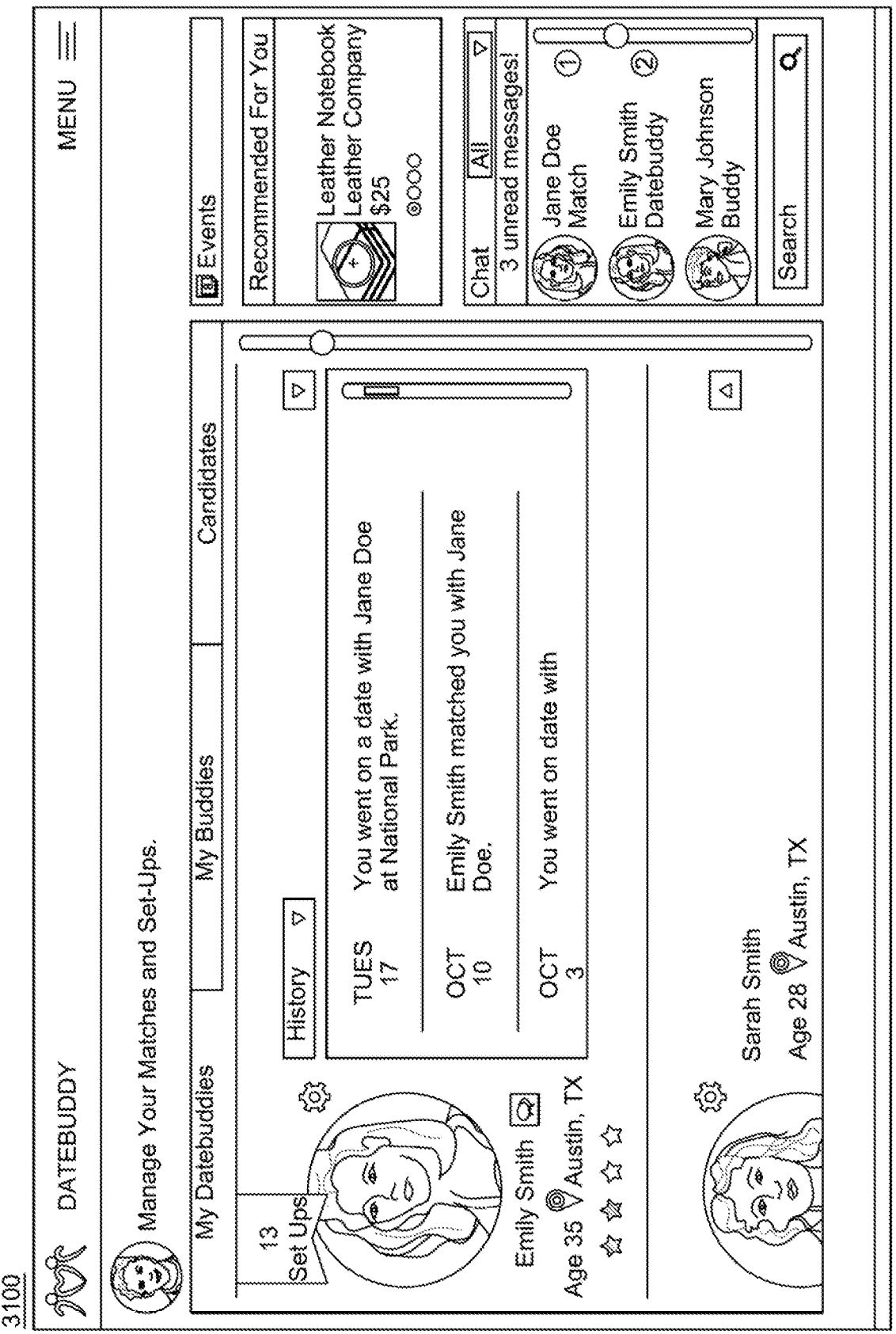
Figure 32:
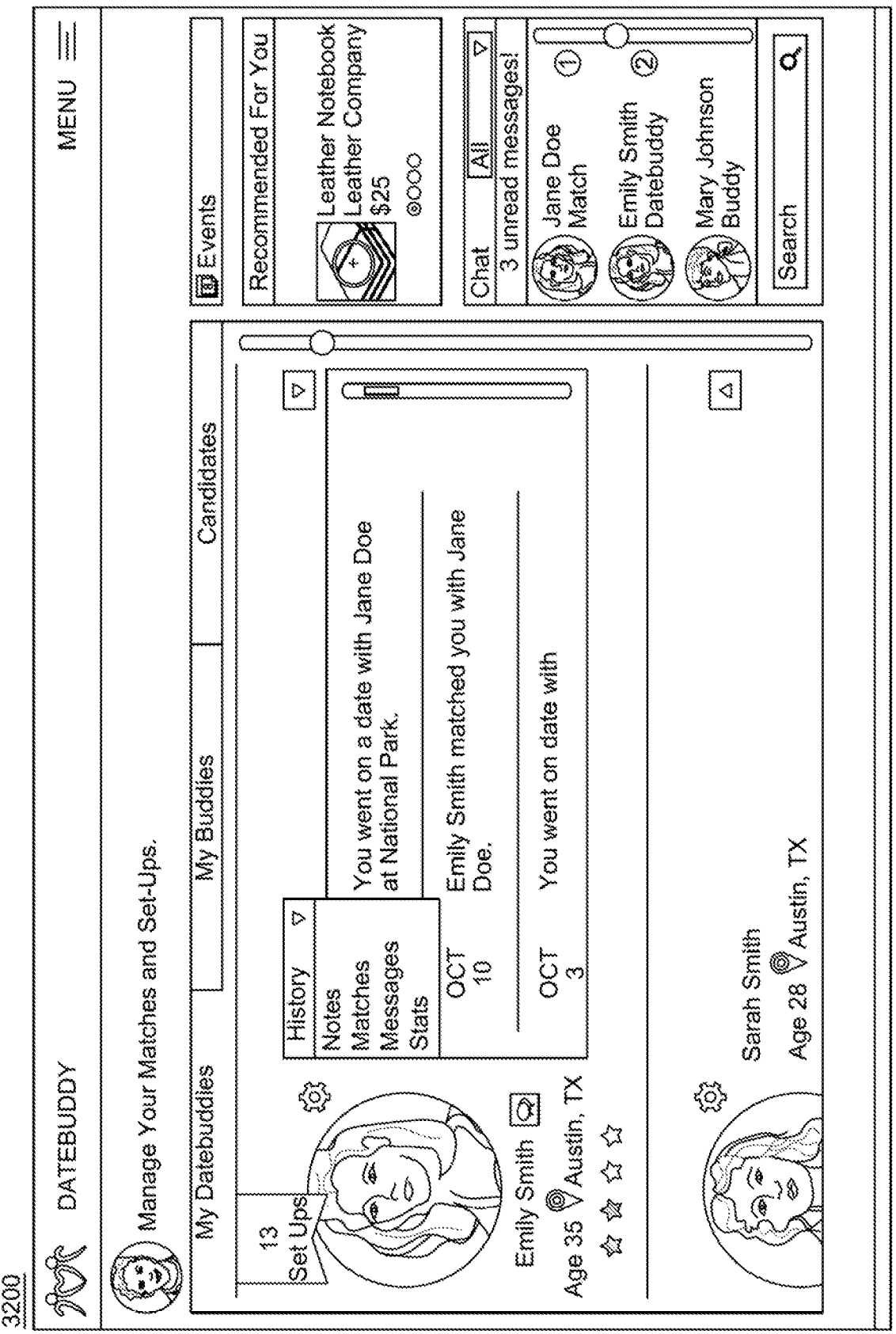
Figure 33:
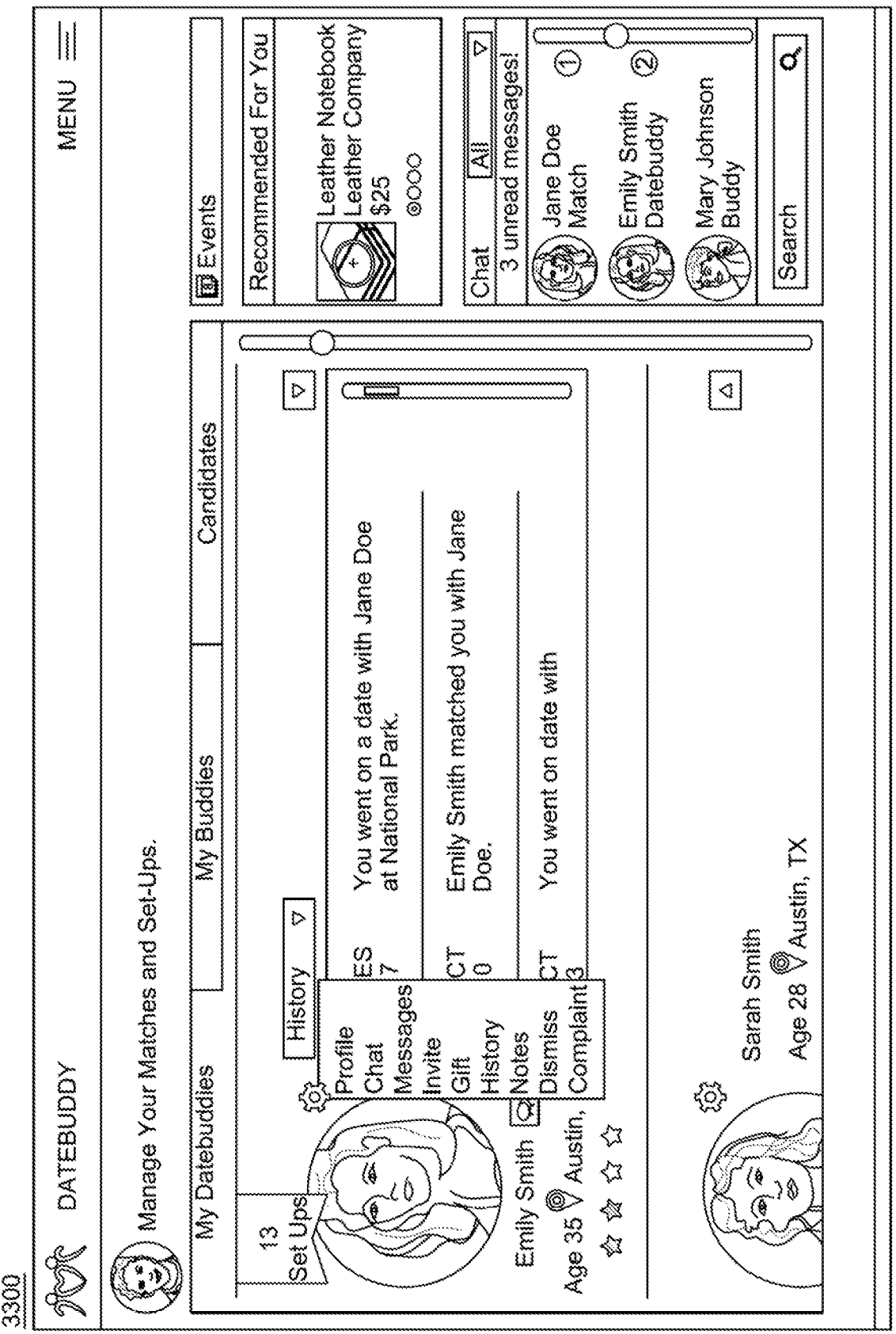
Figure 34:
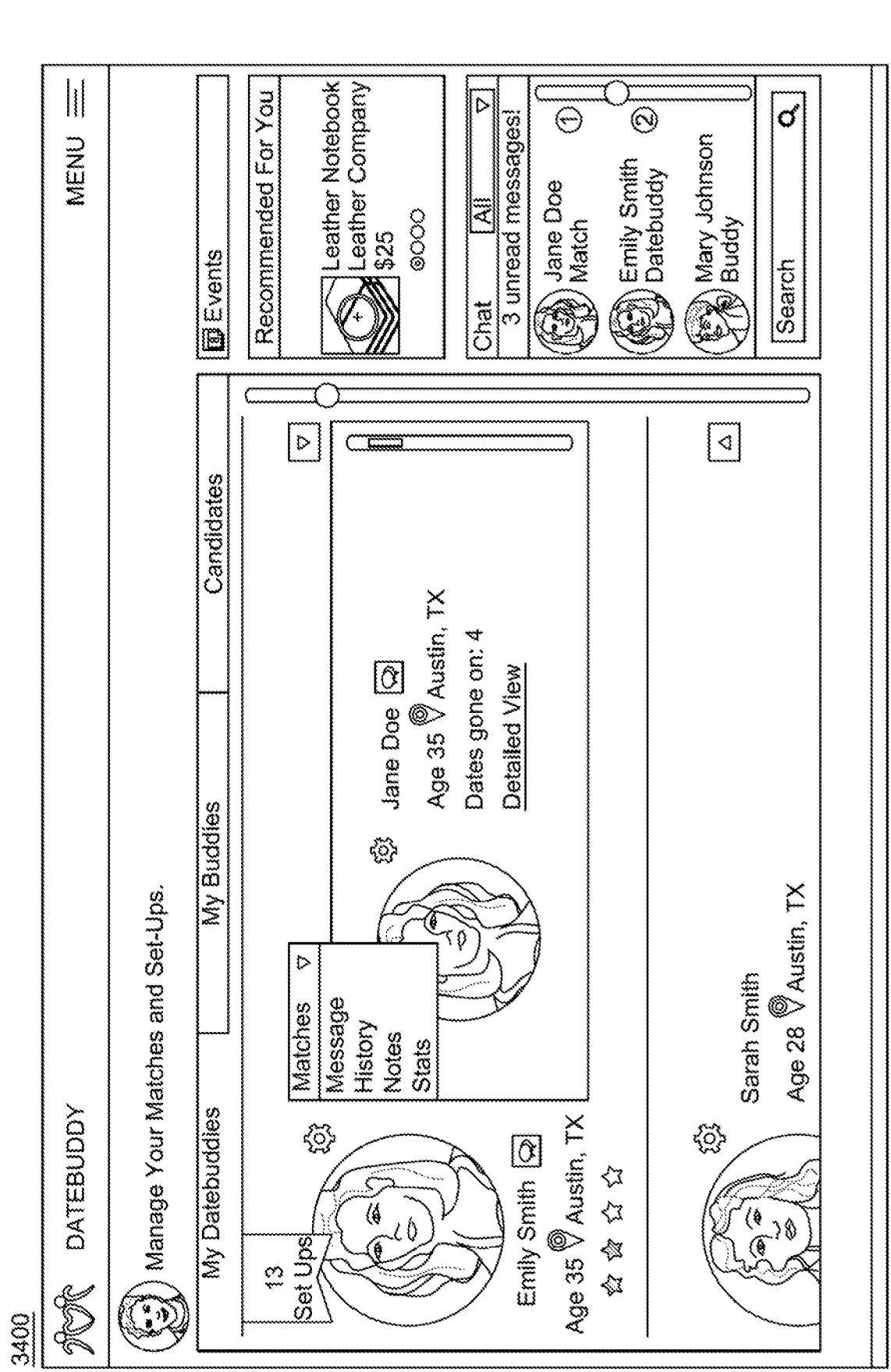
Figure 35:
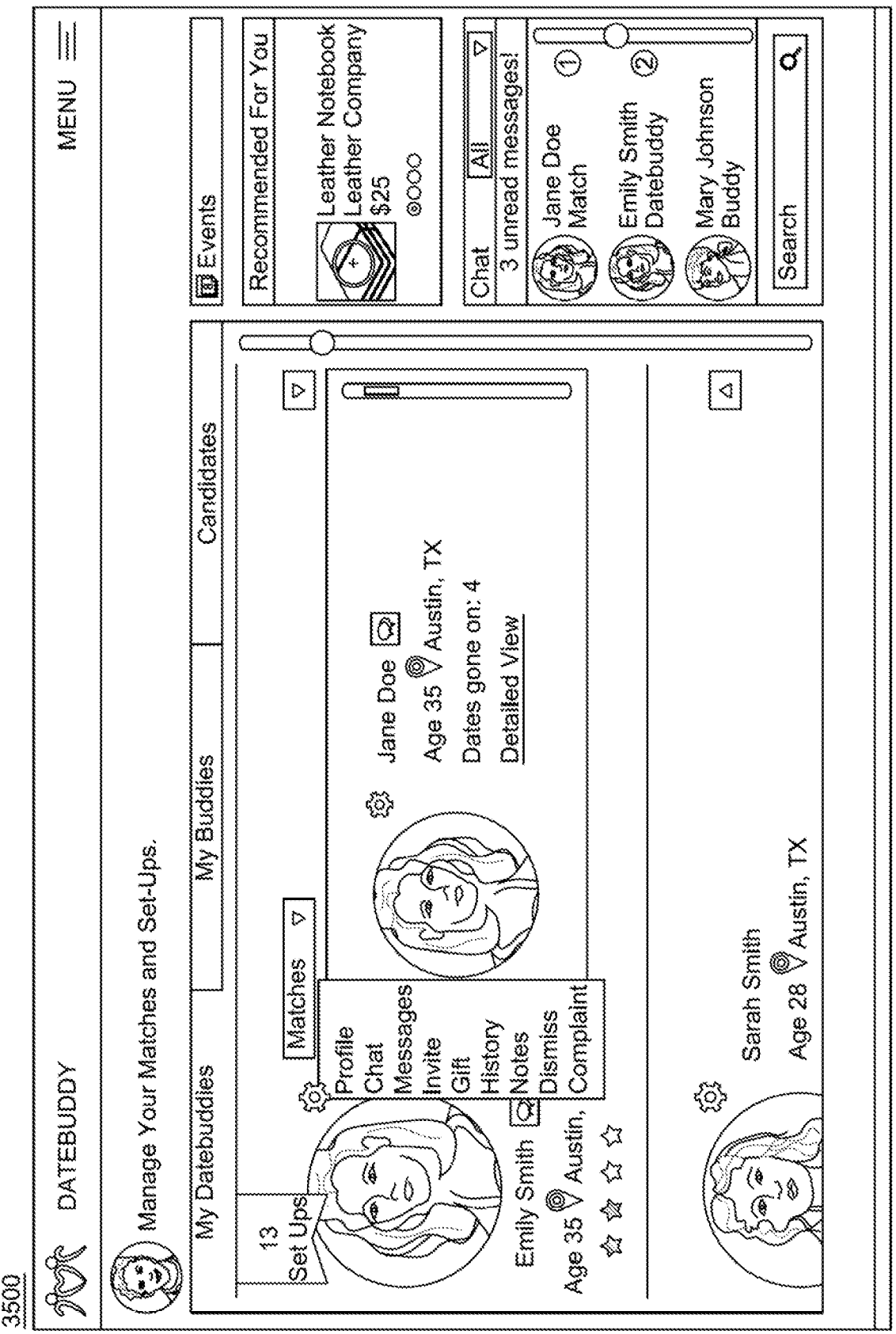

Such a "Manage Your Matches and Set-Ups" page or "My Datebuddies Set-Up Dashboard" of screen 2500 of FIG. 25, screen 2600 of FIG. 26, screen 3100 of FIG. 31, screen 3200 of FIG. 32, screen 3300 of FIG. 33, screen 3400 of FIG. 34, and/or screen 3500 of FIG. 35 may allow the member to manage their Set Up functions including both sides of the process. Note that the classic member may participate in both sides of the matchmaker process. They may be assigned a matchmaker, or Datebuddy, who may attempt to set them up with one of the Datebuddy's friends. They may also be assigned a second member, called a Buddy, to be a matchmaker for. When they choose the "My Datebuddy" tab, the ODS may provide with their current matchmaker, or Datebuddy, that has been assigned to them by the Datebuddy algorithm. All Datebuddies may be shown, with the most recent first. Under the photograph of each Datebuddy may be basic information, and the gear icon may launch similar functionality to that mentioned above. There may be links not shown for Profile and Invite. The information within the panel adjacent to the Datebuddy photograph may be chosen by a drop down menu, which may include "Matches" (shown), Stats, History, messages and notes. "Matches" may show all the Matches introduced by that Datebuddy, with the most recent listed first. The panel showing the Matches may show their photograph with basic identification information below, and historic information adjoining the photograph and links (not shown) that may include "Invite" and "Profile," and "Detailed View" to launch the "Matches" page focused on their particular entry. Stats may show the Datebuddy's metrics. History may show the history between the Datebuddy shown and the member, such as milestones regarding any Matches presented to the member. Notes may refer to comments the member wants to save for reference.

Figure 10:
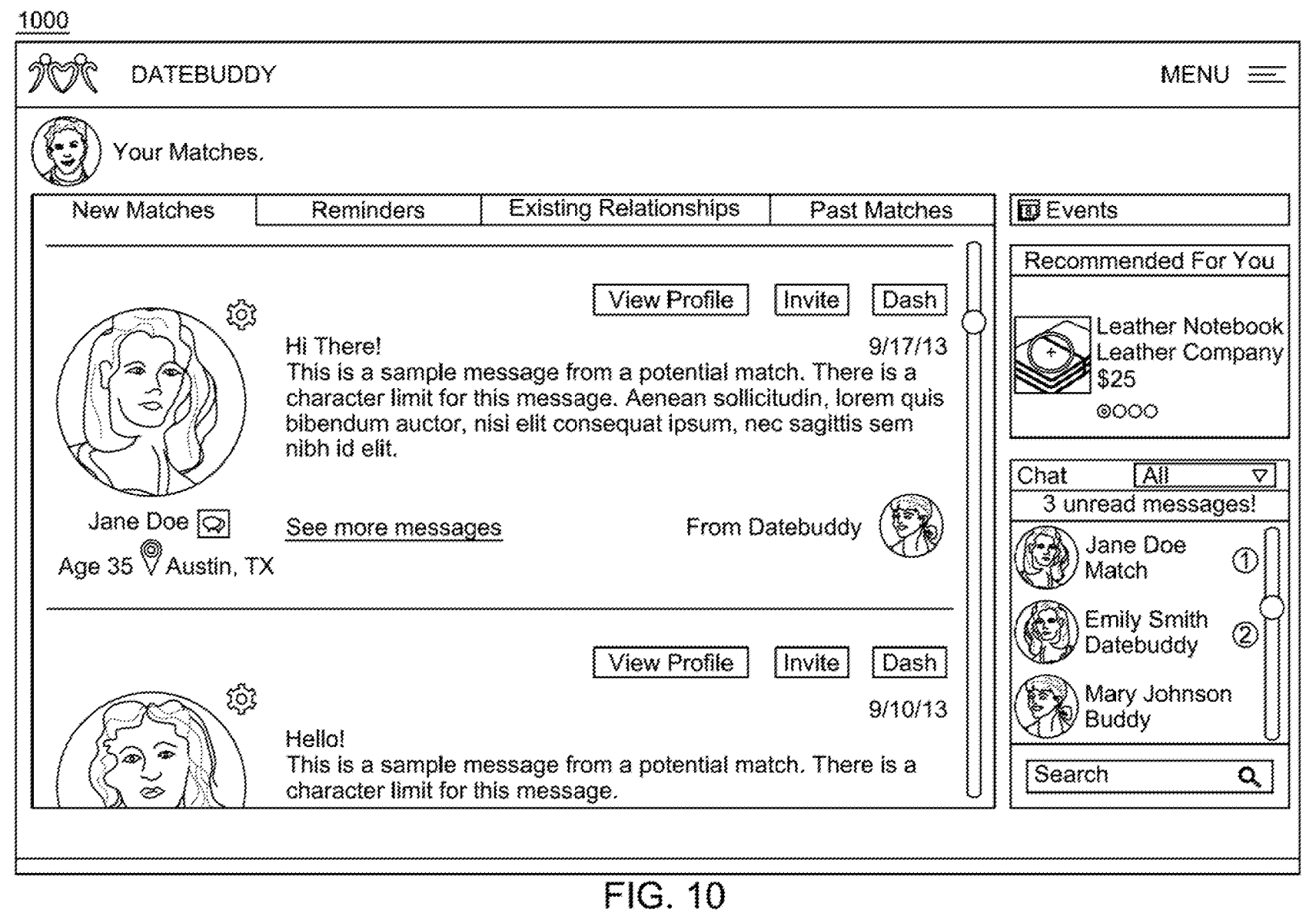

A second location for a MEM user to monitor its interactions with a new match may be on another dashboard, such as a "Your Matches" page (e.g., as shown by screen 1000 of FIG. 10). At such a location, a MEM user may be enabled by the ODS to monitor at least four different categories of information, such as at four different tabs. The first category may be "New Matches", which may provide the MEM user with a listing of new matches that may have been found by one DB or multiple different DBs. The second category may be "Reminders" that may remind about events or dates the MEM user has been invited to or created. The third category may be "Existing Relationships" that may list all CAND users that have been offered and accepted to the MEM user and not dismissed or set as dormant. The fourth category may be "Past Matches" that may list all CAND users that have been offered and have been dismissed by either party or set as dormant With respect to the first category that may be shown by the "New Matches" tab of FIG. 10, the ODS may enable the MEM user to view through new matches in a dedicated fashion. A picture and/or other identifying information may be shown for such CAND users, which may include a personalized message from the CAND user, an indication of the DB user that offered this CAND user for the MEM user, a selection for a user to "View Profile" of the CAND user, "Invite" the CAND user, and "Dash". Invite may allow for the creation of any type of invitation, including a date or meeting, and all of the event types listed below (see, e.g., the event types listed in the description herein with respect to a calendar). Dash may refer to a main Dashboard which includes the "Manage set ups" section. The above dashboard access may also be accessible to an exclusive BDE.

Such a "Your Matches" page or Matches Dashboard page may present the potential partners that the member's Datebuddy has offered to introduce to them from their network of friends/contacts. The member's Datebuddy searches through their network of friends/contacts and chooses which ones may be a good fit for the member (Buddy) they are matchmaking for, then reach out to those friends/contacts to see if they would be interested in meeting the Buddy they are matchmaking for. These friends/contacts of the Datebuddy may be called Candidates, and if they are interested in meeting the member (Buddy) that the Datebuddy is matchmaking for, they may create a profile and may be introduced to the member (Buddy) using such a Matches page. After being notified of a "New Match" in the Notification Page of the member (Buddy), when the member (Buddy) clicks on the notification it may launch such a Matches Dashboard Page, which may show all Matches with the most recent first. When first introduced there may be a check and an X next to the photo of the Match that may allow the member (Buddy) to either accept or reject this "New Match." Accepting this Match means they may be allowed to contact each other and continue their introduction beyond just a review of each other's profiles. The contact functions present on the page, such as chat and messaging, may not be made available by the ODS until the "New Match" is accepted by the member (Buddy). The panel displaying information regarding this "New Match" may include a link to their profile and to "Invite," which may allow the member (Buddy) to create an invitation of any kind, including a date or first meeting, through Datebuddy's event creation process. The gear adjacent the photograph may allow for a number of functions to be launched that are specific to that Match, including chat, messaging, invitation, gifting (which can include BuddyBucks, CharityBucks or store items), notes (comments), dismissal and complaint. The panel itself may default to the most recent message shared between the two, but a drop down not shown above the panel may allow for choices including messages, history, and notes. The photograph and identity of the Datebuddy who offered the Match may also be shown. This Matches Page may include additional tabs. The first may represent "New Matches," the second may represent "Existing Relationships" or "Matches" that have already been accepted and are ongoing relationships at some level, and the third may represent "Past Matches" which are no longer active and have been dismissed. Dismissed Matches may desire to continue to be friends at some level, and upon dismissal may be asked by the ODS if they desire to allow the ODS to enable continued contact between each other through the many communication pathways, and on the Community Page as well as part of their circle.

As may be true at many other pages or GUIs of the ODS, a gear may be provided next to identifying information for a match on a "Your Matches" screen (e.g., screen 1000 of FIG. 10), which may trigger a drop down menu with a number of potential functions (e.g., as shown by screen 1100 of FIG. 11 and/or screen 3000 of FIG. 30), which may include one or more of the following:

1) See profile—links to the profile page of the picture
2) Chat—opens a chat area to chat directly with user depicted by picture
3) Send message—sends message to user depicted by picture
4) Invite—invites user depicted by picture to an event, including a meeting or a date, or any other calendar event as per event section.
5) Gift—sends a gift either of barter trade such as BB or CB, or service or product from eStore of site to the user represented by picture
6) History—lists history of events and contacts with user represented by picture
7) Notes—lists any comments made by user in Notes section of user represented by picture
8) Dismiss—action to dismiss user depicted by picture from active status for a given role or for entire access on this user's account
9) Complaint—action to file a complaint about the user depicted by the picture
10) Setup—may only be available on pages where the user's current role has the option to set up the user depicted by the picture, such as a DB user who is looking at their dashboard at a CAND user they have offered to a MEM user in the past, and currently has a different MEM user that the DB user believes may be a good prospect for this same CAND user.

As mentioned, at least one option may be provided by the ODS (e.g., at a "Your Matches" screen of FIG. 10 and/or FIG. 11) to a buddy/MEM user that may facilitate the buddy/MEM user to interact with a matching CAND user, including, but not limited to, chatting with its matching CAND user (e.g., via a chat messaging interface), sending an invitation to the matching CAND user for any various types of more formal communication (e.g., an invitation for a telephone conversation or a personal in-person meeting to further discuss a potential relationship between the buddy/MEM user and the CAND user) or an invitation to a date or meeting, or any calendar event seen below, facilitating a messaging platform between the buddy/MEM and CAND users (e.g., via a messaging system integrated into the ODS), the ability for the buddy/MEM user to review the history of the CAND user on the ODS that may be specific with that buddy/MEM user (e.g., to see past connections of the CAND user with that buddy/MEM user or the CAND user's relationship to a particular DB), to send a gift to the matching CAND user (e.g., using rewards of the ODS), dismiss the matching CAND user as a match if previously accepted, send a complaint to the ODS about the matching CAND user, and the like.

The ODS may enable certain users to maintain an ongoing social contact with those users that the user may have met through the ODS on a community page. For example, as shown by screen 1300 of FIG. 13 and/or by screen 1400 of FIG. 14, an ODS may provide any suitable information to a MEM user on a community page that may include posts or information of any suitable type from all such users, including previous and/or current Datebuddies of the buddy/MEM user, other buddy/MEM users for which the MEM user is currently or was previously a DB, that were at least once a match for the MEM user. On such a community page, the ODS may enable a user (e.g., any buddy/MEM user and/or any DB user) to follow posts by its network of contacts/users on the ODS. Access to such a community page may be limited to certain user types, such as buddies (BDMs and BDEs) and datebuddies (DBMs and DBEs). In addition, the content of posters in general or of a given poster or type of poster visibility to a given user who has access may be limited and filtered. This filtering may be based geographically, and/or by community type, and/or by level of participation with site, and/or by relative relationship of roles between user and poster and/or by the nature of interaction between user and poster and/or level of engagement of the user to the poster. Candidates may not be allowed access to such a community page.

Figure 13:
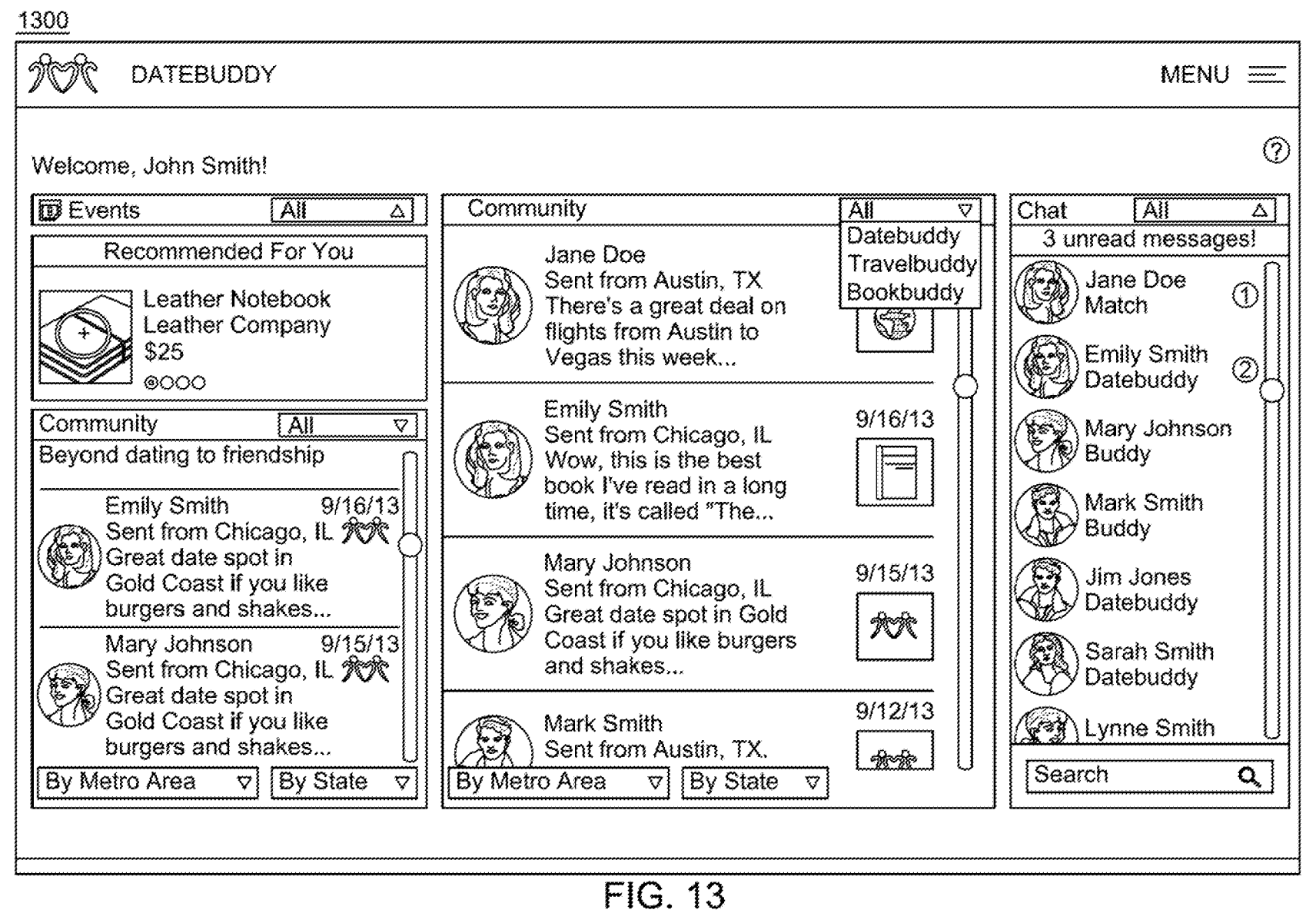
Figure 14:
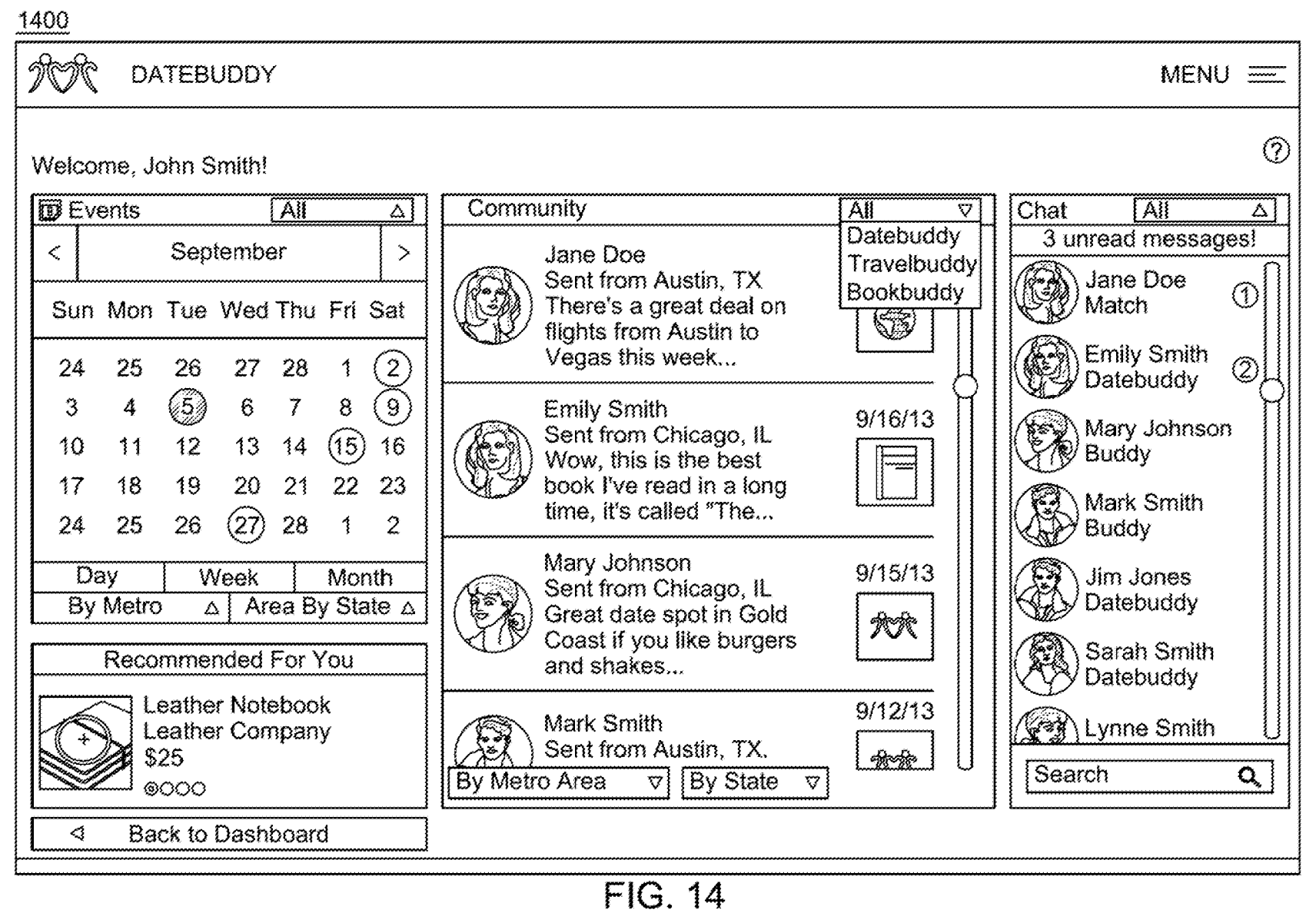

A primary function of a community page of FIGS. 13 and 14 may be the center column, which may show a social network wall. The posters visible to a member may be the collection of members the individual has been connected to, or has requested to be connected to, from the Datebuddy process or the broader social network it is a component of (i.e., BuddyNation). The visible members may include all Datebuddies and Buddies a user has been assigned, all Candidates that are members, all Matches that the user has been introduced to, and any real life friends the user may have invited into the community. For any of these possible members to be included in a user's circle on the ODS, both parties must continue to allow such inclusion for it to remain visible. This Community fosters friendship beyond the dating component to the Datebuddy process, and integrates the event calendar to further support that goal. Another important function of the Community Page may be that it may function as the gateway portal introducing the Datebuddy members to the broader social network, Buddynation. Included in this page may be the interests defined by the individual member in their profile. All of these iconic representations may be clicked on and/or act as links to the Communities within BuddyNation that may center around the given interest, and whose content may include the BuddyNation Engine process and circle creation discussed herein.

As shown in FIG. 13, advertisements to items of the ODS's eStore may be provided and linked to the eStore (e.g., where ODS rewards may be redeemed by ODS users), where such ads may be for items with some contextual relationship to information in the community data feed/posts (e.g., eStore vendors may be incentivized to participate due to the highly targeted demographic that may be represented by the members of a user's community). A chat section may also be provided on a community page of the ODS, as shown by FIGS. 13 and 14, where chats may be filtered by most recent chats first, filtered at multiple levels, including friends from all various user communities of the ODS, friends from this community, or local or global members, and the like (filters may exist for any level of geographical segmentation or scope, community type and group type). As shown in FIG. 14, a calendar may be provided by the ODS on various pages of the ODS that may include flags or other information that may include the creation of or the invitation for items that may denote various event types, that may either be created by the user or to which the user is invited, including, but not limited to, the following:

1) Individual:
   A) Date/meeting between MEM users
   B) Date/meeting between buddy/MEM user and a new match CAND user
   C) Meeting between buddy/MEM user and its assigned past or present DB user
   D) Meeting between student and coach/mentor (described below)
   E) Meeting between two students or two coaches/mentors (described below)
   F) Meeting between two user-as-DBs (any permutation of DBM and DBEs)
   G) Meeting between two user-as-BDs (any permutation of BDM and BDEs)
   H) Meeting between DB user (DBM or DBE) and its assigned past or present buddy user (BDM or BDM)
2) Group:
   A) Social (described below)
      I) Members
      II) Datebuddies
      III) Datebuddy groups
      IV) Mentors/coaches
      V) Students
      VI) Mentors and students
      VII) Friends group
      VIII) Community
      IX) Communities
   B) Informative/educational:
      I) Members
      II) Datebuddies
      III) Datebuddy groups
      IV) Mentors
      V) Students
      VI) Mentors and students
      VII) Friends group
      VIII) Community
      IX) Communities
   C) Charitable/benevolent:
      I) Members
      II) Datebuddies
      III) Datebuddy groups
      IV) Mentors
      V) Students
      VI) Mentors and students
      VII) Friends group
      VIII) Community
      IX) Communities As mentioned, while a buddy/MEM user may be receiving help from another user acting as a matchmaking DB (e.g., from a DBM or a DBE) for that buddy/MEM user (e.g., via pathway A), that same buddy/MEM user (if they are a MEM user) may also be offered as a matchmaking DB (i.e., a DBM) for another buddy/MEM user (e.g., via pathway B). A subset of the MEM user's profile information (e.g., information from the MEM user's responses to one or more examples of the above personal information list, partner preference list, DB preference list, and/or user-as-DB list) may be leveraged by a buddy/MEM-DB linking algorithm, as described above, such that the ODS may identify one or more other buddy/MEM users to assign as potential "Buddies" that may be aided by the MEM user as a matchmaking DB (i.e., as a DBM user). As shown by screen 1600 of FIG. 16, an ODS may provide a "Buddy Profile Acceptance Screen", which may indicate to the MEM user acting as a DB (hereinafter DBM) that a buddy/MEM user has been suggested as a new buddy for which that DBM may act as a matchmaker DB.

Figure 15:
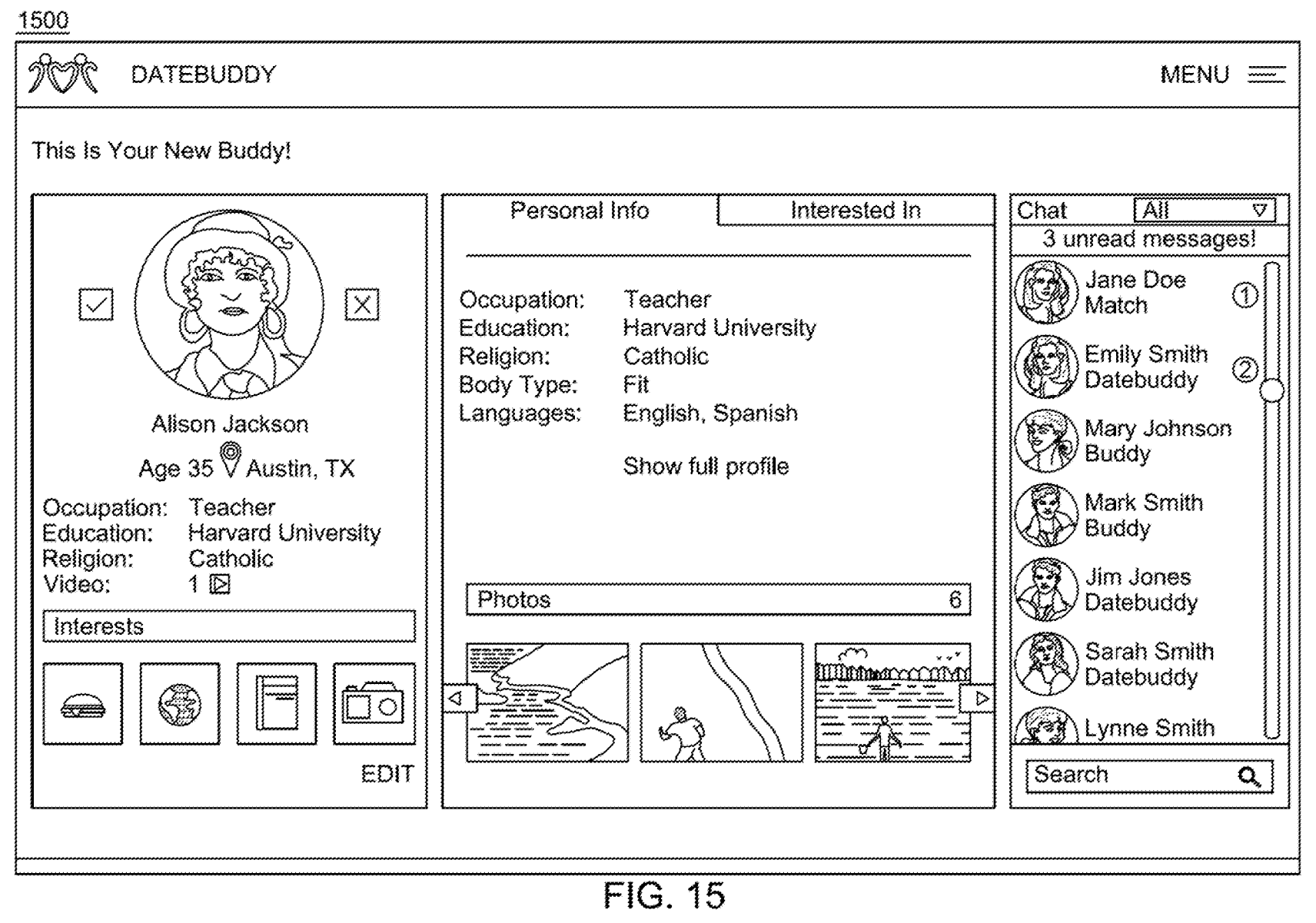

The ODS may first enable the DBM to review the buddy/MEM user's profile (e.g., information from the buddy/MEM user's above personal information list, partner preference list, and/or DB preference list) to determine whether or not the DBM accepts the ODS's suggestion that the DBM be a datebuddy for that buddy/MEM user (see, e.g., screen 1500 of FIG. 15). Screen 1500 may enable the DBM user to review the profile of that buddy/MEM user and may enable the DBM user to either accept or decline that buddy/MEM user as its new buddy. For example, as shown in FIG. 15, screen 1500 may include similar profile information to that shown in MEM user profile screen 400 of FIG. 4, but the information of screen 1500 may include profile information with respect to the suggested buddy/MEM user for the DBM user (e.g., information from the MEM user's responses to one or more examples of the above personal information list, partner preference list, and DB preference list). Screen 1500 may enable the DBM user to either accept or decline this buddy/MEM user being suggested by the ODS (e.g., through interaction with the checkmark (accept) or x-box (decline)). If a DBM user declines the suggested buddy/MEM user (e.g., at screen 1500), the ODS may identify a new suggestion for a MEM user to be a buddy for that DBM (e.g., by identifying another result of the above-described buddy/MEM-DB linking algorithm and/or by re-running the above-described buddy/MEM-DB linking algorithm while potentially taking into consideration one or more DBM user-supplied reasons as to why the previously identified and suggested buddy/MEM user was declined by the DBM user so as to generate a more effective buddy/MEM-DB linking algorithm), and the ODS may provide that new suggestion to the DBM user on a new screen 1600.

If a DBM user accepts the suggested buddy/MEM user (e.g., at screen 1500), the ODS may notify the buddy/MEM user of that acceptance such that the MEM user may accept or decline the DBM user (e.g., as described above with respect to FIG. 7). The MEM user acting as Buddy (BDM) or the exclusive BDE may review the profile information of the DBM, which may include personal information list, partner preferences and user as DB or Buddy preferences, as well as any other information made available that may assist Buddy in assessing for the fit of the potential DB. Then, if/when the buddy/MEM user accepts/declines the DBM user, the ODS may provide a "Your Buddy" screen (e.g., screen 1600 of FIG. 16) and enable the DBM user to view the buddy/MEM user's profile and encourage and/or facilitate and/or require forms of interaction between the DBM user and the buddy/MEM user (e.g., as described above with respect to the DB user of FIGS. 7-9). The ODS may enable the DBM to send a link (e.g., with free access) to the ODS for that buddy/MEM user's profile to any suitable contact of the DBM. After the contact (e.g., a friend of the DBM user) reviews the link with access to the profile of the DBM's new buddy (e.g., buddy/MEM user), if the contact decides to connect with that buddy, the contact may be enabled by the ODS to make a profile (e.g., for free as a CAND user profile) and may be introduced by the ODS to the buddy/MEM user. If the Buddy accepts such an introduction, the ODS may enable continued interaction between the DBM's buddy and the DBM's contact.

Figure 17:
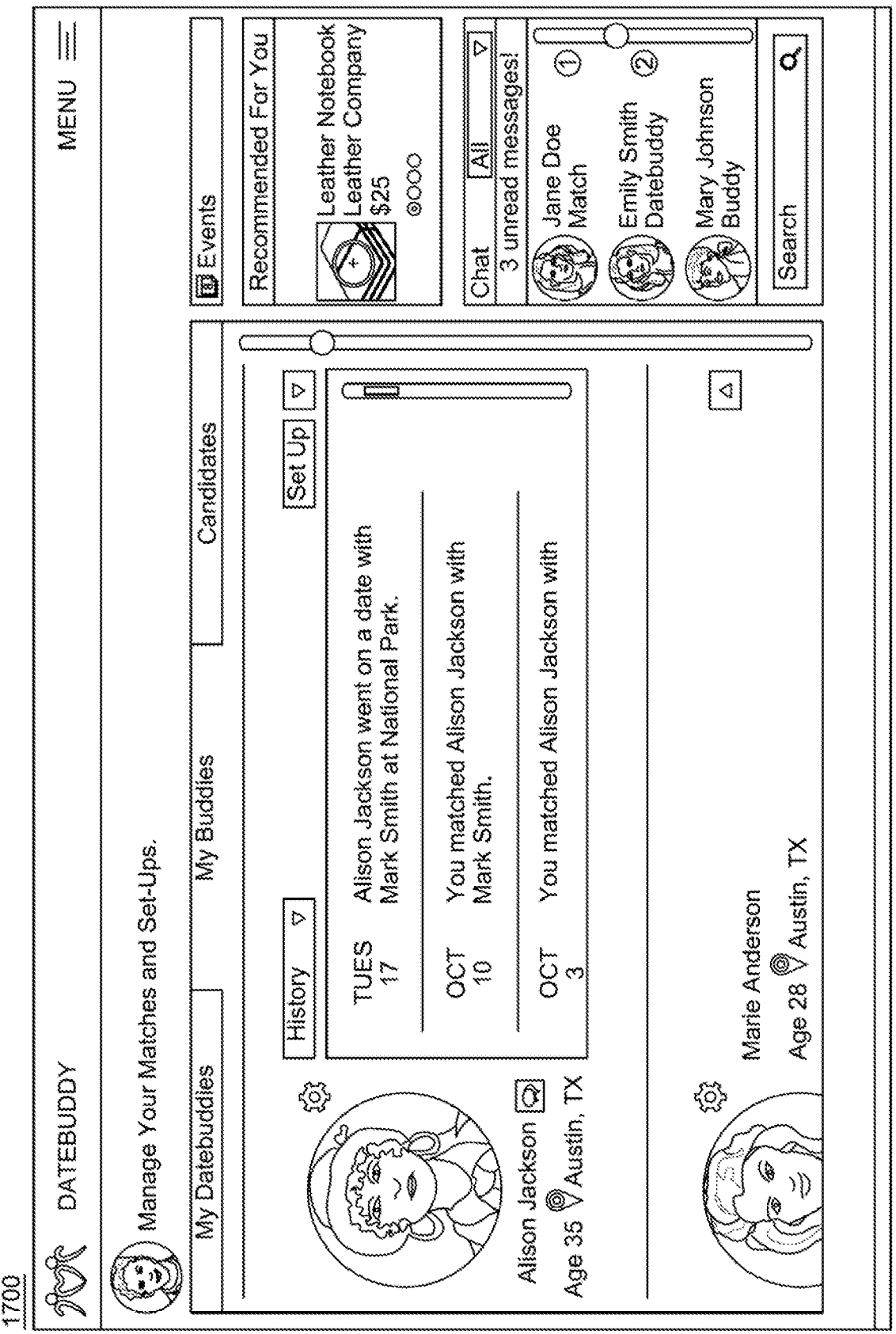

After any suitable interaction, which may be at set any level of engagement, and which may be adjusted over time, between a buddy/MEM user (e.g., MEM user or a BDE) and a DB's contact (e.g., CAND user), the responsible DB associated with both users may be awarded by the ODS (e.g., by any suitable denomination of BuddyBucks and/or any suitable denomination of CharityBucks). The ODS may enable a DB to monitor the progress of any one its buddy/MEM-CAND (e.g., buddy-contact) user interactions on a main dashboard of the DB (e.g., as shown by one or more of screens 1700-2400 of FIGS. 17-24). Under the Buddies tab, the ODS may provide a DB with a list of all the buddies he or she may be helping and/or have helped (e.g., most recent first). Under a picture or other identifying information for a buddy/MEM user may be information including history of activity and/or any information regarding any candidates that the DB may provide or may have provided to the buddy (e.g., the buddy/MEM user's new matches, such as newest first, as shown by screen 2100 of FIG. 21, and/or the DateBuddy's candidates, as shown by screen 2900 of FIG. 29). For example, as shown by FIG. 17, the ODS may not provide personal or intimate details of a buddy/MEM-CAND interaction to the associated DB, but the ODS may enable the DB to identify whether that buddy/MEM-CAND match is still active as opposed to dismissed, and/or whether the buddy/MEM-CAND matched users ever physically met or achieved any other suitable achievement and/or level of engagement that may trigger one or more suitable rewards being awarded to the DB. As shown, a main dashboard of a DB may also enable a DB to monitor various contacts/CAND users (e.g., via a "Candidates" tab), which may enable a DB to see a list of any/all CAND users that the DB user may have introduced to the site (e.g., may be newest first or activity first) and/or any buddies/MEM users that you may have attempted to connect them with. The ODS may enable a user (e.g., a DB user) to track its statistics for accrual of rewards (e.g., BuddyBucks, CharityBucks, etc.) and setup stats and rankings from a separate dashboard. BuddyBucks may represent a coupon system that can be applied to any of the stores and/or vendors within the ODS network. BuddyBucks may represent a specified amount of discount on a given product or service, which, on a per item basis, may have defined usage and/or other limitations that may be explicitly specified. CharityBucks may be a specified amount of money donated by the ODS on any suitable basis (e.g., monthly or quarterly) to one or more charities or other organizations that may be denoted by a member and on that member's behalf for their participation. The amount of CharityBucks may be determined by the financials of the ODS, and may be adjusted from time to time depending on financial conditions. The amount of CharityBucks may be specified in advance for any CharityBucks awarded. Any change may apply to CharityBucks not yet awarded.

Figure 18:
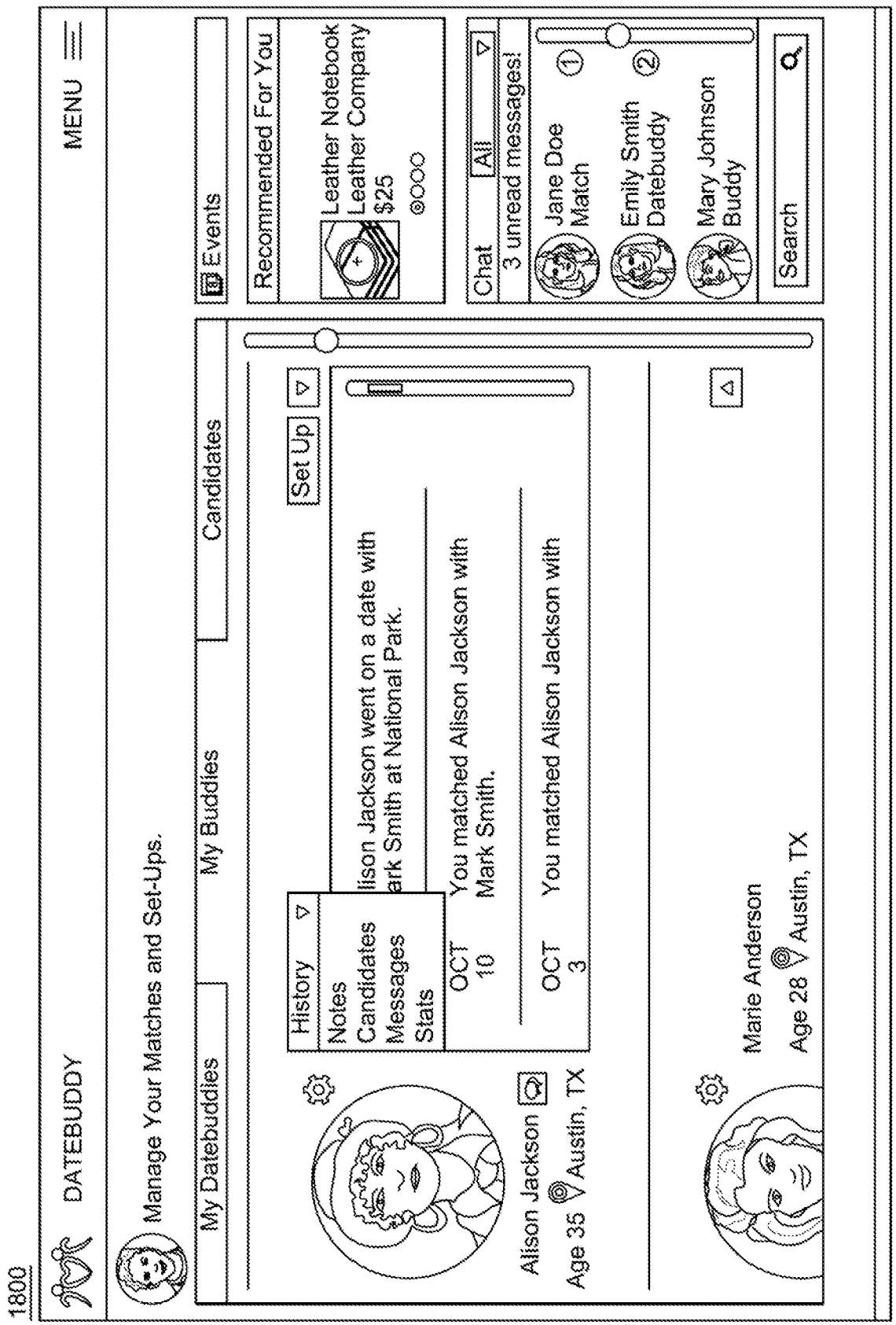
Figure 19:
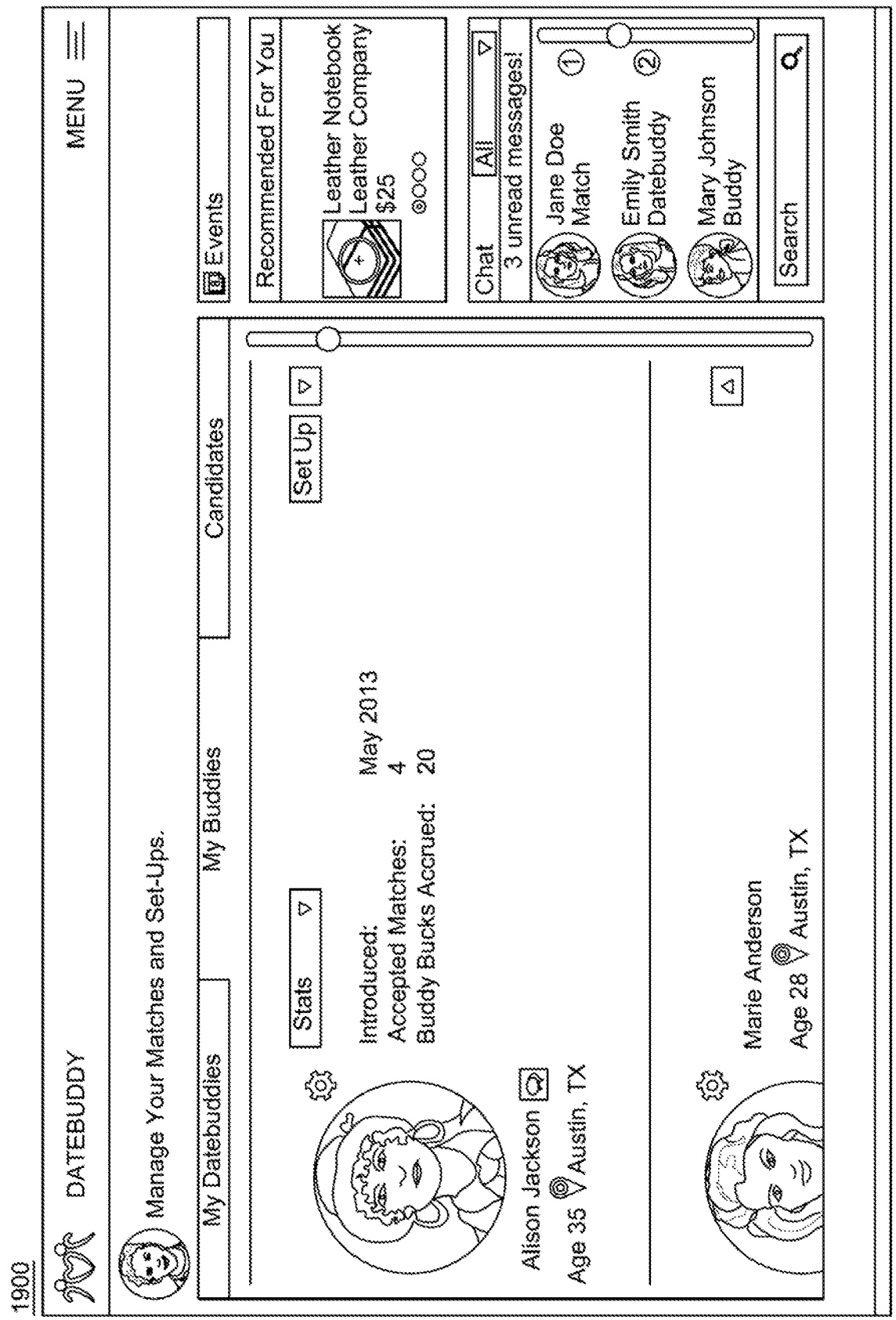
Figure 20:
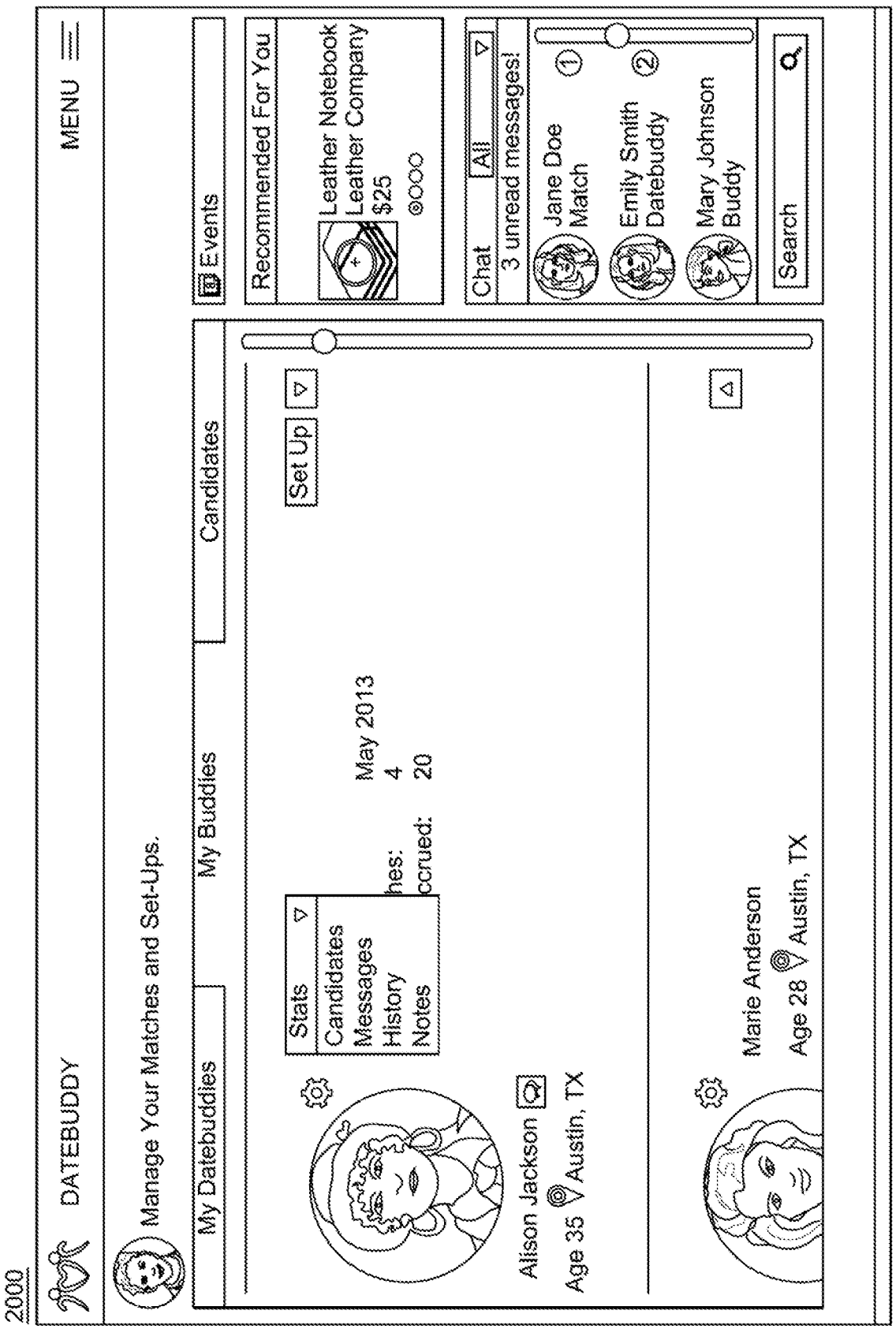
Figure 21:
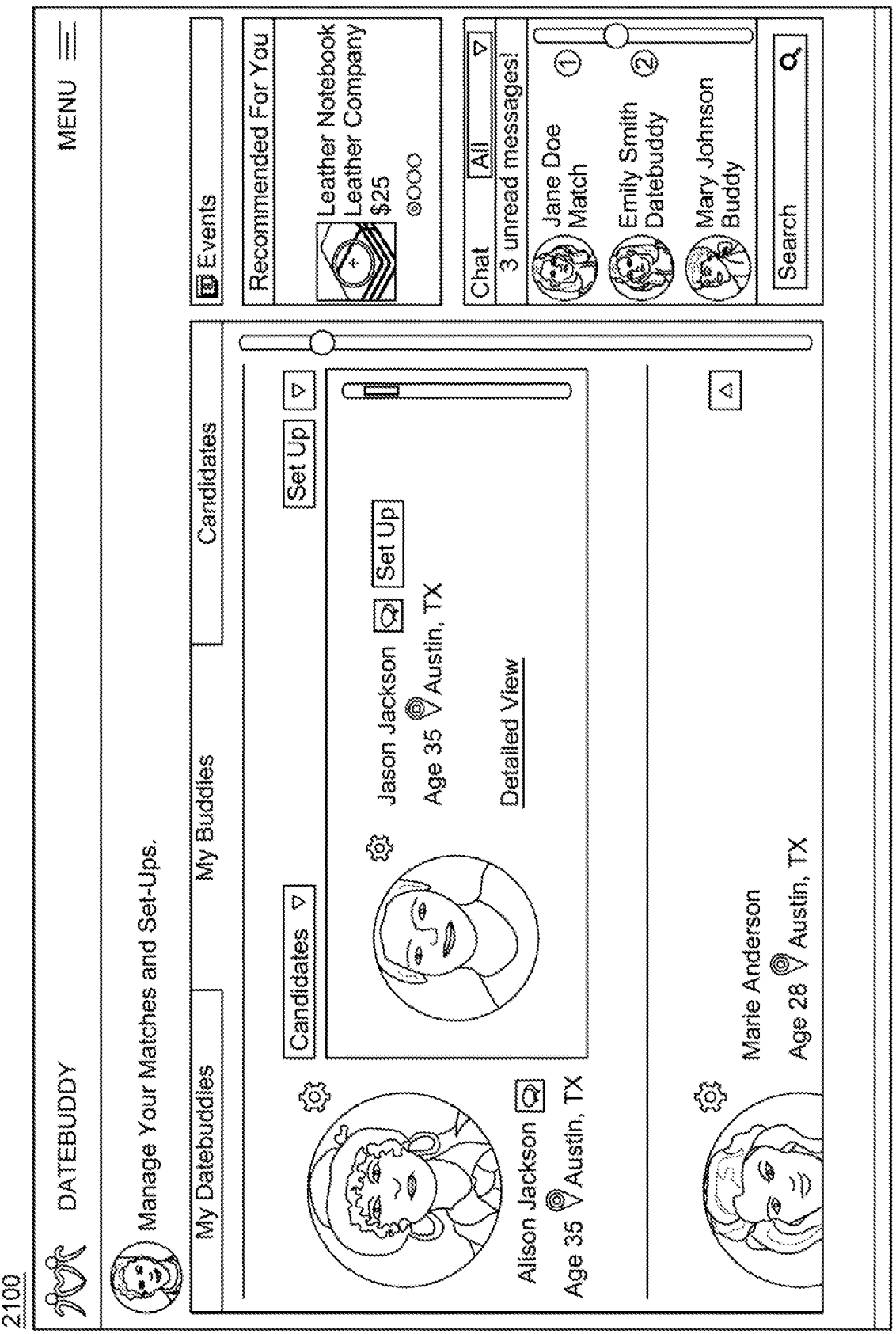
Figure 22:
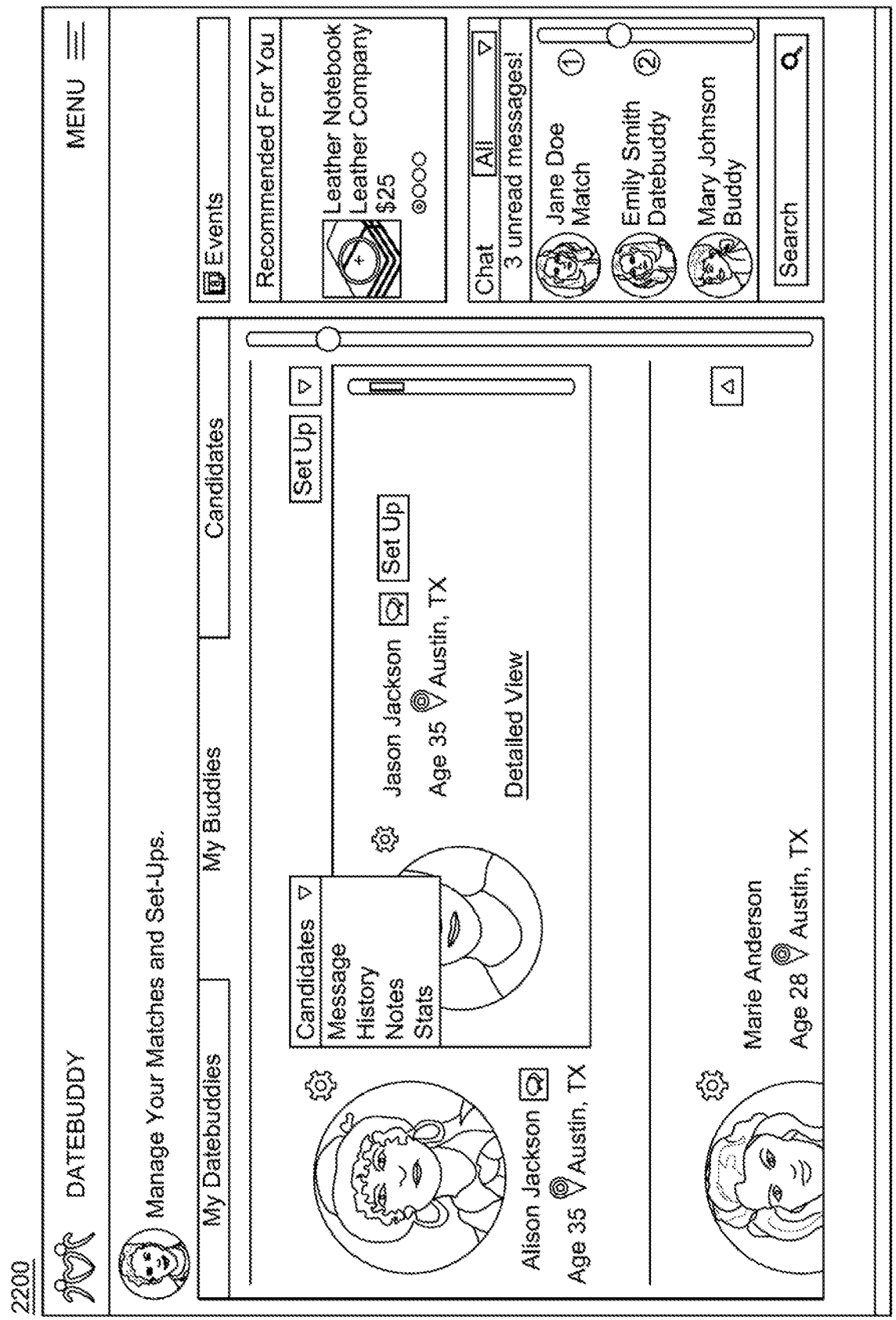
Figure 23:
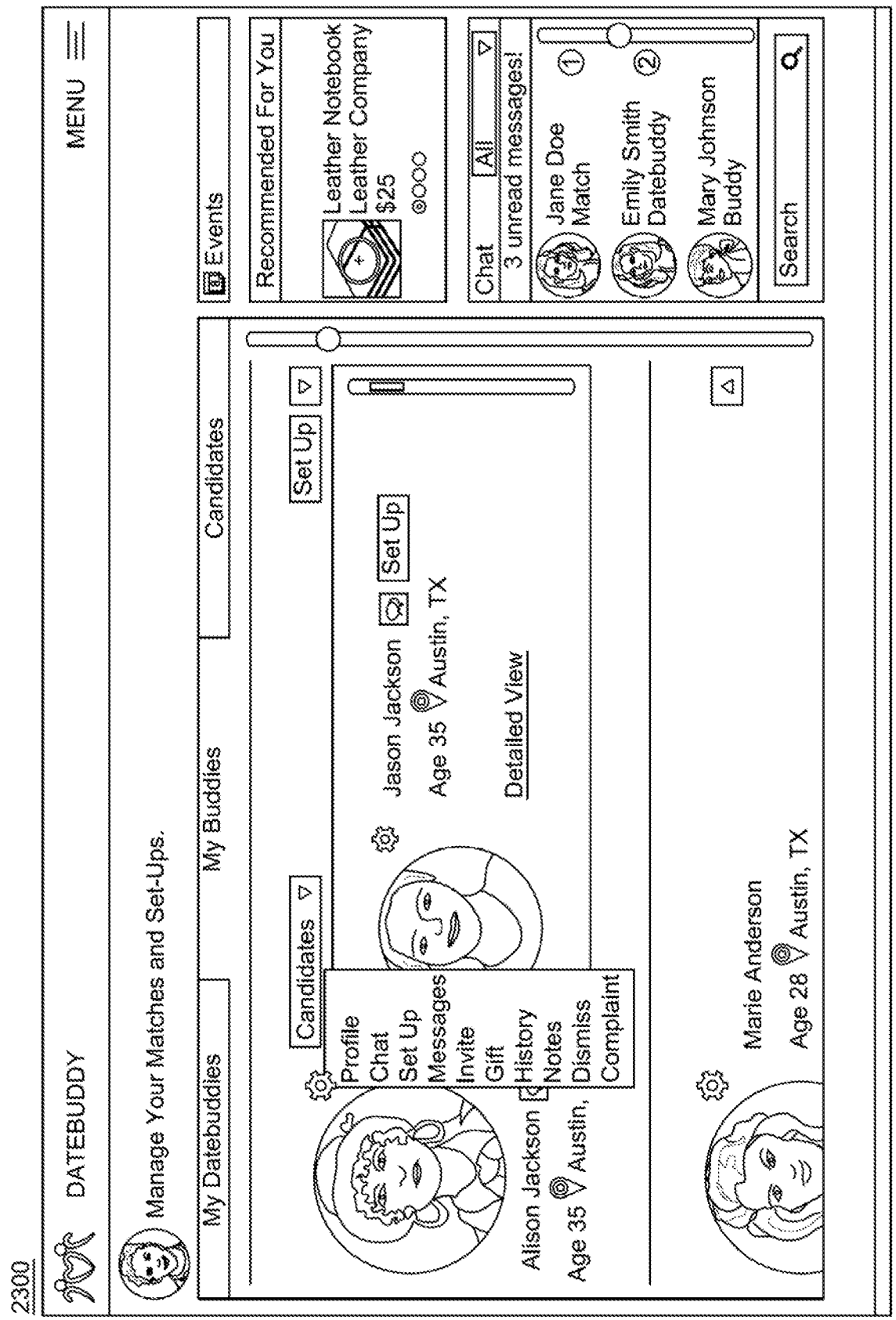
Figure 24:
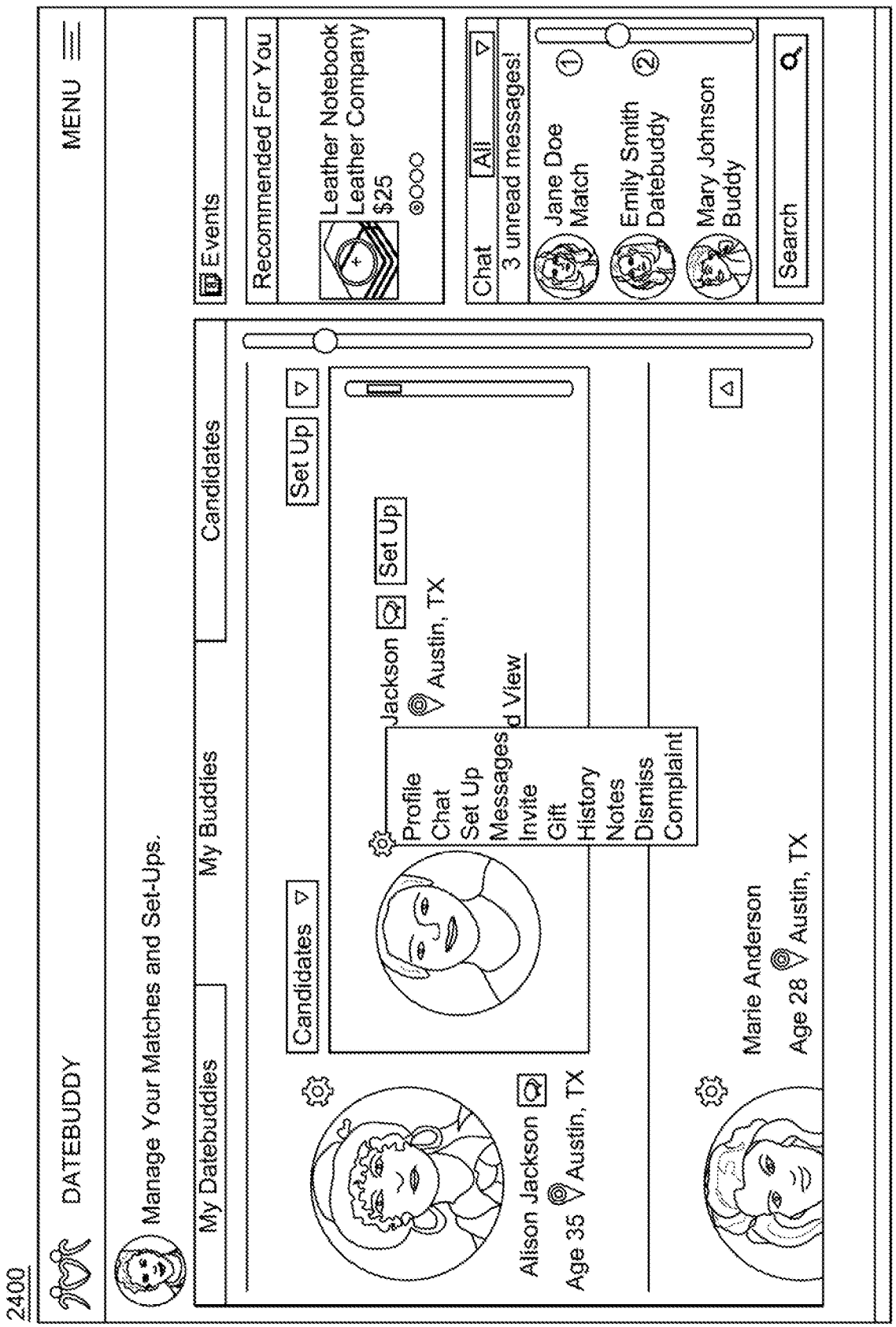

Such a "My Buddies Set Up Dashboard" page of screen 1700 of FIG. 17, screen 1800 of FIG. 18, screen 1900 of FIG. 19, screen 2000 of FIG. 20, screen 2100 of FIG. 21, screen 2200 of FIG. 22, screen 2300 of FIG. 23, and/or screen 2400 of FIG. 24, instead of showcasing the Datebuddies that are acting as the member's matchmaker, may showcase the members that this member is trying to help by trying to set them up with one of their friends/contacts. The member being helped, or set up, may be called a "Buddy," and all the Buddies this member is helping may be listed or otherwise presented here by the ODS, with the most recent first. To clarify for purpose of reference, the member who is looking at this dashboard may be acting as the "Datebuddy," or matchmaker, for the "Buddies" in their "Buddy" section. When this member reviews all of their friends and contacts to offer possible matches for their Buddies, these friends/contacts may be referred to herein as "Candidates" until they review the Buddy being helped and decide they are interested in meeting them, then they may be introduced to the "Buddy" as a "New Match," and if accepted, the Candidate may be a "Match" from the "Buddies" perspective. The panel showing the Buddies the member is helping (as their matchmaker) may include their photograph and basic information below, a gear icon with functionality described herein, links for "Set Up" and Profile, and a drop down to choose the contents in the panel including "Candidates," messages, notes, history, and stats. The "Candidates" choice may show all the Candidates that have been offered as potential "Matches" for the given "Buddy," with the most recent shown first. The "Candidate" panel may include their photograph, basic information, and gear icon described herein, links for "Set Up" and Profile, and "Detailed View" which may launch their Dashboard view under the "Candidates" tab. The drop menu may include the same components as described elsewhere herein. When the member looks at their "My Datebuddies" tab, they may be looking at information about the matchmaker and matches offered to them in the hopes of romance for them. When the member looks at their "My Buddies" tab, they may be looking at information about helping another member by acting as their matchmaker, and offer their friends/contacts ("Candidates") to become "New Matches" for the "Buddies" they are trying to help.

As mentioned, a contact that may be known by a DB by any suitable means and/or through any suitable network may be contacted by the DB, either directly or via the ODS, such that the contact may be offered a link or any other suitable data that may be at least partially generated by the ODS, which may enable the contact access (e.g., free access) to certain information of the ODS (e.g., user profile data of buddy/MEM user associated with the DB—the specific buddy profile that the contact's friend is helping as a matchmaker DB). The contact can review at least a portion of the buddy's entire profile and, if the contact is interested in reaching out or otherwise connecting with that buddy/MEM user, can then create a profile (e.g., a CAND profile, such as for free) with the ODS (e.g., via pathway C, to provide additional information as user responses to one or more examples of the above personal information list and/or partner preference list) so as to be introduced to that buddy/MEM user. After such a CAND user profile has been created for that contact, at least a portion of that CAND user profile may be offered to the buddy user for a new match acceptance (e.g., via the DB user). If the new match is not accepted, the ODS may politely communicate to the contact CAND user that it has been turned down by the buddy/MEM user, thank the contact CAND user for its participation, and offer the contact CAND user the ability to join the ODS as a full MEM user (e.g., at a discounted initial charge or upgrade to a greater or different level of participation). This dismissal procedure may also occur if the CAND is dismissed at any point further into the process. If a contact CAND member chooses to accept such an offer by the ODS, the contact CAND user may be directed by the ODS to a MEM user profile creation process (e.g., via pathway A) to complete the remainder of the user profile process (e.g., to provide additional information as user responses to one or more examples of the above DB preference list and/or user-as-DB list). However, if the buddy/MEM user accepts the contact CAND user's new match offer, the ODS may enable the buddy/MEM user and the contact CAND user to interact and the ODS can monitor their interactions on modified dashboards specific to each of their relative perspectives which may display the individual interaction between the buddy and the candidate. In some embodiments, as a non-member, the contact CAND user may not be functioning as a datebuddy and, therefore, may not have an opportunity to receive any BuddyBucks or CharityBucks, and, thus, may have no need for the associated rewards dashboards. Also, as a non-member, such a contact CAND user may not have access to a community site of the ODS.

As mentioned, the ODS may enable certain individuals that would like to interact with the ODS as a matchmaking datebuddy so as to introduce their friends to buddy/MEM users and receive rewards for successful introductions, but that do not currently have interest in meeting a partner or being provided with potential matches. Such individuals may interact with the ODS as DBE users (e.g., via pathway D, which may be similar to pathway B). A DBE user may be enabled by the ODS to fill out a modified user profile that may be limited to what information may be necessary to support a DB-buddy/MEM linking algorithm of the ODS, and/or to information that may be appropriate for a buddy/MEM user to review in order to decide if they are comfortable with the DBE acting as a datebuddy for them (e.g., information from the DB user's responses to one or more examples of the above user-as-DB(or Buddy) Preferences list and personal information list). A DBE may be enabled by the ODS to monitor the DBE's interactions with its buddies/MEM users that the DBE is assigned to help (e.g., from a main dashboard under a buddies tab, which may be similar to the buddies tab of FIGS. 17-24), such that the buddies the DBE has acted as a datebuddy for may be listed (e.g., most recent first). Each buddy may be identified by a picture and/or any other suitable information and/or along with any suitable activity history and/or a list of any candidates (e.g., DBE's friends) that the DBE may have offered to the buddy (e.g., most recent first). Another tab that may be active for a DBE is a candidates tab (e.g., which may be similar to the candidates tab of FIGS. 17-24), which may include a list of all candidates (e.g., DBE's friends) that have been offered to any of the DBE's buddies (e.g., most recently first). As a DBE may not be looking for a partner, a datebuddy tab of such a dashboard may be inactive (e.g., as they are not being assigned a datebuddy). Since a DBE may be performing the datebuddy function for other members (e.g., buddies/MEM users), a DBE may be rewarded whenever a meeting or other achievement threshold and/or level of engagement may be met between a buddy/MEM-CAND connection caused by that DBE (e.g., with BuddyBucks and/or with CharityBucks), which may be just like a regular member who performs the datebuddy function (e.g., a DBM), and therefore may have access to the dashboards that may track rewards, BuddyBucks, CharityBucks, stats regarding setups history, as well as access to any store and/or community pages of the ODS. As mentioned, the ODS may enable certain individuals that would like to interact with the ODS as a partner-seeking buddy to be provided with a DB user who may introduce their friends as candidates for potential matches, and possibly receive rewards for achievements and/or specific levels of engagement, but that do not currently have interest in participating in the DB role (as a DB for another user). Such individuals may interact with the ODS as BDE users (e.g., via pathway A. A BDE user may be enabled by the ODS to fill out a modified user profile that may be limited to what information may be necessary to support a DB-buddy/MEM linking algorithm of the ODS, and/or to information that may be appropriate for a DB user to review in order to decide if they are comfortable acting as a DB for that BDE (e.g., information from the BDE user's responses to one or more examples of the above DB Preferences list, personal information list and partner preferences list). A BDE may be enabled by the ODS to monitor the BDE's interactions with its DB users that the BDE is assigned to (e.g., from a main dashboard under a Datebuddies tab, which may be similar to the buddies tab of FIGS. 17-24), such that the datebuddies the BDE has and/or are being helped by may be listed (e.g., most recent first). Each Datebuddy may be identified by a picture and/or any other suitable information and/or along with any suitable activity history and/or a list of any candidates (e.g., DB's friends) that the DB may have offered to the BDE (e.g., most recent first). As a BDE may not be acting as a Datebuddy for any user, a buddy tab of such a dashboard may be inactive (e.g., as they are not being assigned a buddy). In some embodiments, a BDE may be rewarded whenever a meeting or other achievement threshold and/or level of engagement may be met between a buddy/MEM-CAND connection (e.g., with BuddyBucks and/or with CharityBucks), and therefore may have access to the dashboards that may track rewards, BuddyBucks, CharityBucks and/or have access to stats regarding setups history, as well as access to any store and/or community pages of the ODS.

Various reward types may be rewarded at different times to different ODS users based on different achievements being met. For example, a DB may be rewarded each time a certain type of connection is made by a buddy/MEM- CAND match facilitated by that DB. For example, a first reward of a first type and first value may be awarded to a DB when such a contact of the DB (e.g., friend of the DB) creates a new CAND account with the ODS (e.g., in response to receiving a link from the DB for viewing the profile of a buddy/MEM user). Additionally or alternatively, a second reward of a second type and second value may be awarded to a DB when a DB-facilitated buddy/MEM-CAND match is first made via the ODS (e.g., when the CAND user approves a buddy/MEM user for a connection and that buddy/MEM user approves of that CAND user for a connection). Additionally or alternatively, a third reward of a third type and third value may be awarded to a DB when the buddy/MEM user and the CAND user of a DB-facilitated buddy/MEM-CAND match first meets in person (e.g., a physical, in-the-flesh meeting occurs, which may be detected/ensured in any suitable way by the ODS, such as by honor system of self-reporting or by the ODS matching location-data (e.g., GPS data) simultaneously received by the ODS from a first client device 100 that may be associated by the ODS with the buddy/MEM user and from a second client device 100 that may be associated by the ODS with the CAND user). Each successive interaction by the buddy/MEM-CAND users may result in an additional reward for the responsible DB. Location-based data for one or more users may be facilitated by the ODS (e.g., at each user's approval) for various other purposes, such as detecting a user at a social calendar event and/or a charity calendar event and/or an informative/educational event at an appropriate time. Any user participating in a community event, whose types may include social, charitable/benevolent and/or informative/educational, may result in a reward for that user. When two DB's meet, one or both DBs may be rewarded for such a meeting, which may be used to share contact networks or share tips on matchmaking. When two DB's meet for a first meeting/date, the user responsible for setting them up may be rewarded (e.g., if that user is an ODS member capable of receiving rewards within the process).

In some embodiments, a buddy/MEM user may request that the ODS provide the buddy/MEM user with more than one DB at a time (e.g., for an additional fee). Alternatively or additionally, a DB user may request that the ODS provide the DB user with more than one buddy/MEM user at a time (e.g., for increasing the ability of that DB user to receive rewards for facilitating successful buddy/MEM-CAND connections, and thereby increasing the success of the ODS).

In some embodiments, the ODS may enable a group of two or more individuals or users to create and/or user a single DB user entity or DB group. Additional examples of this grouping process may include an organization or organized (e.g., formal or informal) group, which can be enabled by the ODS to create a single DB Group that may pool multiple individuals' DB skills together for a single cause. A DB Group may be ranked separately from an individual DB user, may have their own community sub-type, and/or may have separate events and a different reward structure. A DB Group may include a leadership role and/or other organizational/administrative components to provide appropriate management to such an entity. The concept of grouping may extend beyond the DB construct, to a broader social network construct (e.g., such as the BN discussed elsewhere in this document), which may apply to other role types in this broader network, including a student role (e.g., student groups), coaching/mentoring role (e.g., coaching groups/mentoring groups), and/or buddy roles (e.g., buddy groups), where each may be inter- and/or intra-community based, as described below.

In some embodiments, the ODS may enable a unique or specialized individual or user or entity, such as a famous person or person of interest or organization, to interact with the ODS as a single or group DB. Such a DB may serve as a significant charitable or marketing driver and increase the exposure and success of the ODS. As a charitable enterprise, the ODS, with and/or beyond the CharityBuck construct, may arrange a reward to a charity based on some part of the process of the ODS, including, but not limited to, the following:

1. Person of interest participating in process, either as DB (single or group) or member
2. Organization (formal or informal) participating in process, either as DB (single or group) or member
3. Person of interest or organization (formal or informal) participating in auction process
4. Person of interest or organization (formal or informal) participating in calendar event, either social or charitable/benevolent or mentorship In some embodiments, the ODS may enable or otherwise facilitate auctioning/bidding for certain features of the ODS. For example, the ODS may enable the auctioning of a DB function based on rankings, the auctioning of a DB function based on profile, the auctioning of a DB function including single or group subtype, and/or a bid structure that may be based on money or other form of barter (e.g., BuddyBucks), offer of charitable/benevolent assistance, or mentorship via other network sites. The desirability of a DB function may be based on multiple factors, including, but not limited to, their profile characteristics, the metrics relating to their DB performance including the number of DB user-buddy/MEM user interactions, the duration or average duration of such interactions, the number of CANDs offered, the number of buddy/MEM user—CAND user introductions, the number of buddy/MEM user—CAND user meetings/first dates or any other level of engagement, and/or the fame or prestige or association of their identity in the case of a unique individual or group. These and other factors may afford a level of incentive that could result in an auction page/site where these different parameters may be tracked, and/or bidding may be done by buddy/MEM users and/or CAND users via many possible forms of barter, including BBs, CBs, money or a form of charitable/benevolent or coaching/mentoring act.

In some embodiments, the ODS may support and/or enable any suitable reward structure with any suitable reward types of any suitable value for any suitable item, service, or feature. For example, a BuddyBuck may be a discount that may have a specific monetary value to be applied within an eStore or to any suitable vendor associated with the ODS, or may be redeemed for any acceptable form and amount of barter as defined by the ODS, which may include an offer of charitable/benevolent assistance or mentorship via other network sites. A CharityBuck may be a charitable donation from the ODS to a charity designated by an ODS user or other suitable situation that may be of a specific amount that can be tracked from a dashboard by the user and/or by any other mechanism of the ODS. The exact monetary value may be adjusted based on financial viability. A Barter Structure may be enabled by the ODS that may designate some form of barter, such as an offer of charitable/benevolent assistance or mentorship via any site in of the ODS. The ODS may be configured to vary, at any specified time or within any specified time frame, for any given behavior of any given user or factor, an amount of a reward, what is rewarded, and/or what type of reward may be assigned to any suitable user. The ODS may be configured to select at random (e.g., from time to time) any type of reward structure to be assigned in a random fashion in association with some variable, such as a particular week in which the ODS may reward a specific behavior of a specific user type with a specific type of reward when the ODS otherwise may not have done so under usual circumstances. An example may be "This week only, any first meeting between a buddy/MEM user and a CAND user results in double the usual rewards for the DB," or possibly "This week only, buddy/MEM users get rewards for first meetings with a CAND user," and/or to reward a behavior already assigned a known reward to receive a larger or multiple reward for a specific time frame. Any suitable behavior of any suitable user may be tracked by the ODS and may be used to assign a reward of any type. Although DB and MEN/STUD functions and interactions (and participation in benevolent/charitable acts) may be best suited for rewards, any other users or interactions of the ODS may be rewarded in any suitable manner (e.g., to aid in incentivizing participation in site or a benevolent act/event). Such a reward structure may be linked to many different pathways, including level of engagement with CAND users, participation in any calendar event including social, informative or benevolent/charitable and levels of engagement for BN/MEM users for level of engagement as well, and the like.

In some embodiments, the ODS may support, enable, and/or facilitate an eStore (see, e.g., screens 2700 and 2800 of FIGS. 27 and 28) or any other suitable relationship with any suitable vendor of any suitable item, service, and/or feature. Although such an eStore may have the unique nature of utilizing a discount driven by performance of a user with respect to any suitable service of the ODS, the store itself may use "BuddyBucks" or any other suitable reward of the ODS as a discount and function otherwise much like a normal store. The ODS may track the performance and, thus, any discount available, in real-time, and may have a predetermined cap on an amount of discount available for any given purchase (e.g., depending on cost of item, margins, user, etc.).

In some embodiments, the ODS may support, enable, and/or facilitate the tracking of any suitable metrics that may be kept for any participatory/interactive behavior of any suitable user for any suitable reason, including, but not limited to:
  A) DB—Contact accepted between MEM (Buddy role—either BDM or BDE) and CAND due to that DB.
  B) DB—First meeting/date of MEM (Buddy role—either BDM or BDE) and CAND due to that DB.
  C) DB—relationship achieved between MEM (Buddy role—either BDM or BDE) and CAND due to that DB. An input section (not shown) may allow a MEM (Buddy role—either BDM or BDE) user to acknowledge a level of engagement in a relationship, or other aspects relating to both quantitative and qualitative aspects of an evolving relationship, which may include ranking responses and checkboxes. These metrics may affect the visual display on the dashboard depicting that specific relationship, may be used to improve an ODS algorithm, may be used for variable reward structures, may be used for a ranking of a DB introducing the two users, and the like. Level of engagement can also be tied to an eStore via special marketing that may be specific to a certain level of engagement achieved.
  D) Any user—Participation in calendar event:
    1. Social Event
    2. Charitable/Benevolent Event
    3. Informational/Educational Event
  E) Buddy encounters, which may also refer to users of BN, a broader social network extrapolation of the datebuddy construct of the ODS. As described below, using GolfBuddy as an example, if a user desires to find a local player with similar characteristics to play with, any level of engagement of these two members matched by an algorithm may be tracked for many purposes, which may include to better construct the algorithm so that it is more effective, to provide a reward structure that may aid in cultivating friendship by rewarding socialization, the tracking of participation in shared benevolent acts driven by calendar, on the premise that shared participation may incentivize participation, which may incentivize benevolent behavior in addition to friendship cultivation. Also, the tracking of shared participation may be tracked via location-based services technology. Mentor and student contact may refer to tracking the meetings or any level of engagement of STUD and MEN users that have been matched by an algorithm of the system, which may be used for improving the algorithm, triggering a reward structure as mentioned earlier in this document, or may be used by the user, the administrator, or other users.
    1. First contact with new group/circle member
    2. Mentor contact
    3. Student contact
  F) Create group/calendar event (e.g., attended by at least one user attendee):
    1. Social Event
    2. Charitable/Benevolent Event
    3. Informational/Educational Event In some embodiments, the ODS may support, enable, and/or facilitate competition. For example, the ODS may generated and/or provide rankings based on metrics for a given behavior of a given user while interacting with the ODS that may be used to assign additional rewards and/or may be used for algorithm inclusion to improve efficacy of match compatibility and/or inclusion into the profiles that may be visible to one or more user roles to aid in their assessing the compatibility fit of their prospective DB, Buddy or CAND roles and/or for marketing purposes and/or for auctioning purposes in bid/auction scenarios. For example, such rankings may be tracked publicly on the ODS, may be visible only to the user(s) being tracked, and/or may be visible only to an administrator of the ODS. Metrics may be used to track and rank groups of DBs (e.g., single or group DBs) with some common association, such as affiliation with a college, corporation/business, organization or town. Rankings may also be associated with a tiered subscription rate strategy or additional fee. Metrics may be collected in any fashion which may provide meaningful and relevant interpretation, which may include, but not be limited to parameters such as within a specified time frame, within a specified user type or role.

In some embodiments, the ODS may support, enable, and/or facilitate creation, maintenance, display, and/or use of a calendar, which may include any suitable events, which may be created by a user or to which the user may be invited, including, but not limited to, the following:
  A) Individual Event:
    1. Dating Event
    2. Social Event
    3. Charitable/Benevolent Event
    4. Informative/Educational Event
    5. Mentor Event
    6. Student Event B) Group Event:
   1. Social Event
   2. Charitable/benevolent Event
   3. Informative/educational Event In some embodiments, the ODS may support, enable, and/or facilitate a swapping event amongst two or more users of the ODS. For example, two different MEM users functioning in a buddy role for two different DB users may swap/trade their DB's amongst each other (e.g., with the consent of all). This buddy swap may also be allowed if one or both participants are exclusive buddy's, or BDEs (may allow for any permutation of BDMs and BDEs). As another example, two different DB users functioning in a matchmaker role for two different buddy/MEM users may swap/trade their buddy/MEM users amongst each other (e.g., with the consent of all).

Figure 36:
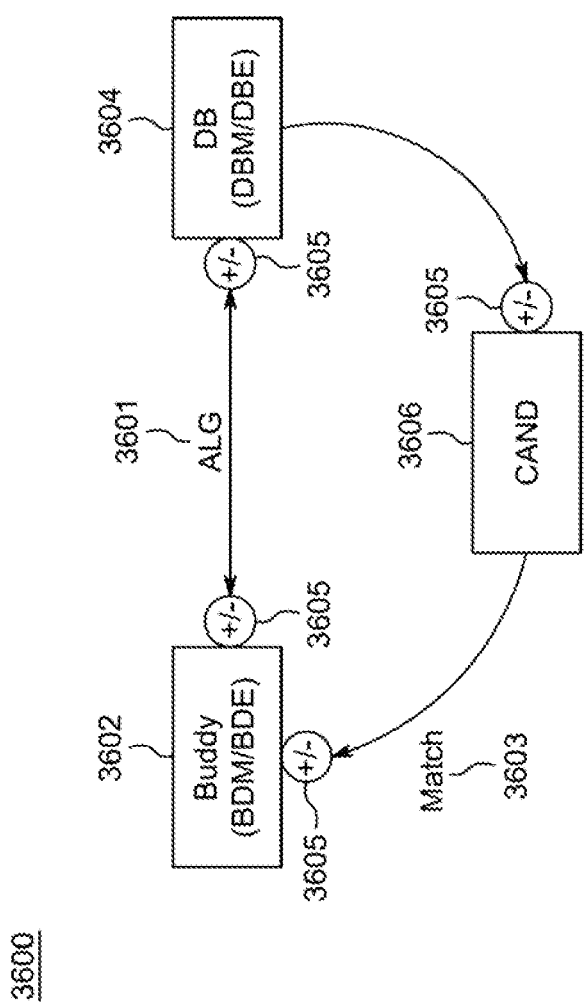
FIGS. 36-39B are flowcharts of illustrative processes for features of the service of the disclosure.
Figure 37:
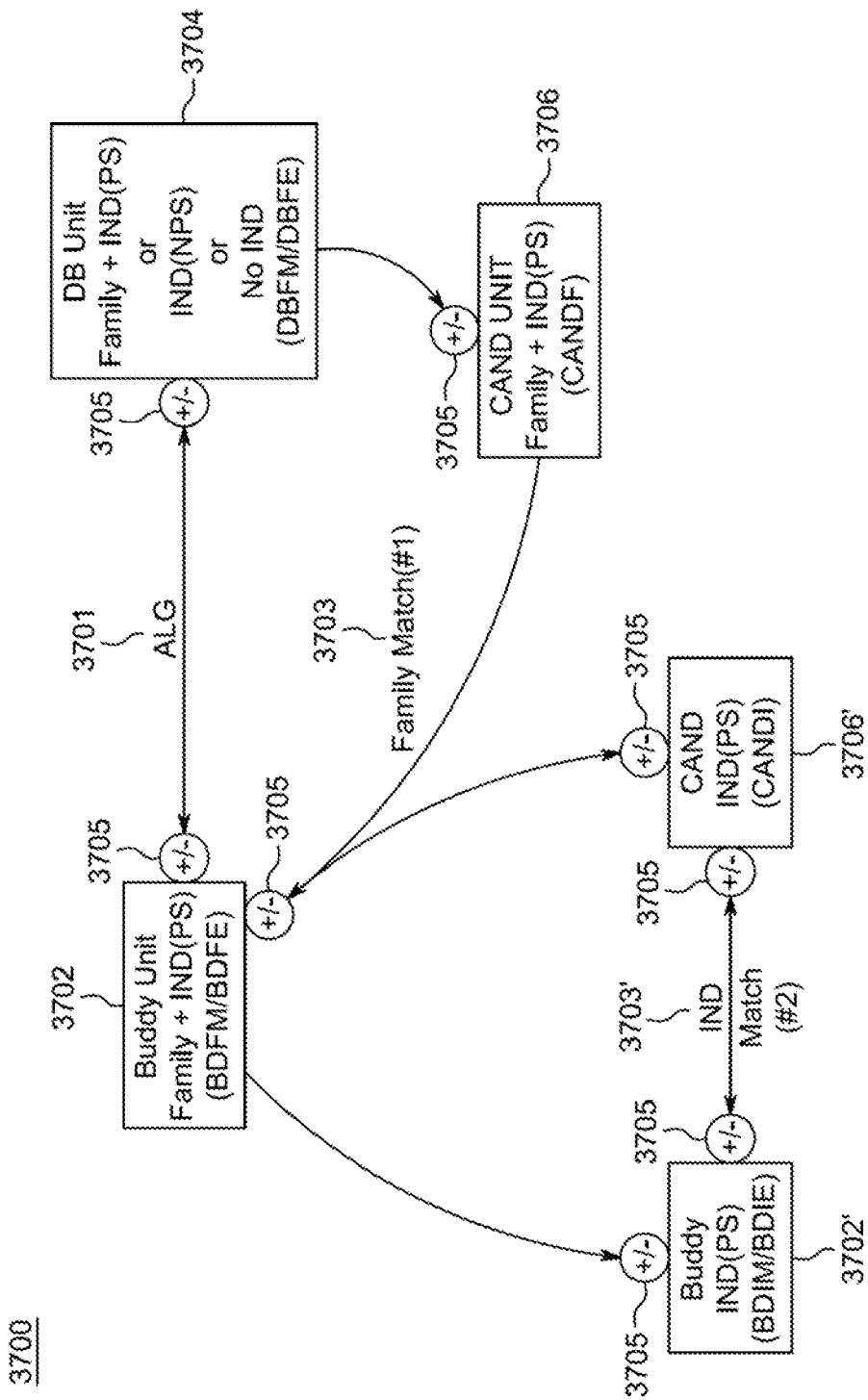

Description of FIGS. 36 and 37

FIG. 36 may depict an exemplary DB paradigm 3600, as may be described above, where an algorithm 3601 may match the Buddy role 3602, which may be performed by a subscribing single partner seeking member, with the DB role 3604, which may be performed by a second member who may be single and may be partner seeking. The DB role 3604 may provide to the Buddy role 3602 set ups of any friends they know who might be compatible with the Buddy. These friends of the DB may be performing the Candidate role 3606. Set up between the friend of the DB (the Candidate) and the Buddy may be a non-algorithm match 3603 (the "+/−" icon 3605 of paradigm 3600 may be indicative of a call to action for acceptance or rejection of a proposed connection). In such a model, all parties may be individuals, though variants described herein where this may not be true include the DB role performed by groups that may include couples, friends, multiple individual DBs that have come together to form a group, an organization (formal or informal, which may center around benevolence, charity, informational/educational, spiritual), a business or corporation (or some subset thereof), a famous individual acting as a unique entity, a group created by an algorithm, etc.

FIG. 37 may depict an "Eastern Culture" or other suitable qualifier for a variant of a paradigm 3700, which may represent two common forms of relationship building reflected in the cultures of that area. The first may be a parent/family/support group arranged relationship, and the second may be a hybrid of the parent-arranged construct combined with self-arranged, which may be labelled as arranged with consent. In such a construct, the Buddy role may represent a Buddy unit 3702 that may include a family component and an individual ("IND") component. The family component may include parents, immediate family, extended family, or significant others, or any other entity or group of entities that may have a vested interest in the wellbeing of the individual. The individual component may be the single person who is seeking a partner ("PS"). As with paradigm 3600 of FIG. 36, the Buddy role 3702 of paradigm 3700 of FIG. 37 may include two sub-types, one which may perform both the Buddy role and (with a different member) the DB role, the other which may exclusively perform only the Buddy role. The algorithm match 3701 may mimic the model of FIG. 36 described above in that it may match a Buddy role 3702 with a DB role 3704. However, in this variant, the Buddy role 3702 may be performed by a family/individual unit, and so too may be the case with the DB role 3704. In this construct the DB role 3704 may include a "family" component and an individual (IND) component (optional in some variants—which may mirror the classic DB paradigm in which some variants may include individuals performing the DB role that may not be currently seeking a partner (IND (NPS)), but may wish to participate in the DB, or matchmaking, function to set up their friends) (the "+/−" icon 3705 of paradigm 3700 may be indicative of a call to action for acceptance or rejection of a proposed connection). The family component may include parents, immediate family, extended family, or significant others or any vested entity. The individual may be a demographically matched age range considered person who may or may not be seeking a partner, but whose demographic consideration when matched with either Buddy family or Buddy individual partner preferences may increase the likelihood of compatibility of the eventually offered Candidate family/individual unit with the Buddy family or Buddy individual. In other words the Buddy family and/or the Buddy individual may be more likely to find a compatible match in the friends child of a DB family who themselves have a child who is demographically matched to the Buddy family and/or individual preferences. Families who are friends of other families may tend to be more likely similar in their demographics, and a child of the DB family may be more likely to be friends with children who are similar demographically, so this would suggest an increased likelihood that a child of a DB family who has friends that are demographically similar, and whose demographics are considered in the algorithm 3701 with the partner preferences of the Buddy family and/or the Buddy individual, would be more likely to choose/offer a Candidate family unit which contains an individual seeking a partner who is demographically similar to the Buddy Family partner preferences and/or the Buddy individual partner preferences, thereby increasing the probability that the individual Buddy who is partner seeking and the individual candidate who is partner seeking are more likely to be compatible due to the combination of demographic compatibilities between preferences requested and characteristics which are present, along with the personal touch of the family offering the candidate family suggesting them as an option choosing this family/individual unit based on their personal assessment of the potential for compatibility as well (e.g., mimicking the previously described DB paradigm where the DB choosing which friends to offer as a Candidate may take into consideration their own personal thoughts about the compatibility of a potential match beyond input data considered by the algorithm alone). The Candidate role 3706 of FIG. 37 may be performed by a unit comprised of a family component and an individual component (both of which may be utilized). The family unit may include parents, immediate family, extended family and/or significant others or other vested entities. The individual may include an individual who is single and partner seeking. Similar to the above-described DB paradigm, the Candidate role 3706 may be a friend, acquaintance, peer or neighbor of the DB role 3704 that the DB role 3704 believes may be compatible with the Buddy role 3702. In this construct, compatibility may be considered on multiple levels, including compatibility of the families, compatibility of the individuals, or any permutation of those four constituents.

Buddy role 3702 of FIG. 37 may provide the following information:
   a) Type 1
      1) Family
         A) Personal information
         B) Partner Preferences i) Family partner preferences
   ii) Individual partner preferences
  C) DB Preferences
   i) DB Family Preferences
   ii) DB Individual Preferences
  D) Buddy Preferences
   i) Buddy Family Preferences
   ii) Buddy Individual Preferences
 2) Individual
  A) Personal Information
  B) Partner Preferences
   i) Family Partner Preferences
   ii) Individual Partner Preferences
  C) DB Preferences
   i) DB Family Preferences
   ii) DB Individual Preferences
  D) Buddy Preferences
   i) Buddy Family Preferences
   ii) Buddy Individual Preferences
 b) Type 2
  1) Family
   A) Personal Information
   B) Partner Preferences
    i) Family Partner Preferences
    ii) Individual Partner Preferences
   C) DB Preferences
    i) DB Family Preferences
    ii) DB Individual Preferences
  2) Individual
   A) Personal Information
   B) Partner Preferences
    i) Family Partner Preferences
    ii) Individual Partner Preferences
   C) DB Preferences
    i) DB Family Preferences
    ii) DB Individual Preferences Type 1 Buddy may also take on a DB role for other members, whereas Type 2 exclusive may not act as a DB (but mimic BDM and SDE of first/"classic" paradigm). Type 1 may be called BDFM and type 2 may be called BDFE.

DB role 3704 of FIG. 37 may provide the following information:
 a) Type 1 (may be same as Type 1 Buddy role above)
 b) Type 2
  1) Family
   A) Personal Information
   B) Buddy Preferences
    i) Buddy Family Preferences
    ii) Buddy Individual Preferences
  2) Individual (optional—not partner seeking)
   A) Personal Information
   B) Buddy Preferences
    i) Buddy Family Preferences
    ii) Buddy Individual Preferences Type 1 DB may also take on Buddy role, while Type 2 DB exclusive may not (does not include a partner seeking individual). Type 1 may be called DBFM and type 2 may be called DBFE.

Candidate role 3706 of FIG. 37 may provide the following information (Candidate role may be called CANDF):
 1) Family
  A) Personal Information
  B) Partner Preferences
   i) Family Partner Preferences
   ii) Individual Partner Preferences
 2) Individual
  A) Personal Information
  B) Partner Preferences
   i) Family Partner Preferences
   ii) Individual Partner Preferences The algorithm 3701 of FIG. 37 may initially offer a potential Buddy Unit (BDFM or BDFE) 3702 to a DB unit (DBFM or DBFE) 3704. If DB unit 3704 accepts, the DB unit 3704 may be offered to the Buddy Unit 3702 for acceptance. If they accept, the DB unit 3704 may review the Buddy Unit's profile and may interact with them through whatever means is available, including chat, message, video chat, email, and telephone or through any other method that may be at least partially provided by the ODS. After getting to know the Buddy Unit 3702, the DB Unit 3704 may consider all of the Candidate Units 3706 they know, either as friends, acquaintances, peers and neighbors, and then may offer as Candidate units 3706 any of these friends who they believe include family and/or individual who may be a good match 3703 for the Buddy Unit 3702, either Buddy family, and/or Buddy individual, or both. The Candidate Unit 3706 may be provided with access to the profile of the Buddy Unit 3702 by the DB Unit 3704 (their friends). If after reviewing the Buddy unit's profile the Candidate Unit 3706 is interested in being introduced to the Buddy Unit 3702, then they may be offered (e.g., by the system) as the Candidate Unit to the Buddy unit for acceptance. If after reviewing the Candidate Unit's profile the Buddy Unit accepts the offer, the Buddy unit and the Candidate unit may interact through whatever means are available (e.g., at least partially through the system or otherwise) to get to know each other, at both the family and the individual level. After further review from both family/individual units, if there is mutual acceptance, then both individuals from the Buddy and Candidate units may be offered the opportunity to interact directly with each other (e.g., at least partially through the system or otherwise). This match may require both individuals to accept the choice to interact.

The reward system from the classic DB paradigm 3600 of FIG. 36 may trigger in FIG. 37 when any of the potential matches have accepted the next step of engagement.

The beauty of this tiered process is that it may mimic a trending hybrid in relationship building in Southern Asia, allowing for both an initial parental consent in the process, followed by involvement by the individual in the vetting process and eventually the individual's consent in the final match between individuals. This may allow for an elegant approach to melding the parentally (or otherwise)-arranged marriage with an individual's consent, tracking with the current trend culturally in which this type of hybrid decision is the fastest growing protocol in use. Also, as with the classic DB paradigm, the compatibility of the families and individuals involved may be increased by the combination of the technology of a system algorithm optimizing the potential to bring families and individuals together whose demographic preferences are most likely manifested in the alternative family/individual, but also that it incorporates the human touch by having the DB family and possibly the DB individual as well help to choose who they believe would be most compatible, adding the human touch to the scientific algorithmic process (much like the advantage that exists in the classic DB paradigm described above). To restate, a family/individual unit acting in the DB role whose demographics approach the preferences of the Buddy role unit are more likely to be friends with other families/individual units with similar demographics, thus increasing the likelihood that the Candidates offered to the Buddy unit are more likely to have similar demographics to their stated preferences, thereby increasing the probability of a compatible match of the family and/or the individual. In addition, the human touch of the DB role unit family reviewing their network of family/individual units to act as potential Candidates may add an additional element of human touch which may further increase the likelihood of compatibility in the family/individual unit with the Buddy unit, and eventually this increased compatibility experienced at all levels and combinations may ultimately increase the probability of increased compatibility of the two partner seeking individuals.

Another consideration may be that although this hybrid paradigm may lend itself very elegantly to the desirable hybrid relationship building paradigm in the Eastern culture which combines the parent-arranged component with the individuals input and/or consent, a sub-variant of the paradigm just described may emulate the more traditional model which may be more strictly adherent to parent-arranged, or parent-arranged with individuals input. To accomplish proper emulation of these more traditional constructs, certain components of the process described above may be removed or less heavily weighted in the matching process, such as input and algorithm consideration of the partner seeking individuals' preferences, as well as any preferences of the individual. Secondly, the partner seeking individuals may not be involved in the vetting process when the Buddy family and the Candidate family, or for that matter the buddy family and the DB family, are interacting and assessing each other for compatibility. Thirdly, the two partner seeking individuals may not be offered the opportunity to accept or reject each other when finally offered to meet by their respective families.

Such relationship building paradigms may be broken down into the following four sub-types and may be compared to their DB variant counterparts as follows:

1) Self-arranged=Classic DB paradigm
2) Jointly-arranged=Hybrid Eastern Culture variant where all input that can be derived from individuals from all units may be requested and/or at least considered in the algorithm, where DB Individual (if they exist) opinion about the choice of potential Candidate units may be considered, Candidate individual and Buddy individual's opinions may be considered when Candidate role is offered to Buddy role for mutual acceptance, and both may accept as may their parents, and both Candidate individual and Buddy individual may accept when offered to each other directly.
3) Parent-arranged with consent of individual=Hybrid Eastern Culture variant where original algorithm match between Buddy family and DB family may be accomplished with some aspect of individuals involvement left out—this may be the input preferences (partner, DB or Buddy) of the individuals from both units not requested and/or not considered in an algorithm, and/or the individuals opinion about the algorithm match may not be considered in the decision to accept, and/or the DB individuals opinion about the choice of Candidate role may not be considered, and/or the Buddy and Candidate individual's opinions may not be considered in the acceptance of the match between the two family units or the vetting of the compatibility of the two individuals in the decision to offer the two meet each other as the final match. Consent of the individual may then be represented by their reaction and decisions in regards to that final match, either to accept the interaction, or to accept the formal relationship that may ensue from the formal introduction. In addition, individual consent may also be represented by allowing any of the aforementioned exclusions of the individual's participation be included instead (e.g., Buddy IND (PS) (BDIM or BDIE) 3702' and CAND IND (PS) (CANDI) 3706' may consent or have an independent match 3703').
4) Parent-arranged=All of the above exclusions of any individuals' participation may be strictly adhered to, and when the partner seeking Buddy individual and the partner seeking Candidate individual are introduced in the final match, unlike #3 above, they may not have the option to accept or reject the introduction, accept or reject the relationship or perform any type of consenting behavior at any point in the process.

In some embodiments, following the novel principles described with respect to the ODS, a new kind of social network may be achieved, which may be referred to herein as a BuddyNation ("BN"). Such a BN may be a novel interactive online social network experience that may afford multiple advantages over existing social networks. BN may be focused on the creation of new friendships and the facilitation of participation in hobbies and interests. BN may utilize both overt and covert behavioral cues to incentivize users to pursue and engage in these activities. BN may also use the synergistic value of benevolence in a variety of ways to enrich the wellbeing of the experience, resulting in improved user retention.

As described with respect to the ODS, the BN may first enable a user to start off by entering profile information. This may include demographic information (e.g., geographical and biographical data) and detailed information regarding all hobbies (H), activities (A) and topics or areas of interest (T) to that user ("HAT"), which may be similar to at least the personal information portion of a MEM user profile described above. Such a profile may be produced with all chosen HAT areas displayed in icon format by the BN. When a user selects such an icon, a BN page or information section, which may be location-based, may be launched and/or otherwise provided by the BN for that user that will focus on that selected HAT area. In some embodiments, the filtering scope for a post/wall feed for a community wall may allow for range of scope from specific groups within the members circle, or may be geographically filtered, which may be local or global, or any degree in between. Additionally or alternatively, when any type of calendar event exists, either created by user, or to which the user may be invited, a location-based technology (e.g., of subsystem 10 and/or a client device 100) may allow the proximity of the users mobile device at the event time frame to automatically credit the user for the participation in the event, which may then trigger a reward structure which may include BB, CB, or any form of barter or charitable act. This same location-based tracking may also be utilized for any mentor-student interaction, and may trigger a reward as above. This same location-based tracking may also be utilized when any BN group members participate in a shared (scheduled) event, where they may be rewarded for such aggregate participation as this may cultivate the fostering of socialization and community. The scope of potential HAT communities, also referred to herein as MicroSites ("MS"), may be vast, selected initially based on known popularity, and then, over time, via analytics and testing. Future HAT communities may be based on regionally concentrated interests and cultural trending. If a BN user chooses a golf icon, for example, a BN page devoted to golf (e.g., "GolfBuddy") may be launched by the BN for that user. Content may be prioritized by proximity, and, thus may be "local" to the user. These local features may include real-time postings of local members within the community (e.g., GolfBuddy community), a local calendar tracking multiple event types, and/or a section devoted to the novel "BuddyEngine (BE)." The BE may have three (3) potential functions, which may be implemented throughout the BN network, which may allow a BN user to define and track at least three (3) types of groups on any given MS. There may be unique uses for the BE in what may be referred to as Specialized Micro Sites ("SMSs"), but for now we will limit this discussion to common usage in Micro Sites ("MSs").

In the following example using the golf site, the users within any of these groups may be referred to as golfbuddies (GBs). A first type of GB may be for a member requesting to find other potential "local" golfbuddies who have similar levels of experience or skill. The user may select and rank certain characteristics, including, but not limited to, a handicap of self and range of handicap for potential buddy, location where user plays and range of locations willing to play at with potential buddy, days and times user plays and range of days and times user is willing to play with potential buddy, sex range for potential buddy, education and other demographic or biographic data or ranges for potential buddy, style of play (casual/competitive) and range of style of play for potential buddy, and the like, and the BN may use an algorithm that may leverage these characteristics to provide an opportunity for that user to be introduced to another local user. Such a BN algorithm may utilize proprietary technology to take advantage of overt and covert data to optimize compatibility. A second type of GB may be for a member requesting to be part of a mentor/student relationship (e.g., "I am a novice golfer looking to find a local golfer with more expertise than I who is willing to help me advance my skills" or "I am a seasoned golfer who would like the opportunity to help a local novice grow as a player"). The third type of golfbuddy may allow a user to invite known friends into his circle of golfbuddies within the community. Thus on any given buddy site the user may be capable of tracking three different types of golfbuddy groups, either independently, or in combination. Thus, the user may be capable of viewing comments from all local golfbuddies, or can toggle the filter to view only those postings from one or more of their golfbuddy groups. An interactive BN calendar may allow users to track events connected to these golfbuddy circles, such that each circle may be tracked independently via adjoining buttons or other UI features. Calendar events, like postings, may be viewed from multiple perspectives. The user may toggle to view events specific to their golfbuddy groups, or those open to the local community. These events may be activity related events like an invitation to golf, or a social event. Lastly, a calendar function may be provided for all local charitable events, which may be visible to all local members, where a user can participate in, providing the opportunity to meet other local golfbuddies in a benevolent context.

Such a BN may provide significant advantages over conventional social networks. The BN may enable a user to find friendship with locals who share the same interests (e.g., "I'd rather hang out with people that like to do the same things as myself, rather than people who are friends of my friends"). The BE may be driven by proprietary technology that may take into account covert and overt cues resulting in a higher likelihood of compatibility. The BN may afford the opportunity for those who want to share their skills to help another learn, and then both parties in a mentor/student interaction may get rewarded for the act (e.g., like a DB of the similar ODS). The BN may afford the opportunity for those who want to learn more about any given activity from another user with more advanced skills. The BN may motivate users to participate in a more active lifestyle, socially and/or physically, which may greatly improve their work/life balance (e.g., in the context of a social environment that may be optimized for compatibility, such as via proprietary algorithms of the BN). A MEN/STUD interaction facilitated by such a system/service may not only enable a broadening of each user's friendship base with respect to common interests and/or new interests, but also may enable the STUD user to potentially be retrained for a new expertise that can provide that user with a new skill set enabling a new career path for that user. New occupations and work forces can be cultivated, fostered, groomed, targeted, and utilized through this novel system/service. An interactive tracking calendar of the BN may facilitate participation in the various types of meetings that may be possible, thereby allowing for uniquely targeted invitations which may be more likely to be attended. This calendar may allow for the creation of any type of event listed elsewhere in this document by the user, or may have an event invitation of the same scope previously mentioned for the user. The BN may incentivize users to partake in benevolent behaviors, which may result in a significant positive feeling, and/or an improved retention rate for existing user. Helping each other just feels better. The BN may encourage users to participate via an interactive calendar in social and benevolent acts where they may meet others in their unique community, which may thereby increase the likelihood of creating new friendships, where common interests are shared. The BN may allow for the tracking, and eventual rankings, of mentoring activity via maintaining stats on the activities, and issuing badges. This scenario may also lend itself to a bid/auction scenario once rankings are established. Tracking metrics of this nature may also tap into the competitive spirit, which may thereby create yet another attraction to participation, resulting in improved retention of the user membership. Moreover, whenever a user member may participate in a benevolent behavior associated with the BN, such as a mentoring contact with a student buddy, or engaging in a charitable event, that user may be rewarded by the BN (e.g., with a BuddyBuck ("BB") and/or a CharityBuck ("CB")). A CB may trigger a donation to a charity chosen by the user member as a show of thanks by the BN for benevolent participation of the user with respect to the BN. A BB may represent a discount that can be applied to an eStore and/or other suitable vendors that may offer discounted products/services tailored to the BN's demographic (e.g., thereby resulting in a unique monetization for the BN). A MEM user of the BN may be considered a user of the BN who is looking for one or more other users that share a common interest. A MEN (e.g., mentor) user of the BN may be considered a user of the BN who desires to teach/coach another user. A MEN user may be tracked as to their history of mentor/student relationships, any ratings provided by STUD user and tracked by site, and such ratings/rankings may be made available to other users, or just to site administrators, or just to user, and may lend itself to participation in an auction/bid scenario, where potential STUD users may bid for MEN users and may use a form of barter that may include BB, CB, money, or any charitable category. MEN users may also exist in a group, formal or informal, created from any collection of users, which may include local MEN users, MEN users associated with an organization or school or company, or the like. A STUD (e.g., student) user of the BN may be considered a user of the BN who desires to be taught/coached by another user. A COM user of the BN may be considered a user of the BN when they are not requiring an algorithmic function of the BN. A COM user may refer to a user who is currently not requesting a STUD user or MEN user match, not currently requesting to find a potential similar buddy, like a local golfbuddy of similar characteristics to play with, and therefore may not currently be involved in any algorithm matching process. This may refer to a user that currently has no buddy circles, or to a user that has buddy groups formed, but is not currently participating in any of the potential algorithm match processes.

Figure 38:
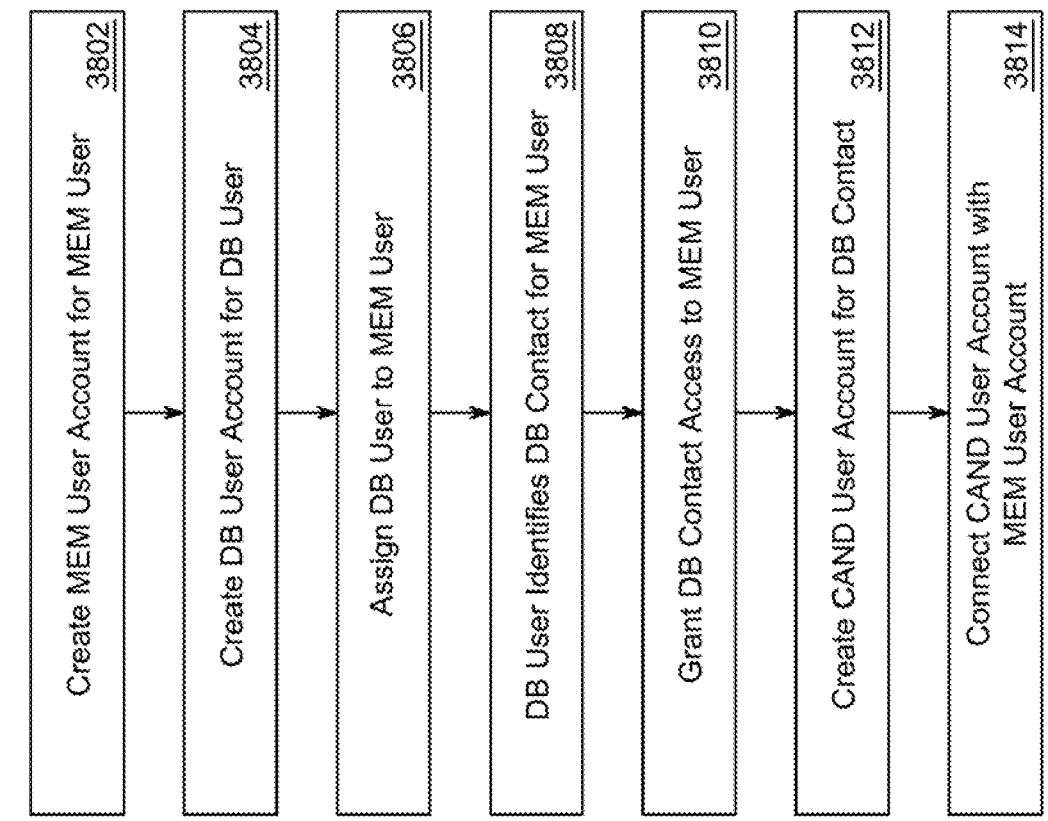
Figure 39A:
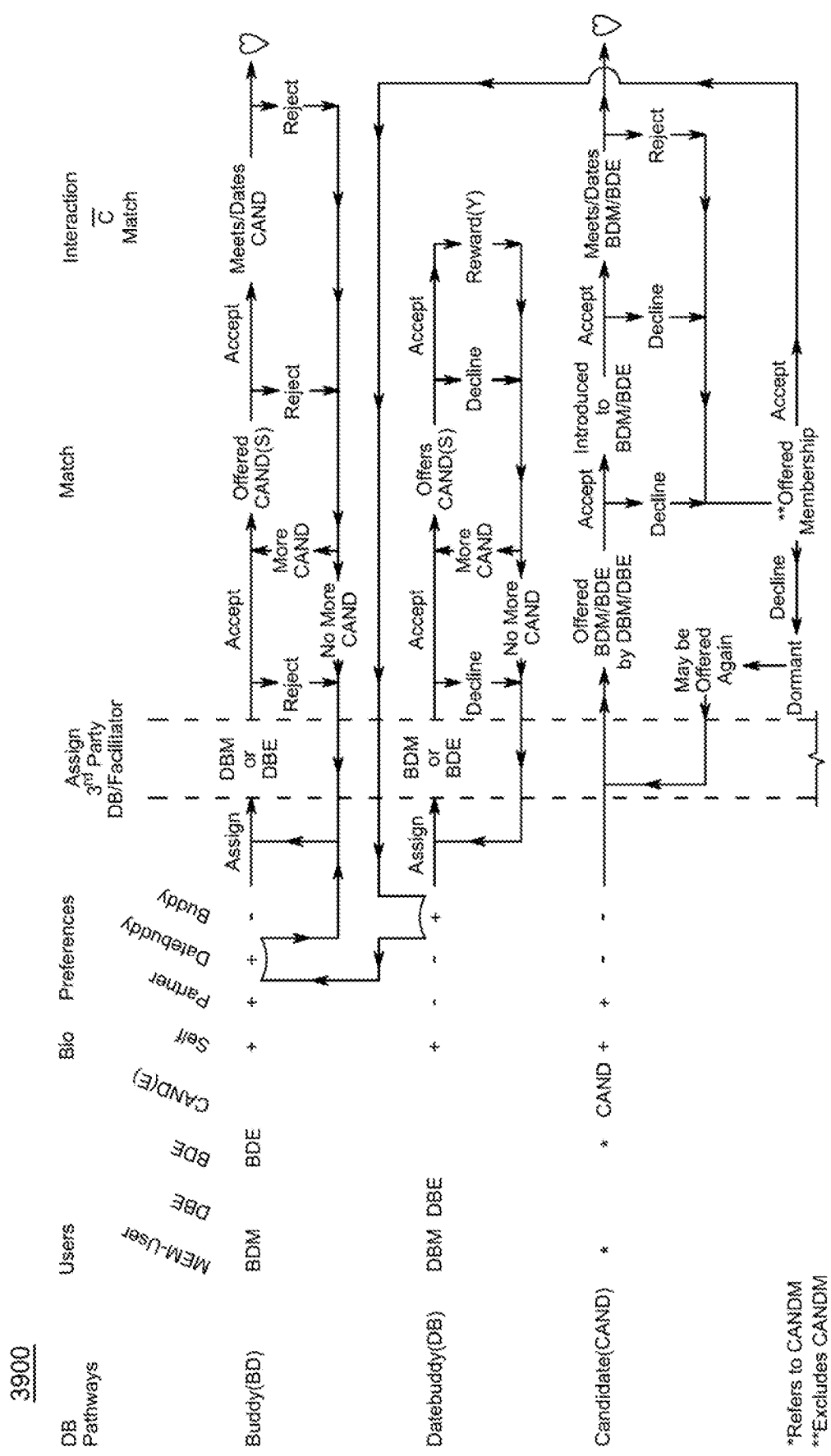
Figure 39B:
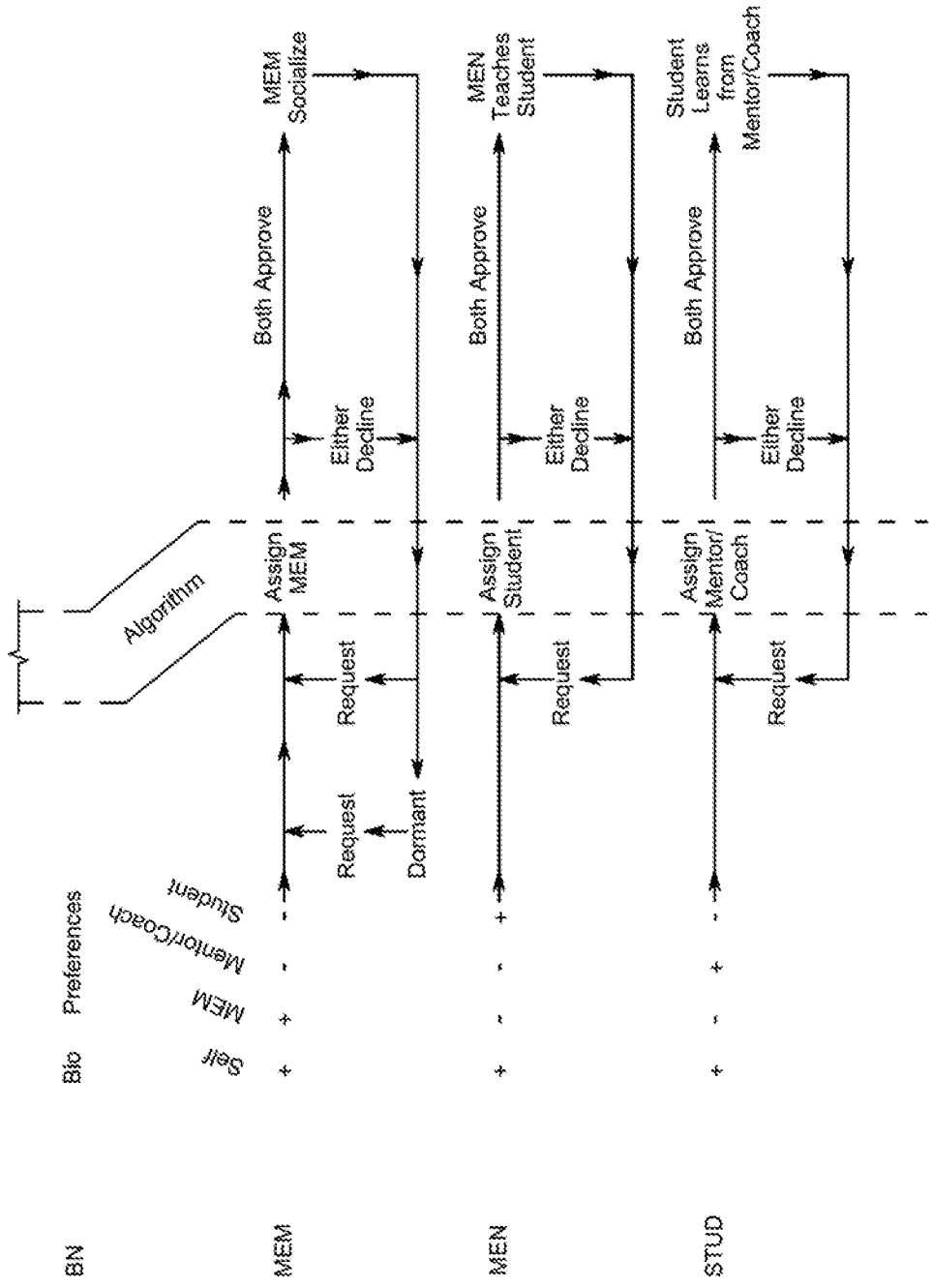

A BN may be provided for any suitable HAT area, including, but not limited to, the following:

Golf
Football
Tennis
Baseball
Basketball
Soccer
Lacrosse
Racquetball
Boating/sailing
Fishing
Hunting
Surfing
Waterski
Snowski
Extreme sports
cycling
motorcycling
rollerblading
canoe
kayak
hiking/climbing
camping
weightlifting
pilates
yoga
MindBody
Running/Jogging
skateboard
mountain biking
martial arts
hockey
volleyball
watersports
snowsports
Fitness
Wellness
Anti-aging
Field Hockey
Rugby
Squash
Triathlon/Biathlon
rowing
swimming
scuba diving
snow boarding
ping gong
poker
card games
chess
board games
bridge
cosplay
crafting
sewing/knitting/quilting
scrapbooking
astronomy
photography
writer/author
painting/artist
digital artist
antique
collectibles
car
car racing
jewelry/leather crafting
wood working
genealogy
singing
musician
composer
technogeek
winetasting
movies/theatre
music
art
politics
metaphysics
live music
dancing
gardening
cooking
books/reading
philosophy
horses
dogs
cats
birds
exotic pets
bowling
billiards
darts
parlor games
Autism
Alzheimer's
Foreign Countries
History
Physical Sciences
Environmental Sciences
UFO Description of FIG. 38, FIG. 39A, and 39B FIG. 38 is a flowchart of an illustrative process 3800. At step 3802, a MEM user account may be created for a MEM user through MEM user interaction with the ODS. For example, as described above, a MEM user profile may include personal information for the MEM user, partner preference information for the MEM user, and DB preference information for the MEM user. At step 3804, a DB user account may be created for a DB user through DB user interaction with the ODS. For example, as described above, a DB user profile may include personal information for the DB user, partner preference information for the DB user, and/or user-as-DB information for the DB user.

At step 3806, the ODS may leverage any suitable information from the MEM user account and any suitable information from the DB user account to assign an appropriate DB user to a MEM user as a matchmaker. For example, as described above, the ODS may leverage MEM user profile data and DB user profile data from at least some or all available MEM users and from at least some or all DB users of the ODS with a MEM-DB algorithm to identify at least one fit for a specific MEM-DB linked assignment. In response to an identified fit, one and/or both of the identified MEM user and the identified DB user of that identified fit may be enabled by the ODS to approve or decline the fit. If the fit is declined at step 3806, either by the MEM user, by the DB user, or both, the ODS may be configured to identify certain data that may be indicative of one or more reasons for the fit being declined (e.g., the ODS may poll each declining user with one or more questions about why they declined the suggested fit), and such data may be leveraged by the MEM-DB algorithm to identify at least one new fit for a specific MEM-DB linked assignment (e.g., by repeating step 3806).

However, if the fit is approved at step 3806, process 3800 may advance to step 3808, where the ODS may facilitate or otherwise enable the DB user of the fit in identifying a DB contact for the MEM user of the fit. For example, as described above, the DB user may consider any contact (e.g., friend) that the DB user may have communicative access to in any suitable way (e.g., direct contact and/or contact through some online communication mechanism, such as an online social network or e-mail service), and may identify at least one such contact that may be considered by the DB user as potential good match as a partner for the partner-seeking MEM user (e.g., based on data accessible to the DB user from the ODS of the MEM user's account profile). In some embodiments, a DB user may identify one or more online social networks of the DB user, from which the ODS may access certain information for aiding in the DB user's quest to identify one or more DB contacts for the MEM user. For example, the ODS may be configured to access certain information from a contact list of the DB user (e.g., from a contact list local to the DB user's client device 100 and/or from a DB user's account with an online social network, such as social network subsystem 20), which may enable the ODS to automatically identify certain DB contacts based on a comparison of accessed information for those DB contacts and partner preference information of the MEM user's profile. For example, the ODS may be able to access photos of various DB contacts through such an accessed contact list and may process those accessed photos (e.g., via any suitable facial recognition techniques) with respect to preferred and/or non-preferred physical features of the preferred partner portion of the MEM user's profile in order to filter out certain DB contacts that may not meet the physical requirements of the MEM user, thereby aiding the DB's identification process of step 3808. As another example, the ODS may be able to access any suitable demographic information of various DB contacts through such an accessed contact list (e.g., through accessing certain metadata from a Facebook account of the DB user) and may process that accessed demographic information with respect to preferred and/or non-preferred demographic information of the preferred partner portion of the MEM user's profile in order to filter out certain DB contacts that may not meet the demographic preferences of the MEM user, thereby aiding the DB's identification process of step 3808.

Next, at step 3810, process 3800 may include the ODS granting the identified DB contact with access to the MEM user's account. For example, as described above, the ODS may enable or otherwise facilitate a link or any other suitable information being communicated to the identified DB contact (e.g., directly from the ODS or via the DB user), which may enable the DB contact to view at least a portion of the MEM user profile of the MEM user account (e.g., through interaction of the DB contact with the ODS). If such access enables the DB contact to determine that he or she would like to connect with the MEM user, a CAND user account may be created at step 3812 for the DB contact through DB contact interaction with the ODS. For example, as described above, a CAND user profile may include personal information for the DB contact and partner preference information for the DB contact. Then, at step 3814 of process 3800, the ODS may enable a connection between the CAND user account and the MEM user account. For example, as described above, if a DB contact/CAND user decides (e.g., through review of the MEM user's profile) that the CAND user would like to connect with the MEM user, the ODS may enable the MEM user to decide (e.g., through review of the CAND user's profile) that the MEM user would like to connect with the CAND user, and, if so, the ODS may enable a linked connection between the MEM user and the CAND user via the ODS.

If a DB contact/CAND user declines a suggested connection with a MEM user and/or if the MEM user declines a suggested/accepted connection request for a DB contact/CAND user, the ODS may be configured to identify certain data that may be indicative of one or more reasons for the suggested connection being declined (e.g., the ODS may poll each declining user with one or more questions about why they declined the suggested connection), and such data may be leveraged by the ODS for future processes (e.g., by alerting the DB user as to a potential reason for the declined suggestion such that future suggestions may avoid a similar fate). Additionally or alternatively, if a DB contact/CAND user accepts a suggested connection with a MEM user and/or if the MEM user accepts a suggested/accepted connection request for a DB contact/CAND user, the ODS may be configured to identify certain data that may be indicative of one or more reasons for the suggested connection being accepted (e.g., the ODS may poll each accepting user with one or more questions about why they accepted the suggested connection), and such data may be leveraged by the ODS for future processes (e.g., by alerting the DB user as to a potential reason for the accepted suggestion such that future suggestions may aim to achieve a similar result). Such reasoning data may include identification of one or more physical and/or non-physical traits of the declined/accepted user that was identified as a reason for the declining/accepting user to arrive at that decision. Such reasoning data may be used at any suitable process of the ODS for any suitable reason, such as to update or refine or otherwise supplement a user's partner preference profile based on such reasoning data (e.g., updating a "facial features" profile portion of a MEM user's partner preference profile based on previous declining/accepting reasoning data that may be indicative of that MEM user's preferences and non-preferences with respect to profile pictures of the CAND users declined/accepted by that MEM user (e.g., through the ODS leveraging any suitable facial recognition techniques, etc.)). Moreover, this concept may be extended not just to declining/accepting suggested MEM-CAND connections, but also to different levels of advancement for an accepted MEM-CAND connection. For example, if an accepted connection between a MEM user and a CAND user results in any suitable event that may be tracked by the ODS (e.g., a telephone call between the users, an in-person meeting between the users, a second data between the users, a decision to terminate the connection, the connection not resulting in any suitable event for any suitable period of inactivity, etc.), the ODS may be configured to identify certain data that may be indicative of one or more reasons for the connection resulting in that event (e.g., the ODS may poll each user with one or more questions about why they allowed the connection to advance to that event). Such data may be leveraged by the ODS for any suitable purpose, such as for identifying trends with respect to a user and its profile compared to the profile of its connection for making future MEM-DB suggestions and/or future MEM-CAND suggestions more effective (e.g., MEM-CAND suggestions informed by a DB or MEM-CAND suggestions that may be automatically suggested by the ODS). Such data may enable the ODS to guide a MEM user towards other users that have similar profiles to those with which the MEM user has had previous success and/or away from other users that have similar profiles to those with which the MEM user has had previous non-success.

Such a connection of step 3814 may trigger or enable the potential for a reward to be issued to the DB user or any other user of the ODS. For example, when an initial MEM-CAND connection is made at the suggestion of a DB user, the ODS may enable that DB to be rewarded in one or more suitable ways. The ODS may be configured to provide a reward to a DB when such a connection achieves one or more suitable levels of engagement that may be tracked by the ODS (e.g., a telephone call between the users, an in-person meeting between the users, a second data between the users, etc.), which may provide incentive for a DB to be effective. In some embodiments, if a MEM user declines a connection with a suggested CAND user and/or if a MEM user eventually terminates a connection with a suggested and connected CAND user, that MEM user in its role as a DB user may suggest that CAND user to a buddy MEM user assigned to that initial MEM user in its role as a DB, such that any interfacing between a MEM user and a suggested CAND user may be leveraged by that MEM user for connections other than a connection between that MEM user and that CAND user. Additionally or alternatively, if a CAND user declines a connection with a suggested MEM user and/or if a CAND user eventually terminates a connection with a suggested and connected MEM user, the ODS may enable that CAND user to suggest a connection between that MEM user and a contact (e.g., friend) of that CAND user (e.g., similarly to step 3808). Therefore, even though that CAND user may not currently have a user account with the ODS that positions the CAND user as an official DB, the ODS may enable that CAND user to send a link or other identifying information regarding a suggested MEM user to a contact for potentially matchmaking that CAND contact and that MEM user, such that any interfacing between a MEM user and a suggested CAND user may be leveraged by that CAND user for connections other than a connection between that MEM user and that CAND user. In such examples, while the CAND user may not have an account with the ODS as a DB user that may otherwise result in a reward being provided by the ODS to that CAND user for facilitating a successful connection between a contact of that CAND user and a MEM user, the ODS may track such events in order to properly reward such a CAND user if/when that CAND user updates its account with the ODS to an account where the user may also act as a DB user, thereby providing additional incentive for a CAND user to upgrade its account with the ODS from a CAND user to a full MEM/DB user.

It is understood that the steps shown in process 3800 of FIG. 38 are merely illustrative and that existing steps may be modified or omitted, additional steps may be added, and the order of certain steps may be altered.

FIGS. 39A and 39B collectively are a flowchart of another illustrative process 3900 that may be enabled by an ODS and/or BN of this disclosure and that may be similar to at least certain portions of process 3900. It is understood that the steps shown in process 3900 of FIGS. 39A and 39B collectively are merely illustrative and that existing steps may be modified or omitted, additional steps may be added, and the order of certain steps may be altered.

The following is a summary of potential role types (PPathways) (e.g., as may be shown in FIGS. 39A and 39B collectively):
1) Buddy (BD)—partner-seeking member who is matched with a DB to help them.
2) CAND—partner-seeking non-member who is known and introduced by a DB to a partner-seeking member acting in the Buddy role. They are chosen from the DB's personal network based on compatibility with the Buddy (BD) they are setting up.
3) DateBuddy (DB)—member, Partner-seeking or not, who is matched with a partner-seeking Buddy to help them by introducing them to CAND(s) which are partner-seeking contacts from their network of contacts. A special exception is when the DB identifies and introduces another member they know (have met) who is partner seeking in lieu of the usual CAND to the Buddy they are assigned to help.

The following is a summary of potential User types:
1) MFM—a member, who may pay a subscription rate, who participates in both the Buddy (BD) role (partner-seeking) and the DB role (matchmaker role).
2) CAND—a non-member who participates in the CAND role who is introduced to a member functioning in the Buddy role by a member functioning in the DB role.
3) DBE—a member, who may pay a subscription rate, who participates exclusively in the DB role.
4) BDE—a member, who may pay a subscription rate, who participates exclusively in the Buddy role.

The following is a summary of potential Profile Components (visibility of any or all components may be user and role specific):
1) Personal biography (Description of self)
2) Personal history of activity
3) Personal Metrics
4) CAND and their attributes you have offered as DB
5) Partner preferences
6) DB preferences
7) Buddy preferences
8) History of activity preferences
9) Metric preferences
10) Preference for CAND and their attributes from potential DB (CAND they have offered on site)

The following is a summary of potential elements that may influence subscription rates:
1) User type
2) Special deals or discounts
3) Reward for specific form or degree of participation in the ODS process and/or on the site and/or on the broader social network and/or associated with a charitable/benevolent/coaching/mentoring act
4) Length of time on site
5) Length of subscription
6) Subscription for other sites within network
7) Single or group entity
8) Organization or corporate membership
9) Multiple DB's assigned simultaneously
10) History of activity
11) Metrics
12) A DB's pool of CANDs and their attributes
13) Preferences of any type 14) Preferences for any DB metric and/or CAND and their attributes An algorithm (ODS) may leverage any relevant information that may influence and improve the compatibility of the Buddy-DateBuddy match. This information will include, but not be limited to, the above Profile component list and feedback associated with site interactions.

Possible exceptional uses of roles in paradigm described may include:
A) Buddy user of any type introducing someone to their current or past DB (partner-seeking DB type). This "someone" would be participating in the role of Candidate for this introduction, and may be:
  1) a past Candidate introduced to the Buddy in the past,
  2) a past/present Buddy of this Buddy while acting in the role of DB,
  3) a past DB of this Buddy.
    NOTE: Though a classic candidate would be a non-member, and therefore may not usually be rewarded with BuddyBucks and CharityBucks, or have access to the community site, since in these examples the role of candidate is being fulfilled by a member, reward structure and community access may be possible.
B) DB user of any type introducing to their matched Buddy a Candidate who is already a member. This Candidate may be:
  1) originally a classic non-member Candidate this DB originally introduced to the site who has upgraded their membership status,
  2) a Buddy the DB has helped in the past,
  3) if this DB is partner-seeking, then while this DB has participated in the Buddy role, a past or present DB (who is also partner-seeking) matched to them while in the buddy role.
    NOTE: As above, though a classic candidate would be a non-member, and therefore may not usually be rewarded with BuddyBucks and CharityBucks, or have access to the community site, since in these examples the role of candidate is being fulfilled by a member, reward structure and community access may be possible.

As mentioned above, classic online dating services have become inefficient and less successful over recent years due to various factors. The ODS, which may include The DateBuddy Engine, provides an innovative approach to online dating that addresses all of the deficits of classic online dating services, either diminishing or extinguishing them altogether. The DateBuddy Engine merges technology with the human touch. The ODS may leverage one or more sophisticated algorithms with the human touch provided by friends and agents engaging in the role of matchmaker. A new user may be instructed as to the matchmaking nature of the ODS and may be offered membership. The user may be instructed that members will be assigned two different local singles, one who may function as a matchmaker for them and introduce them to their friends who they believe may fit them well, and a second local single who they may act as a matchmaker for, offering to introduce any friend they have who might be a good match. After becoming a member, they may be prompted to answer questions that may be used to create a profile. There may be four components in the question phase. The first component may be focused on biographical data that may leverage any suitable intake methods including checkbox, text fields, and text areas. The second component may use similar methods to the first focusing on a description of characteristic preferences of the member's potential partner. The third component may use similar methods to focus on any specific criteria of an inclusionary or exclusionary nature describing the characteristics of a member who may be assigned as a matchmaker for this new member, and the fourth component may use similar methods and may focus on inclusionary and exclusionary criteria describing the characteristics of a member who this new member may be acting as a matchmaker for.

When a member performs the matchmaker function for another member, this role may be referred to as a "DateBuddy," or DB. When a member is assigned a matchmaker, or DateBuddy, to perform the matchmaking function for them, this role may be referred to as a "Buddy," or BD. After a new member completes the question section a profile may be created. Then the DateBuddy Engine algorithm may provide a DateBuddy-Buddy match, where the new member may be acting in the Buddy role in this first match. Initially, the new member's profile may be offered to the matched DateBuddy to accept or reject. If the Datebuddy rejects the match to act as matchmaker, they may be placed back in the pool to be offered to another member. To avoid exploitation of the rejection process, a mechanism may be utilized to limit the rejection process to facilitate participation. This mechanism may be a limited number of allowable rejections, after which a new bank of maximum rejections may be allotted whenever an acceptance is noted. Another possible way to minimize exploitation of the rejection process may be to alter the delay time after a rejection or dismissal before a new DB may be assigned in such a manner as to deter a relative overuse of the rejection or dismissal processes. If accepted, the DateBuddy's profile may be then offered to the new member (acting in the Buddy role) as a new DateBuddy, to act as their matchmaker, for them to accept or reject. To avoid exploitation of the rejection process, a mechanism may be utilized to limit the rejection process to facilitate participation. This mechanism may be a limited number of allowable rejections, after which a new bank of maximum rejections may be allotted whenever an acceptance is noted. If they accept, the ODS may then enable the DateBuddy to review the new members (Buddy's) profile, and may further choose to make direct contact with the new member (or Buddy) via many methods, which may be enabled by the ODS, including IM, message, text or phone call. After this review, the DateBuddy may consider their entire personal network including their friends, peers at work or school, neighbors, family, and acquaintances to decide if any may be a good fit to date their new Buddy.

If the DateBuddy identifies anyone in their network that might be an appropriate choice, they may reach out to their friend with a limited-use link of the ODS (e.g., provided by either email or text), which their friend may use to enter the site for free to view the profile of the Datebuddy's Buddy to decide if they have any interest to meet the Buddy. If they decide to meet the Buddy, the friend of the DateBuddy, referred to as the Candidate, may be asked to complete a question process similar to that of the member (e.g., at no charge by the ODS), that may result in a modified version of a profile. The question section for a Candidate may differ from the question section for a member in that it may not have the third and fourth components described above, designed to define the character parameters for participating in the roles of DateBuddy or Buddy as part of the matchmaker algorithm. This profile may be created for a one time use so they may be introduced to the Buddy as a Candidate to potentially meet. This Candidate profile may be then sent to the Buddy, as a "New Match," where it may be accepted or rejected. If accepted, the Buddy and their new match (the Candidate) are then free to communicate via multiple methods including IM, message, text, videoconference or phone. When the Buddy accepts the match, the Datebuddy may be rewarded with BuddyBucks and CharityBucks. BuddyBucks may be redeemable in the DateBuddy store for discounts on merchandise or services which are targeted toward the singles demographic. CharityBucks may represent a contribution to the charity specified by the member who was rewarded the CharityBuck. This may be identified when their profile is created, and can be edited thereafter.

While the member is being helped by their DateBuddy (or matchmaker), they may be included in a pool for the DateBuddy Engine to assign them to a second local member of the opposite sex (in the heterosexual case), this time to act as their DateBuddy, or matchmaker. Thus, at any given time in the classic use of the paradigm, a single member may be assigned to two local singles of the opposite sex (in the heterosexual case), one to act as their Datebuddy (matchmaker), and the other to be a Datebuddy (matchmaker) for. Classic members therefore may participate in both roles of the matchmaker (algorithm) process, possibly at the same time.

When a given Datebuddy, or matchmaker, has exhausted their network of friends/contacts who can be potential Candidates for the Buddy they are helping, they may dismiss the connection. When this occurs, a friendly messaged may be generated to the Buddy they were helping, and both may re-enter the pools for their respective roles so that the Datebuddy algorithm can generate new matches for them both. The Buddy may also dismiss the Datebuddy at any time for any reason, minimizing the potential for the perception of a forced relationship which could increase the risk of an unpleasant interaction. A similar friendly message may be generated, as is the re-entering into the algorithm pools. When a dismissal occurs, both members may be asked to confirm if they desire to allow ongoing contact on the site, retaining each other within their circle of friends within the Datebuddy Community.

In the classic and most common use of the site, the member may participate in both sides of the matchmaker algorithm process, but there exist additional unique ways a member may participate. One additional method of participation may be an exclusive Datebuddy, or DBE. This may be a member that has declared that they are not interested in meeting a dating partner, but instead would like to participate solely as a Datebuddy, or matchmaker. There are many possible reasons for this choice, including a person currently in a relationship that has single friends they desire to help find a partner, and are further incentivized by the rewards of redeemable discounts and charity donations, and to potentially meet new people and cultivate new friendships in the community The DBE may incur a reduced subscription rate or increased rewards, to incentivize participation in the process on the ODS. The DBE may create a modified profile, including a personal section and criteria for Buddy preferences, and may not include partner and Datebuddy preference sections. Another additional method of participation may be an exclusive Buddy, or BDE. This may be a member that requests to participate solely in the Buddy role. Therefore they may be assigned a Datebuddy to act as their matchmaker, but may not be matched with an additional member to act as their matchmaker. This form of participation may incur an increased subscription rate due to its limited participation. A BDE membership may also be deferred in the early phases of the site's launch, included when the process matures in a given geographic area. This delay may be due to the need for a significant critical mass of participants participating in the Datebuddy role for a given geography before the Datebuddy or matchmaking function can be exclusively offered to a subscribing member.

The Candidate, a friend/contact of the Datebuddy offered to their assigned buddy, may be a non-member (especially in the early phases of this process). If so, if the Candidate is rejected when initially offered to a Buddy, or after being dismissed from a connection with a Buddy, they may be offered a discounted initial rate to join the site as a full member so they may be assigned their own Datebuddy. This may result in a unique method for generating new membership.

Regarding these role types, a unique variant of the DBE may be a couple, either married or not, who are not looking to meet a partner, but would like to act as a team to participate in the Datebuddy function in the hopes of helping their friends to find partners as well as benefiting from the rewards, both retail and charitable, and also potentially making new friends along the way. This variant may be a type of Datebuddy group, of which there are actually many other possible variations/types, as described herein.

Referring back to the original discussion regarding failings of the common online dating paradigms, the Datebuddy process diminishes or extinguishes them. Ghost profiles are no longer possible. The two most common causes for ghosting are old members no longer participating and current members who are not currently available to date, most commonly due to a current serious dating relationship (though their paid in advance membership persists). The Datebuddy may be offering their friends/contacts which they believe would be a good fit for the Buddy they are helping, and the friend/contact they are reaching out to must actively sign on the site and create a profile (the Candidate role) to even be offered to the Buddy. This may require by the very nature of the process that they be active and interested in real time. Fabrication of the content of a member's profile would be significantly diminished by the nature of the process, which has matchmaker's inviting their friends/contacts as potential Candidates, who they may know relatively well. As the Datebuddy knows the Candidates they offer, this may significantly reduce their opportunity to fabricate the content within their profile as the Datebuddy who knows them would likely notice any significant content they fabricate. In the event that a cooperative exploit to the process is attempted, in which a Datebuddy and their friend conspire to present a fabricated profile as valid, then after a complaint is filed, the ODS can investigate the complaint, and in the event of a validated exploit, or a pattern of misbehavior, may result in suspension or expulsion form the site. The problem of relying primarily on superficial information including photos and superficial profile content may be remedied by the Datebuddy process, which may bring the human touch into the process. The Datebuddy may review their entire social network to identify possible matches, called Candidates, to offer to the Buddy they are helping. They may learn about the Buddy they are helping by reviewing their profile, and also by any other direct contact they may choose to make. Then they may consider the personality and history of their friend/contacts/social connections to determine who may be a good fit for their Buddy to meet. This "human touch" assessment of compatibility with a human interpretive component in the selection process may clearly elevate the behavioral depth of the selection process. Regarding the loneliness most online daters experience in between successful dates, in the Datebuddy process the classic member may be assigned to two local sexually appropriate singles at any given time. The nature of these interactions may be benevolent in nature as both assignments involve helping each other to meet a dating partner. These benevolent contacts may be multiplied as each connection may recycle as each Datebuddy exhausts their social network, resulting in the potential to meet a number of local singles in this benevolent context. This process may foster both real time acquaintanceships as well as longer term friendships via these connections, and may also occasionally lead to a dating relationship as well.

In addition to addressing the pitfalls of conventional online dating mentioned above, there may be an additional significant advantage to the Datebuddy process. If we were merely adding the human touch to the matchmaking process in a random fashion, we may still make the claim that an individual (the Datebuddy) knows their friends' personality and tendencies relatively well, and can add a tangible degree of increased compatibility with regard to this particular Buddy finding a compatible partner by setting them up with friends (the Candidate) they believe fit them well. This may be true because Datebuddies review their friends for compatibility with the buddy they are assisting. The ODS takes that advantage one significant step beyond. The ODS may utilize the human characteristic that individuals tend to gravitate to other individuals for friendship in which they share common characteristics. It is a trait of human nature to gravitate to that which we find familiar, and therefore chose friends with whom we share personal characteristics. Based upon this human tendency, the Datebuddy process may capitalize on this by utilizing a sophisticated algorithm to match Buddies (looking for a partner) with matchmakers (the DateBuddy) who share demographic similarities to the very partners these Buddies are hoping to meet (as defined by the Buddy's Partner Preferences in their Profile). In other words, these matched Datebuddies (or matchmakers) may be local individuals of the opposite sex (in the heterosexual example) who share demographic similarities to the partner the Buddy hopes to meet (defined by the Buddies Partner preferences). As these Datebuddies may be demographically similar to the partner the Buddy hopes to meet, and since friendships naturally gravitate toward those with shared characteristics, it follows that the friends of a Datebuddy may be more likely to be similar demographically to the Datebuddy than not, who may be by algorithmic design demographically similar to the partner the Buddy hopes to meet. Therefore the friends of the Datebuddy may be more likely than not to be demographically similar to the partner the Buddy wants to meet, which may increase the probability that the matched Datebuddy is more likely to know as a friend, and therefore introduce, a compatible Candidate for the Buddy. This may result in a uniquely expansive potential for a given individual to meet a compatible match, since the Candidate introduction process may be offered to any friend of the Datebuddy, even non-members. This may give the Buddy access to an ever expanding universe of potential Candidates that may be demographically matched to his desired partner preferences, benevolently introduced through friendship and shepherded by the Datebuddy process. The Datebuddy process may take advantage of the concept of degrees of separation and may allow the reach of potential matches to extend beyond the limitation classic online dating sites suffer from of only being able to meet other members. Therefore in the classic paradigm a person may be limited to meeting partners only from within the membership of that given site. Utilizing sophisticated compatibility matching tools in a population that is no longer limited to the membership of a given site or process results in the ODS providing a greater reach into the population of potential partner candidates for a given Buddy, and thus results in a greater chance of finding that special someone relative to the classic online dating construct.

In addition to the Datebuddy process addressing common pitfalls suffered by the common online dating paradigms, further incentive to participate in the process may be provided by a reward structure of the ODS. This structure may include two primary components, retail and charitable. The charitable component may include a designation by the member in their profile of a charity they would like their participation to benefit. This choice may be made from a list of validated charities, and may be editable. When a match is accepted, a CharityBuck may be rewarded to the Datebuddy responsible for the match. This CharityBuck may represent a predetermined amount of money the ODS may donate as a form of thanks for participation in the process. This part of the process not only may create an additional incentive for participation, but also may cultivate an additional route to benevolence which the site may attempt to associate with participation, in the hopes of cultivating via many mechanisms a longer term effect of active benevolence in the culture as a whole. The actual amount represented by a CB may vary at any given time, but may be clarified in advance of being issued. The BuddyBuck, or BB, may be a coupon redeemable at the Datebuddy store for demographically targeted products and services at a relevant discount. The vendors may be motivated by their desire to be showcased before a targeted singles audience.

The reward structure may also be altered in myriad ways to enrich the overall experience, and incentivize participation. In its most basic format, the BB/CB may be rewarded in a one to one relationship when a match is accepted. Variations on this theme may include rewarding multiple BB/CBs for many reasons that may include the type of participation (exclusive Datebuddy), random time periods, episodic time periods, every Nth match, superior metrics in relation to trackable events such as set ups or matches. In addition to varying the amount of the reward, the site may also vary the indication for the reward. The site may use many different modalities to cultivate benevolent behaviors. One such way may be the invitation process that may have an event creation component. Although one use of this component may be to create a dating event to invite your new match, this same event creation process can be used to create benevolent events to invite an individual or any group of members to participate in, and this would may then allow for the reward structure to be extended to participating in such an event.

One entity in the Datebuddy process is an individual, but this may not be a requirement. The process may also be extended to group participation in a number of ways. The Datebuddy role may be performed by a group. These Datebuddy Groups, or DBGs, may be created from a group of general members who would like to function as a team for this purpose, or may be created from an organized group such as a company, employees from a company, a corporation, an educational institution, classmates, benevolent organization, or any group of associated members that function in a team fashion to perform the Datebuddy role.

Metrics may be tracked from many perspectives involved in the Datebuddy process. Many of these potentially trackable events may be viewed by the member they involve, or in some cases, by other members. Trackable events may include in relation to a given member acting in the Datebuddy role the number of Candidates offered, the number of Candidates accepted for a match, numbers calculated in a relative or absolute manner in relation to standards tracked by a similar demographic. Other trackable events might include number of BBs or CBs accumulated and available to use, accumulated cumulatively, accumulated relative to some standard for comparison. Metrics can be maintained over all time, a given interval, or a specified interval, and an interval may be associated with a special event, such as a benevolent event. Any given metric may displayed for only the associated member, or may be seen by some other members in the membership, and may incentivize such members to utilize the tracked members due to their metric success. Metrics are further discussed elsewhere herein and may also provide an incentive to participate in the Datebuddy process as it may tap in to the inherent competitive nature of the individual.

A unique use of the metrics may be to create an auction/bid scenario, especially after the maturing of the process, which would allow proper time for the accumulation of metrics capable of separating the performance of the membership in a tiered fashion. Another unique situation that may lend itself to an auction/bid scenario may be a famous person or organization offering to participate in the Datebuddy role, where charitable rewards, or CBs, may be used to incentivize such a marketing strategy.

Another unique potential functionality of the Datebuddy process may be the capacity for DB swapping. With the consent of all parties affected, two member entities functioning in the DB role may elect to swap their respective buddies, and likewise two entities participating concurrently in the Buddy role may elect to swap their respective Datebuddies. For this to occur, the two member entities involved may be known to each other through the site. This may be accomplished by virtue of them knowing each other in real life first, and then inviting either to the others circle of friends within the Datebuddy Community, or from a previous interaction prompted by their participation on the site.

The event creation and invitation process may be designed to further the mission of fostering community and social relationship within our culture. The potential event types may include dating, social, informative/educational and charitable/benevolent. The invitees may include associated microsites that are part of the broader social network known as BuddyNation, as described herein. The event creation process is also described in further detail elsewhere herein.

Another unique implementation of the Datebuddy process may be the possibility of increasing the chances of creating friendships and dating relationships by less conventional uses of the Datebuddy process described above. As a goal may be to cultivate such relationships, it should be more important to give the members all the possible chances to meet someone special even if that means allowing the process to function in an unconventional manner. Examples of this may include the possibility that a buddy may be interested in dating their Datebuddy, which may have an increased likelihood due to the compatibility designed in the algorithm which created the match, and this may be incentivized via the invitation process. Another example may be a Datebuddy interested in dating their Buddy, for the same reasons. Another possibility may be a member deciding to match a previous Buddy or Datebuddy of theirs with another Buddy or Datebuddy of theirs, or a Candidate of theirs. Although these permutations of the process may not follow a main process, all of these permutations are possible and encouraged via the links and invitation processes to increase the likelihood of cultivating friendships and dating relationships.

Another exciting variant of the Datebuddy process may be the Eastern Culture variant, which may incorporate varying degrees of familial participation depending on the accepted cultural behaviors of a given geographical region, as described herein (e.g., with respect to FIGS. 36 and 37).

There are various possible ways for the ODS to improve the seeker's ability to find a compatible match, and to foster community, friendship and benevolence while doing so. One possible variant may be where the algorithm tracks the history of Candidates offered by a given DB, and then may attempt to prioritize in the sorting mechanism for DBs whose Candidates most closely match the Buddy's Partner Preferences. This may be implemented by looking at degrees of similarity in the profiles of the Candidates of a given DB and the particular Buddy in question, and prioritizing in some fashion the DBs whose Candidates most closely match the Buddy's Partner preferences. This may be based on probabilities, because the given DB might not think that particular Candidate was sufficiently compatible to offer as a Candidate, or the Candidate may no longer be free to date. One possible way to mitigate the risk that the DB won't perceive the Candidate the algorithm identifies as a compatible offer to the Buddy may be for the site to actually suggest to that given DB that they may consider a particular Candidate they have offered in the past in this particular Buddy's case due to the algorithm identifying them as having an increased likelihood of compatibility.

Another interesting variant of the process may be data mining patterns in characteristics of Candidates a given Buddy has accepted for Matches in the past, and adding or considering these preferences and the manner/degree to which they may be weighted into the sorting process even if they differ from the conscious choices the given Buddy has made in his Partner Profile. The algorithm can weight these disparities based on patterns of success in implementing this type of process in general, or may base the weighting on the metrics and repetitions of such patterns in the individual Buddy in question. In this case the algorithm may take advantage of real life behaviors even if they differ from the conscious perception of the individual Buddy's own beliefs about their preferences.

DB role performed in a group fashion may be either DBs who are also looking for a partner as well (they also participate as a buddy, or BD), or may be DBEs, individuals that may not be currently interested in finding a partner but would still like to function in the matchmaker role, or a mixture of the two sub-types of DBs (DBs and DBEs together). One unique variant of the group DBE may be a couple (either married or in a significant relationship in which neither was currently looking for a partner). They may function essentially as a unique singular entity, bringing a unique logistical dynamic to the process of searching through their friendship network as a team to identify possible Candidates to introduce to the member they are helping. This unique form of couples group DBE could be labeled either as another variant of a group DB where both parties may be DBEs, or it can be framed as a unique variant of an individual DBE entity which provides an unusual degree of multi-faceted possibilities when it comes to the potential for possible Candidate identification via the likelihood of a greater capability of network capacity from such a unified team.

The input process each member participates in to create their profile may include some components that are unique to the Datebuddy process. Firstly, in addition to describing characteristics and prioritizing these characteristics for themselves and their future partner, they also may provide the same kind of data regarding preferences for their Datebuddy (matchmaker) and for the Buddy they would attempt to be a matchmaker for. In addition to those unique components, the input of questions may be accompanied by different potential methods of prioritization of the preferences described by the member. These may include a sliding scale of level of importance of a given characteristic, a "best answer" when multiple selections may be made, and a drag and drop feature that may allow the member to drag and drop all selections made when multiple selections are chosen for a given answer. They may then drag and drop these selections placing them in order of preference. These different approaches to prioritization may then allow the algorithm to attribute unique weighting paradigms within the sorting process to enhance the probability of a compatible match. In addition to allowing the member to identify their order of preference of selections made for a given question, the ODS may also allow the member to prioritize the importance of the questions/answers themselves relative to each other, thus allowing the member to prioritize the characteristics being inquired about by their partner preferences. This type of prioritization may then be taken into consideration by the algorithm, and may influence the order of the sorting, thereby possibly impacting the outcome of the match, and possibly enhancing the compatibility of the match. At least two forms of prioritization may be leveraged by the ODS in collecting input data from the member when defining their preferences. The first may be a "Top Choice," or best answer method, and the second may be a full ranking method where all choices made are then drag and dropped into order of preferences, allowing the algorithm to create differential weighting for every preference chosen by the member. The ODS may enable the user to prioritize certain answers of a given question (e.g., brown hair then red hair then blond hair), to prioritize certain answered questions over others (e.g., religion then body type then hair color), and the like. The ODS may then leverage each of these priorities when assigning connections. Some or all priorities may be weighted by the algorithm (e.g., included in the analysis). In some embodiments, the ODS may enable only some answers to be prioritized (religion but not hair color). In some embodiments, geographical location (e.g., Zip code) may always be highest priority as it may drastically reduce processing overhead by limiting the initial results to be further processed by the algorithm.

During the development of the Datebuddy process the terminology has evolved. There are three pathways that a given user can traverse. These include the matchmaker path, which may be referred to as the Datebuddy, or DB, path; the user who is helped (set up) by the matchmaker, which may be referred to as the Buddy, or BD, path; and the friend of the matchmaker who is being introduced to the Buddy, which may be referred to as the Candidate, or CAND, path. These three pathways may be utilized by four possible user types. The first user type may be the most common, or classic type in which the individual may participate in both the DB, or matchmaker, path for a second member, and the Buddy path, in which a third member may function as a matchmaker for them. Multiple labels for these two functions may be used herein. The user who participates in both roles has been referred to as a mem-user. This can be confusing, because although this is the most common use of the process, it may not be the only user types that are members. There are two other user types that may be members as well. When these mem-users are functioning in the matchmaking role, or DB role, they may be referred to as mem-user as DB, or DB mem user or DBM. When a mem-user is functioning in the Buddy role, in which another member may be functioning as their matchmaker, they may be referred to as mem-user as Buddy, or Buddy mem user, or BDM. The second user type may be an entity that choses to participate exclusively in the matchmaker, or DB function. They may be referred to as DB as user, or DBE. The third type of user may be an entity who chooses to participate exclusively in the Buddy role, where another member acts as their matchmaker, but where they choose not to perform that role for another. This may be referred to as an exclusive role as BD as user, or BDE. The fourth type of user may be a friend or contact of a Datebuddy, or matchmaker, who is being introduced to the Buddy that the Datebuddy is helping, or trying to set up. This user may be referred to as a Candidate, or CAND, and in the early stages of the process may most likely be a non-member, though it is possible that they can be a member as well. Although the sub-designations for the Candidate role may not be specifically illustrated (e.g., in FIGS. 39A and 39B collectively), the Candidate who is not a member may be referred to as CANDE, since they may not be participating in either of the other two roles, DB or BD, and the Candidate that is a member as CANDM. Due to the dual function of the most common user type, and the choice to name each of the two functional roles, there may be four user types, but five functional role types (or six if the sub-types of CAND just mentioned are considered).

Regarding the sub-types of Candidates, in the early stages of the Datebuddy process the majority of Candidates offered by Datebuddies on the site may likely be non-member friends/contacts as the site and its process may first be introduced to any given geographical area. As the site matures in any given location, the probability increases that a Candidate may already be a member when first requested by a Datebuddy to be set up with the Datebuddy's respective Buddy. Thus in the early stages of the introduction of this process the majority of Candidates may be CANDE in type, and where FIGS. 39A and 39B collectively use the label CAND it may be referring to this sub-type. As the site matures and the probability grows of the likelihood of an existing member being invited to participate in the Candidate role, then the sub-type CANDM may become more relevant. In FIGS. 39A and 39B collectively this sub-type may be referenced by the asterisk found in the Candidate pathway, and may follow the same pathway as the CANDE with the exceptions that they may not be offered membership, and they may not be requested to complete their profile and respond to questions about DB and BD preferences, because they would have already done so.

The CANDE may be offered membership, possibly at a reduced initial rate as an incentive, if they are either rejected or dismissed by the Buddy. If they agree to join as members, they may be asked to complete the profile creation steps that would have been absent in their original profile creation. When a non-member Candidate is asked to review a Buddy profile by a Datebuddy, if they are interested in meeting that Buddy they may be given the opportunity to create a profile and be introduced on the site to that Buddy, possibly at no charge. As they may be creating a profile for a single use purpose, just to meet this one particular Buddy, the only two steps of the profile creation process that are relevant may be the personal and partner preference sections. As they have not yet joined as a member (this is referring specifically to a non-member Candidate that is being recruited by the Datebuddy) they may not be participating in the process of being assigned a DB, or matchmaker, or acting as one. Therefore they may have no need at this time for the DB and BD preference sections to be completed. They may be asked to fill out all steps when first creating their profile just to facilitate the conversion process to a membership should they ever decide to join in the future, but they may also not be asked to complete these two sections at that time to streamline their profile creation process, under the assumption that the easier a process is the more likely individuals are to participate and to remain engaged, thereby increasing retention rates.

The difference between a rejection and a dismissal may be that a rejection may occur when any initial offering to any participant of any type of matching is refused. This may include the Datebuddy-Buddy combination matched by the Datebuddy algorithm, as well as the Buddy-"New Match" combination (also referred to as a Candidate from the Datebuddy's perspective—from the Datebuddy's frame of reference this would be a Buddy-Candidate combination) matched by the Datebuddy attempting to set up one of their friends/contacts with the Buddy they are helping, or matchmaking for. For the broader social network BuddyNation this may include the general Buddies matched by the BuddyNation algorithm (also known as BNMs) and the Mentor/coaches (MEN) matched with students (STU) by the BuddyNation algorithm. A dismissal may occur when a matched combination has already been accepted, and exists, and then is terminated by either party of the combination, and may apply to all the combinations previously described.

As shown in process 3900 of FIGS. 39A and 39B collectively, the two matching processes involved are depicted. The first may be an algorithm based match between the member, functioning in the Buddy role, and another member, offered by the algorithm to function as their matchmaker, or DB role. So in essence it may be looking for a DB to match with a BD. Once this match is mutually accepted, the DB may review their network of friends/contacts for compatible matches for this Buddy. The friends they consider for introduction may be called the Datebuddy's Candidates, and when they are offered to the Buddy they are helping, the Buddy sees those Candidates as potential Matches for them. So from the Buddy's perspective the Candidate offered by their Datebuddy may be called their "New Match," and if they accept that match they may continue to be referred to as one of their "Matches". So the same individual may have two labels depending upon the frame of reference. From the Datebuddy, or matchmaker's perspective, the friends they offer may be called their Candidates. From the Buddy's perspective, the offered Candidate from the Datebuddy may be called their Match. Therefore the second matching process of process 3900 of FIGS. 39A and 39B collectively may be the Datebuddy attempting to set up their friend (the Candidate) with the Buddy they have been assigned to help. In summary, the first matching process may be algorithmically driven by the ODS by assigning a Datebuddy (or matchmaker) to a Buddy, and the second matching process may be human-based but facilitated in various ways by the ODS, where the assigned Datebuddy may attempts to set up their friends (the Candidates) with their assigned Buddy, offering them a new potential Match. This duality of processes may exhibit how the Datebuddy process combines technology with the personal touch.

An algorithm that may be used by the ODS for making any suitable connection may be of any suitable type. This algorithm may be designed to provide the member with the best match for a matchmaker, or "Datebuddy." The sorting order may be any suitable order for leveraging different preferences, and some or all member input fields may be utilized in the process. N iterative loops may be leveraged for the steps where the acceptable parameters may be expanded (e.g., depending on the number of geographically appropriate members being filtered out). Threshold values may be used throughout the algorithm, as they may be constantly tested to validate a sufficient quantity of potential matches getting through the filtering process to provide sufficient quality of final matches. Threshold values may be found throughout the algorithm in the form of integers. Except when used in conjunction with N representing iterative loops, all other instances of integers found in the algorithm may represent threshold values. These values may be arbitrary estimates used essentially as placeholders for the true values that may be used in various particular embodiments, each of which may change dynamically or heuristically or may be changed manually. A feature of the sorting process designed to be inclusive, but in a rational way, may be the clustering mechanism. Clusters may be a resorting process whereby a threshold failure may suggest that an exact match of the member's partner preferences result in too severe a filtering out of potential matches. As the goal of the ODS may be to find the friend of the members future mate, and not the mate themselves, the ODS may allow the sort to repeat with a rational broadening of the choices to include responses most similar to those actually chosen, which may be created by clustering similar responses. The clusters may therefore be rationally driven logically based on similar rather than exact matching, which may be reasonable in light of the goal to find the friend of the partner, not the partner themselves. Certain components of the algorithm may be exact match only, because the goal may be to identify a matchmaker that has an increased probability of being friends with a compatible match for the member. With this in mind, it is also important to minimize the possibility of an unpleasant interaction while participating in the Datebuddy process. Therefore, certain characteristics of the matchmaker may be more directly matched to the partner characteristics described by the member in an effort to provide the most positive experience to all users. Certain components of the algorithm may be designed not to filter out like other components of the process, but rather to rank the final identified group of potential matchmakers.

The broader social network known as BuddyNation that may be implemented by the ODS may utilize multiple configurations to cultivate groupings based upon some form of commonality. The shared interests that may bring members together may fall into three categories including hobbies, activities, and topics, or HAT criteria. These microsites may utilize three different processes to bring members together. The first process they may use may be real life friends that share a common interest in the given microsite's focus. With the second process, they may use buddies matched by the BuddyNation algorithm based on their member-generated profile. They may define via an input wizard details about themselves and their engagement in the given microsite's focus, as well as their preferences about those they may desire to share their interest with, including both personal characteristics as well as engagement in their HAT defined interest. The third form of circle process they may use to bring members together who share a common interest in the HAT criteria may be a Mentor (Coach)/Student BuddyNation algorithm. In this process, the member-generated profile may offer members the opportunity of defining their interest in either providing mentorship/coaching within a given interest, or to receive the same in what may be referred to as the student role. This may enable the BuddyNation Network to not only cultivate community and friendship through common interests, but beyond this may cultivate benevolence via incentivizing and facilitating the participation in a process of mentorship. A more rigorous discussion of these concepts may be found elsewhere herein.

These HAT-based microsites may focus on any interest that a group may be capable of sharing in a socially-acceptable and/or socially-redeemable manner These HAT criteria may vary over time and geography, driven by the interests of a given culture and era. The three processes for forming groups or circles may form the foundation of the broader BuddyNation Network, but beyond this may exist in some HAT sites a unique and novel functionality beyond the processes already discussed (Datebuddy is one known example of this). These sites may be referred to as Premium sites, and may justify a higher cost to the member to participate in due to their superior functionality. One example of these Premium sites is described below.

Seniorbuddy is developed in the hopes of aiding a growing population of elderly due to increasing life expectancy as well as the baby boom phenomenon in the United States. Many seniors as they advance find themselves in an increasing state of isolation due to a confluence of factors. These factors may include cultural shifts that have caused family generations to gravitate apart geographically, if not emotionally, and higher divorce rates and disparity in gender life expectancy, resulting in increasing likelihood of living alone in later years. In addition, the greater life expectancy also brings with it an increased opportunity for the need to care-take a spouse who's health is failing. So even when couples are together, isolation can still exist via the dual burden of a spouse that is failing and may not be capable of active participation in companionship, as well as the stress of providing care to a failing loved one while the individual themselves is also aging. Together, these are among the factors which pre-dispose the elder population to an isolative condition. Seniorbuddy may utilize the BuddyNation algorithm in a number of unique ways to aid seniors in this difficult time of their life. The senior member may first create a profile detailing their personal information. This personal information may include data that may be tailored to the senior population. The senior may then create a profile section about the characteristics they would prefer in one or more companions. These potential matches may be specifically designed to foster acquaintanceship, and hopefully friendship. Due to the unique challenges in this population as relates to health and accessibility, the profile may include data regarding both the members' status on these parameters as well as their preferences regarding these areas for their potential new friendships. As an example the member may define through a set of questions their mobility and capacity to participate in certain social functions, and also may define their preferences for these questions as they pertain to their future friends they may be matched with. All of the foundation processes that BuddyNation offers for creating circles may also exist, including buddy matching by HAT criteria and mentorship matching by HAT criteria, but in this case may be supplemented with a number of defining areas of data specific to this senior population. Additional unique processes may include a section within the profile to define care-taking duties. This may include defining any duties the member has for a loved one, or any care-taking responsibilities others, including a family member or a professional care-taker might be providing to the member. Then in a section devoted to defining the friendship preferences, these same areas may again be surveyed, allowing the member to clarify the comfort level in relation to a potential friend's mobility, capacity to participate and at what level, and care-taking situation. Another unique feature of the Seniorbuddy process may be the ability to intervene generationally. With the permission of the member the member's family may be able to aid the member in completing the profile creation process and in monitoring the matching process. The dashboards utilized in this site may have the additional functionality necessary to track the additional variables discussed, in addition to possibly being monitored by family as well. This may allow family separated geographically to assist their senior family members in cultivating friendships and social activities which may mitigate the isolative lifestyle inherent to this population (e.g., similarly as described above with respect to FIGS. 36 and 37). Another unique feature of this process may be in tracking the relative care-taking situations present in the members being matched, as this may allow for the possibility of relieving a caretaker while two individuals in need are meeting together, or combining mutually-beneficial or symbiotic needs of the members in a rationale manner using the BuddyNation algorithm. This may also allow for the possibility of the caretakers directly utilizing the process to relieve their stress via multiple mechanisms. Special care may be taken in checks and balances when dealing with this population to minimize the possibility of exploitation due to competency or frailty.

One, some, or all of the processes described with respect to FIGS. 1-39B may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 13 and/or data structure 15 of FIG. 1 and/or memory 113 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from an ODS subsystem to a client device, from a client device to an ODS subsystem, and/or from one client device to another client device using any suitable communications protocol (e.g., the computer-readable medium may be communicated to a client device 100 via communications component 14/114 (e.g., as at least a portion of an application 119)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of the disclosure may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

The methods described above with respect to the ODS receiving the various types of preference information and/or analyzing combinations of preference information (e.g., information of a system account/profile of a user seeking a matchmaker and that of a matchmaker seeking a user for whom to be a matchmaker) may be carried out by the ODS using any suitable algorithms, neural networks, and the like for any suitable analysis.

While there have been described systems, methods, and computer-readable media for an online social networking service with human matchmaking, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method comprising:
creating, with an online networking service, a member user account for a member user, wherein the created member user account comprises member user account profile data;
creating, with the online networking service, a matchmaker user account for a matchmaker user, wherein the created matchmaker user account comprises matchmaker user account profile data;
assigning, with the online networking service, the created matchmaker user account to the created member user account based on the member user account profile data and based on the matchmaker user account profile data;
after the assigning, identifying, with the matchmaker user, for the member user of the created member user account assigned to the created matchmaker user account, a matchmaker contact from a pool of matchmaker contacts;
granting the identified matchmaker contact access, with the online networking service, to the created member user account;
after the granting, creating, with the online networking service, a candidate user account for the identified matchmaker contact; and
connecting, with the online networking service, the created candidate user account to the created member user account, wherein at least one of the following is true:
the member user account profile data comprises preference data previously determined by the online networking service to be indicative of the member user's reasoning for accepting or declining a previously suggested dating partner and the matchmaker user account profile data comprises profile data indicative of features of at least one contact of the pool of matchmaker contacts;
the member user account profile data comprises preference data previously determined by the online networking service to be indicative of the member user's reasoning for accepting or declining a previously suggested dating partner and the matchmaker user account profile data comprises profile data indicative of features of the matchmaker user;
the member user account profile data comprises profile data indicative of features of the member user and the matchmaker user account profile data comprises profile data indicative of features of a dating partner previously suggested to the matchmaker user;
the member user account profile data comprises profile data indicative of features of the member user and the matchmaker user account profile data comprises profile data indicative of features of another member user of another member user account previously assigned to the matchmaker user account; or
the member user account profile data comprises profile data indicative of features of the member user and the matchmaker user account profile data comprises profile data indicative of features of another member user of another member user previously matched as a dating partner with at least one contact of the pool of matchmaker contacts.

2. The method of claim 1, wherein:
the member user account profile data comprises preference data previously determined by the online networking service to be indicative of the member user's reasoning for accepting or declining a previously suggested dating partner; and
the matchmaker user account profile data comprises profile data indicative of features of at least one contact of the pool of matchmaker contacts.

3. The method of claim 2, wherein:
the member user account profile data comprises facial feature preference data previously determined by the online networking service to be indicative of the member user's reasoning for accepting or declining the previously suggested dating partner; and
the matchmaker user account profile data comprises facial feature data indicative of facial features of the at least one contact of the pool of matchmaker contacts.

4. The method of claim 1, wherein:
the member user account profile data comprises preference data previously determined by the online networking service to be indicative of the member user's reasoning for accepting or declining a previously suggested dating partner; and
the matchmaker user account profile data comprises profile data indicative of features of the matchmaker user.

5. The method of claim 4, wherein:
the member user account profile data comprises facial feature preference data previously determined by the online networking service to be indicative of the member user's reasoning for accepting or declining the previously suggested dating partner; and the matchmaker user account profile data comprises facial feature data indicative of facial features of the matchmaker user.

6. The method of claim 1, wherein:
the member user account profile data comprises profile data indicative of features of the member user; and
the matchmaker user account profile data comprises profile data indicative of features of a dating partner previously suggested to the matchmaker user.

7. The method of claim 6, wherein:
the member user account profile data comprises facial feature data indicative of facial features of the member user; and
the matchmaker user account profile data comprises facial feature data indicative of facial features of the dating partner previously suggested to the matchmaker user.

8. The method of claim 1, wherein:
the member user account profile data comprises profile data indicative of features of the member user; and
the matchmaker user account profile data comprises profile data indicative of features of another member user of another member user account previously assigned to the matchmaker user account.

9. The method of claim 8, wherein:
the member user account profile data comprises facial feature data indicative of facial features of the member user; and
the matchmaker user account profile data comprises facial feature data indicative of facial features of the other member user of the other member user account previously assigned to the matchmaker user account.

10. The method of claim 1, wherein:
the member user account profile data comprises profile data indicative of features of the member user; and
the matchmaker user account profile data comprises profile data indicative of features of another member user of another member user previously matched as a dating partner with at least one contact of the pool of matchmaker contacts.

11. The method of claim 10, wherein:
the member user account profile data comprises facial feature data indicative of facial features of the member user; and
the matchmaker user account profile data comprises facial feature data indicative of facial features of the other member user of the other member user previously matched as the dating partner with the at least one contact of the pool of matchmaker contacts.

12. A non-transitory computer-readable medium comprising computer-readable instructions recorded thereon, which, when executed by at least one processor of an online networking computing service, cause the online networking computing service to:
create a member user account for a member user, wherein the created member user account comprises member user account data;
create a matchmaker user account for a matchmaker user, wherein the created matchmaker user account comprises matchmaker user account data;
assign the created matchmaker user account to the created member user account based on the member user account data and based on the matchmaker user account data;
after the assigning, identify, for the member user of the created member user account assigned to the created matchmaker user account, a matchmaker contact from a pool of matchmaker contacts;
grant the identified matchmaker contact access to the created member user account;
after the granting, create a candidate user account for the identified matchmaker contact; and
connect the created candidate user account to the created member user account, wherein at least one of the following is true:
the member user account data comprises member user metric data, tracked prior to the assigning, indicative of a percentage chance that the member user accepts a suggested dating partner;
the member user account data comprises member user metric data, tracked prior to the assigning, indicative of a percentage chance that the member user matches with an assigned matchmaker;
the member user account data comprises member user metric data, tracked prior to the assigning, indicative of a percentage chance that the member user matches with a matchmaker contact of an assigned matchmaker;
the matchmaker user account data comprises matchmaker user metric data, tracked prior to the assigning, indicative of a percentage chance that the matchmaker attempts to suggest a dating partner to an assigned member user;
the matchmaker user account data comprises matchmaker user metric data, tracked prior to the assigning, indicative of a percentage chance that the matchmaker attempts to suggest more than one dating partner to an assigned member user;
the matchmaker user account data comprises matchmaker user metric data, tracked prior to the assigning, indicative of a percentage chance that any contact of the pool of matchmaker contacts of the matchmaker accepts a suggested dating partner;
the matchmaker user account data comprises matchmaker user metric data, tracked prior to the assigning, indicative of a percentage chance that a specific contact of the pool of matchmaker contacts of the matchmaker accepts a suggested dating partner;
the matchmaker user account data comprises matchmaker user metric data, tracked prior to the assigning, indicative of a percentage chance that any contact of the pool of matchmaker contacts of the matchmaker is accepted as a suggested dating partner; or
the matchmaker user account data comprises matchmaker user metric data, tracked prior to the assigning, indicative of a percentage chance that a specific contact of the pool of matchmaker contacts of the matchmaker is accepted as a suggested dating partner.

13. The non-transitory computer-readable medium of claim 12, wherein the member user account data comprises member user metric data, tracked prior to the assigning, indicative of a percentage chance that the member user accepts a suggested dating partner.

14. The non-transitory computer-readable medium of claim 12, wherein the member user account data comprises member user metric data, tracked prior to the assigning, indicative of a percentage chance that the member user matches with an assigned matchmaker.

15. The non-transitory computer-readable medium of claim 12, wherein the member user account data comprises member user metric data, tracked prior to the assigning, indicative of a percentage chance that the member user matches with a matchmaker contact of an assigned matchmaker.

16. The non-transitory computer-readable medium of claim 12, wherein the matchmaker user account data comprises matchmaker user metric data, tracked prior to the assigning, indicative of a percentage chance that the matchmaker attempts to suggest a dating partner to an assigned member user.

17. The non-transitory computer-readable medium of claim 12, wherein the matchmaker user account data comprises matchmaker user metric data, tracked prior to the assigning, indicative of a percentage chance that the matchmaker attempts to suggest more than one dating partner to an assigned member user.

18. The non-transitory computer-readable medium of claim 12, wherein the matchmaker user account data comprises matchmaker user metric data, tracked prior to the assigning, indicative of a percentage chance that any contact of the pool of matchmaker contacts of the matchmaker accepts a suggested dating partner.

19. The non-transitory computer-readable medium of claim 12, wherein the matchmaker user account data comprises matchmaker user metric data, tracked prior to the assigning, indicative of a percentage chance that a specific contact of the pool of matchmaker contacts of the matchmaker accepts a suggested dating partner.

20. The non-transitory computer-readable medium of claim 12, wherein the matchmaker user account data comprises matchmaker user metric data, tracked prior to the assigning, indicative of a percentage chance that any contact of the pool of matchmaker contacts of the matchmaker is accepted as a suggested dating partner.

21. The non-transitory computer-readable medium of claim 12, wherein the matchmaker user account data comprises matchmaker user metric data, tracked prior to the assigning, indicative of a percentage chance that a specific contact of the pool of matchmaker contacts of the matchmaker is accepted as a suggested dating partner.

* * * * *